United States Patent [19]

Fu

[11] Patent Number: 5,438,644
[45] Date of Patent: Aug. 1, 1995

[54] TRANSLATION OF A NEURAL NETWORK INTO A RULE-BASED EXPERT SYSTEM

[75] Inventor: Li M. Fu, Gainesville, Fla.

[73] Assignee: University of Florida, Gainesville, Fla.

[21] Appl. No.: 757,040

[22] Filed: Sep. 9, 1991

[51] Int. Cl.$^6$ .............................................. G06F 15/18
[52] U.S. Cl. ...................................... 395/22; 395/21; 395/24; 395/27; 395/50
[58] Field of Search ..................................... 395/10–11, 395/13, 20–24, 27, 50, 53; 364/400; 382/14

[56] References Cited

U.S. PATENT DOCUMENTS

| | | | |
|---|---|---|---|
| 4,730,259 | 3/1988 | Gallant | 340/146.2 |
| 4,803,642 | 2/1988 | Muranaga | 364/513 |
| 4,860,213 | 8/1989 | Bonissone | 364/513 |
| 4,958,939 | 9/1990 | Samad | 395/22 |
| 5,014,219 | 5/1991 | White | 395/11 |
| 5,052,043 | 9/1991 | Gaborski | 395/22 |
| 5,092,343 | 3/1992 | Spitzer et al. | 395/22 |
| 5,113,485 | 5/1992 | Horan et al. | 395/25 |
| 5,136,686 | 8/1992 | Koza | 395/13 |
| 5,214,745 | 5/1993 | Sutherland | 395/22 |
| 5,218,529 | 6/1993 | Meyer et al. | 364/400 |
| 5,226,092 | 7/1993 | Chen | 382/14 |
| 5,241,620 | 8/1993 | Ruggiero | 395/22 |
| 5,251,268 | 10/1993 | Colley et al. | 395/23 |

OTHER PUBLICATIONS

Karen Okagaki; "Using Expert Systems to Validate and Verify Neural Networks"; Inter. Neural Network Conf. (INNC) Jul. 9–13, 1990; pp. 314–317.

"Blackboard Systems–Blackboard Application Systems, Blackboard System from a Knowledge Engineering Perspective"–H. Penny Nii, The Ai Magazine, pp. 82–106, Aug. 1986.

"An Empirical Comparison of ID3 and Back-propagation"–Douglas Fisher and Kathleen B. McKusick, Machine Learning, pp. 788–793.

"An Experimental Comparison of Symbolic and Connectionist Learning Algorithms", Raymond Mooney, Jude Shavlik, Geoffrey Towell, Alan Gove, Machine Learning, pp. 775–780.

"Connectionist Expert Systems", Stephen I. Gallant, Communications of the ACM, vol. 31, No. 2, pp. 152–168, Feb. 1988.

"Learning Internal Representations by Error Propagation" D. E. Rumelhart, G. E. Hinton, and R. J. Williams, Learning Internal Representations, pp. 319–362.

"Enhancing Performance of Expert Systems by Automated Discovery by Meta-Rules", Li-Min Fu and Bruce G. Buchanan, pp. 107–115, 1984, The First Conference on Artificial Intelligence Application.

"Learning Intermediate Concepts in Constructing a Hierarchical Knowledge Base"–Li-Min Fu and Bruce G. Buchanan, pp. 659–666, The 9th International Joint Conference on Artificial Intelligence, 1985.

"Adaptive Signal Detection in Noisy Environments", Li-Min Fu, Journal of Neural Network Computing, pp. 42–50, Spring 1990.

"Simplifying Decision Trees", J. R. Quinlan, Man-Machine Studies, pp. 221–234, 1987.

"On Debugging Rule Sets When Reasoning Under Uncertainty"–David C. Wilkins and Bruce G. Buchanan, Science/Learning, pp. 448–454.

Primary Examiner—David D. Knepper
Assistant Examiner—Tariq R. Hafiz
Attorney, Agent, or Firm—Kerkam, Stowell, Kondracki & Clarke

[57] ABSTRACT

A rule-based expert system is generated from a neural network. The neural network is trained in such a way as to avoid redundancy and to select input weights to the various processing elements in such a way as to nullify the input weights which have smaller absolute values. The neural network is translated into a set of rules by a heuristic search technique. Additionally, the translation distinguishes between positive and negative attributes for efficiency and can adequately explore rule size exponential with a given parameter. Both explicit and implicit knowledge of adapted neural networks are decoded and represented as if—then rules.

18 Claims, 6 Drawing Sheets

TRANSLATION OF A NEURAL NETWORK INTO A RULE-BASED EXPERT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to expert systems. More specifically, this invention relates to translation of a neural network into a rule-based expert system. Further, this invention relates to a neural network which is trained as to better allow its translation.

The use of computers to store knowledge has been common for quite some time. In addition to simply storing data or information, computers have been used for drawing conclusions. For example, a computer may be used to predict the weather.

There has been a continuing need to develop computers or data processing systems which can interpret data or otherwise draw conclusions from data. The data processing system might draw the conclusions based upon numerous sample cases which have previously been supplied to it. For example, one might input current weather conditions and the data processing system or computer might predict the weather based upon the known weather patterns which occurred in the past. Instead of simply providing previous occurrences, one may want to supply rules to a computer or data processing system. The rules would tell the computer that when the facts corresponding to the premise of a rule occur, then the conclusion of the rule is true (or is most likely true).

Data processing systems have been developed which include neural networks. Such neural networks include layers of processing elements sometimes called neurons because they are designed to roughly simulate the neurons in a human brain. Various electrical circuits may be used to realize a processing element having an output which is a complex function of a series of inputs. In addition to the hardware neural networks, neural networks have been provided by software components in a digital computer system. The software components in such a software neural network simulate the hardware components of a hardware neural network. As used herein, a neural network will include both hardware and software neural networks and exclude neurons and connections in the brain of a human or animal. In other words, a neural network as used herein is artificial (non-human, non-animal).

Data processing systems have been used to establish, possibly through use of a machine learning program, rule-based expert systems. Such expert systems include a rule memory, often called a rule base, and an inference engine. Such systems determine which rules are applicable and then fire or execute the applicable rules in order to draw conclusions. Such systems have become increasingly popular because of many of their features. Generally, an expert system holding a given amount of knowledge would run significantly faster than a neural network holding the same amount of knowledge. Further, an expert system is structured in such a way that a human expert can follow the process by which the computer expert system reached its conclusion. The human expert can see which rules have been executed by the expert system and readily evaluate whether the expert system is functioning correctly. In contrast, it is very difficult for a human expert to follow the complex process used by a neural network, usually composed of one or more neural chips, because of the structure. A rule-based expert system is also advantageous relative to a neural network in that it is much easier usually to add a new rule to a rule-based expert system than it is to add further information to a neural network.

Although the features of a rule-based expert system as discussed above help explain the increasing popularity of such systems, such systems also have several disadvantages as compared to neural networks. Such expert systems search directly over the primary attribute space and this limits their search width. The primary attribute space refers to characteristics which are in the premises of the rules. If there are 100 different attributes or conditions, it may be difficult or impossible to search all possible combinations of the 100 attributes. In contrast, a neural network allows for an exponential search width because of its hidden layered structure. Thus, a neural network provides for an adequate search over practical problem domains. A further advantage of neural networks over expert systems is that neural networks may handle multivariate analysis, whereas rule-based expert systems are usually more limited in this aspect due to the relatively limited search width. A rule-based expert system can be established by a machine learning program in which one supplies specific cases such that these expert systems lack statistical generalization. In contrast, a neural network can handle statistical information relatively well and imply conclusions which are not addressed by a particular case supplied to it. A further advantage of neural networks is that they handle noisy data significantly better than an expert system as established by a symbolic learning program.

OBJECTS AND SUMMARY OF THE INVENTION

Accordingly, it is a primary object of the present invention to provide a rule-based expert system which avoids or minimizes many of the disadvantages previously associated with such systems.

A further object of the present invention is to provide a rule-based expert system which is established in such a way as to have many of the advantages of neural networks including handling multivariate analysis, the ability to be constructed using data which is noisy, and the ability to incorporate implications drawn from the raw data which is provided, which implications reach conclusions in cases which were not part of the raw data.

Yet another object of the present invention is to provide for translation of knowledge from a neural network to a rule-based expert system having equivalent performance to the neural network.

A still further object of the present invention is to provide a neural network which is specifically constructed as to allow transfer of its knowledge into a rule-based expert system.

The above and other objects of the present invention which will be more apparent as the description proceeds are realized by a data processing system. The system includes a translating means for translating knowledge in a neural network having an input layer of input units and different layers of processing elements including an output layer of output elements and at least one hidden layer of hidden processing elements. The translating meanstranslates knowledge in the outer layer and each hidden layer of the neural network into a layer set of rules. A rewriting means rewrites rules from the layer set of rules by reformulating rules from one layer in terms of rules of another layer to eliminate undefined hidden concepts and thereby generate a rewritten set of rules. The rewritten set of rules have an equivalent performance to the neural network. A memory receives and stores the rewritten set of rules. The data processing system may further include the neural network and the translation means and rewriting means are operably connected to the neural network. The neural network may be a hardware network with the input units, output processing elements, and hidden processing elements all being hardware components. The processing system may include a CPU and a memory operably connected to the CPU and having the translating means and rewriting means disposed in the memory. As an alternative to the hardware network, the neural network may be disposed in the memory and the input units, output processing elements, and hidden processing elements would all be software components. In another embodiment, the translation means and rewriting means may be part of one or more of the output processing elements and hidden processing elements. In that case, the memory may be within at least one of the output processing elements and the hidden processing elements.

The translating means translates knowledge from the neural network while distinguishing between positive attributes, which link to a concept corresponding to an output of one of the processing elements by a positive weight and negative attributes, which link to an output concept of one of the processing elements by a negative weight. The translating means translates by presenting each processing element with positive input combinations corresponding to positive attributes up to k for that processing element to develop a set PA of all combinations of at most k positive attributes, each of which confirms one of the concepts if all negative attributes are absent. The translating means then determines which of the input combinations in PA confirm one of the concepts when combined with the absence of some or no negative attributes to develop a set PAN. The translating means then presents each processing element with negative input combinations up to k corresponding to negative attributes for that processing element to develop a set NA of all combinations of at most k negative attributes each of which disconfirms one of the concepts if all positive attributes are absent. The translating means then determines which of the input combinations in NA disconfirm one of the concepts when combined with the absence of some or no positive attributes to develop a set NAP.

The system may further include means for performing an initial backpropagation to train a neural network, means for finding hidden processing elements within a common layer having similar patterns of information and for replacing the similar pattern hidden processing elements with a single hidden processing element having information from one or more of the similar pattern hidden processing elements, and means for performing a further backpropagation on the neural network.

The data processing system may further include an inference engine in the memory. The inference engine and stored rules in the memory are together a part of a rule-based expert system.

The method of producing a rule-based expert system according to the present invention uses a neural network and initially translates knowledge in the output layer and each hidden layer of the neural network into a layer set of rules. The rules from the layer set of rules are rewritten by reformulating rules from one layer in terms of rules of another layer to eliminate undefined hidden concepts and thereby generate a rewritten set of rules having an equivalent performance to the neural network. As used herein, equivalent performance means that the application of the rules would produce the same conclusions as produced by the neural network. in at least 95% of samples supplied to the neural network and to the rules, which samples would collectively be a random 10% of all situations in the problem domain. Equivalent performance would also extend to any situations where the application of the rules would produce the same conclusions as produced by the neural network in at least 95% of samples supplied to the neural network and to the rules, where the samples are random and a lower percentage (i.e., less than 10%) of the problem domain which one of skill in this field would consider as providing a reasonable basis to evaluate the performance of the rules and the neural network. Even more preferably, the rewritten set of rules will yield the same conclusions as the neural network in at least 95% of all possible combinations of attributes (i.e., input conditions) within a problem domain. The rewritten rule set is stored in a memory. Prior to the translation step, the neural network is trained by performing the initial backpropagation as discussed above, finding and replacing hidden processing elements as discussed above, and performing a further backpropagation as discussed above.

The translation step includes the substeps which produce the sets, PA, PAN, NA, and NAP in the manner described above. The presenting of each processing element with positive input combinations corresponding to positive attributes proceeds heuristically in that, upon finding a member of set PA having m possible attributes $P_1$ to $P_m$, m being any positive integer less than k, one or more further combinations corresponding to $P_1$ to $P_m$ combined with other positive attributes are considered members of PA without such further combinations being supplied to the processing element. The presenting of each processing element with negative input combinations corresponding to negative attributes proceeds heuristically in that, upon finding a member of set NA having negative attributes $N_1$ to $N_m$, one or more further combinations corresponding to $N_1$ to $N_m$ combined with other negative attributes are considered members of NA without any further combinations being supplied to the processing element. The rules are translated by searching for rules in each layer of processing elements starting at a hidden layer closest to the input layer and proceeding to the outer layer by way of any intervening hidden layers. The translation further includes the steps of detecting implausible combinations of outputs from processing elements in one layer and using the knowledge of implausible combinations to limit the search in the next layer to be searched.

The method of the present invention may alternately be described as including the step of performing an initial backpropagation to train a neural network processing elements with input weights, finding hidden processing elements within a common layer having similar patterns of information, replacing the similar pattern hidden processing elements with a single hidden processing element having information from one or more of the similar pattern hidden processing elements such that each hidden processing element in a layer eventually has a distinctive pattern of information, and performing a further backpropagation on the neural network. The method may further include, after the initial backpropagation and before the further backpropagation, the step of nullifying relatively small absolute value input weights to each processing element in a layer such that only a certain number of the larger absolute value input weights remain with non-zero values. The nullifying step is preferably performed before the finding step. The replacing step replaces similar pattern hidden processing elements with a single hidden processing element having input weights which are the vector average of the input weights of the similar pattern hidden processing units which are replaced. The finding step locates similar pattern hidden processing elements by comparing vectors corresponding to input weights of the hidden processing elements. The method may further include the translation of knowledge in the neural network into a layer set of rules, the rewriting of the rules and storage of a rewritten rule set in a memory.

The present invention may alternately be considered as an apparatus having a neural network with an input layer of input units and different layers of processing elements including an output layer having output processing elements and at least one hidden layer having hidden processing elements, each processing element having input weights. Means for training the neural network by performing an initial backpropagation on the neural network, finding hidden processing elements within a common layer having similar patterns of information, replacing the similar pattern hidden processing elements with a single hidden processing element having information from one or more of the similar pattern hidden processing elements such that each hidden processing element in a layer eventually has a distinctive pattern of information, and performing a further backpropagation on the neural network are included. The neural network may be a hardware network with the input units, output processing elements, and hidden processing elements all being hardware components.

BRIEF DESCRIPTION OF THE DRAWINGS

The above and other features of the present invention will be more readily understood when the following detailed description is considered in conjunction with the accompanying drawings wherein like characters represent like parts throughout the several views and in shich.

DETAILED DESCRIPTION

Figure 1:
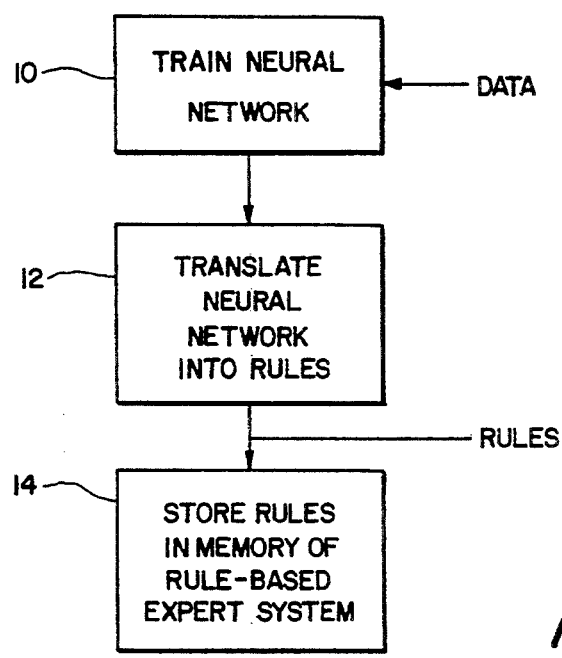
FIG. 1 shows a simplified overview of the method of the present invention.

Turning first to FIG. 1, an overview of the method of the present invention will be presented. Briefly, the present invention allows one to combine many of the advantages of neural networks with rule-based expert systems. In order to realize those benefits, data is used to train a neural network as shown at block 10. Although the present invention will, in its broadest respects, work with neural networks which have been trained using standard training procedures including backpropagation, the more specific aspects of the present invention use a special form of training for the neural network. This special form of training will be discussed in further detail below.

Following the completion of training of the neural network, the neural network will be translated at block 12 into rules. Significantly, the rules will be sufficiently complete to be the performance equivalent of the neural network. The specifics of the translation will be discussed in more detail below. At this stage, it is sufficient to indicate that rules are provided from block 12 to block 14. At block 14 the rules are stored in the memory of a rule-based expert system. The expert system generated by this technique will provide many of the advantages of rule-based expert systems, while avoiding or minimizing many of the disadvantages. The expert system produced according to the present invention will have several of the advantages normally associated with a neural network, while avoiding or minimizing disadvantages usually associated with a neural network.

Figure 2:
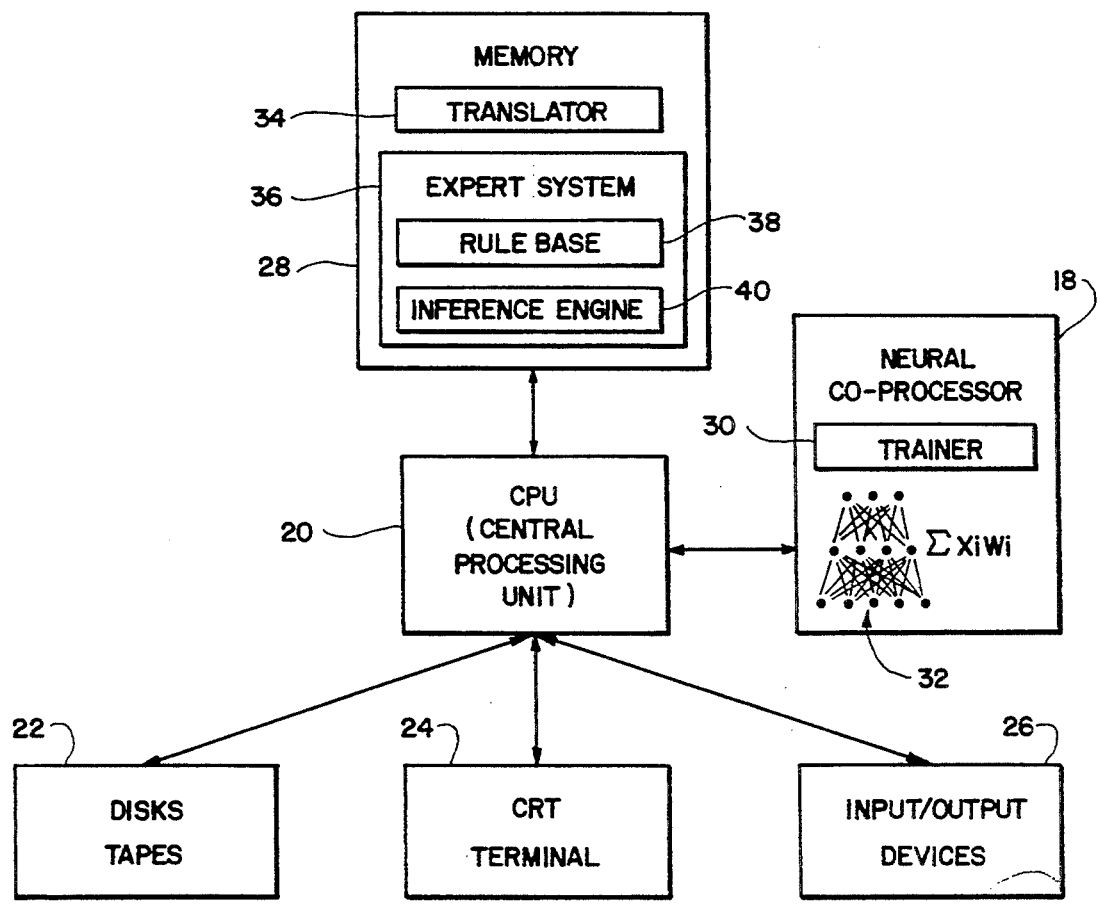
FIG. 2 shows a first embodiment system of the present invention.

As shown in FIG. 2, a first embodiment 16 of the present invention uses a neural co-processor 18 combined with a computer having CPU 20, disc/tapes 22, CRT terminal 24, input output devices 26, and memory 28.

Within the neural co-processor 18 is a trainer 30 which is used for training the neural network or co-processor. The structure of a neural network of co-processor 18 is indicated schematically at 32 within block 18. The structure will be discussed in more detail below.

As shown, the memory 28 includes a translator 34 and an expert system 36 disposed therein. The expert system 36 includes a rule-base 38 and an inference engine 40.

The overall operation of the system 16 of FIG. 2 proceeds as outlined in FIG. 1. Initially, the neural network 32 of co-processor 18 has not yet been trained. The trainer 30 trains the neural network 32 by using data supplied to it (data not shown). After the neural network 32 is trained, the translator 34 translates the neural network 32 into rules which are supplied to a rule base 38, which rule base was initially empty. Thus, the expert system 36 has been produced using the neural network 32.

Figure 3:
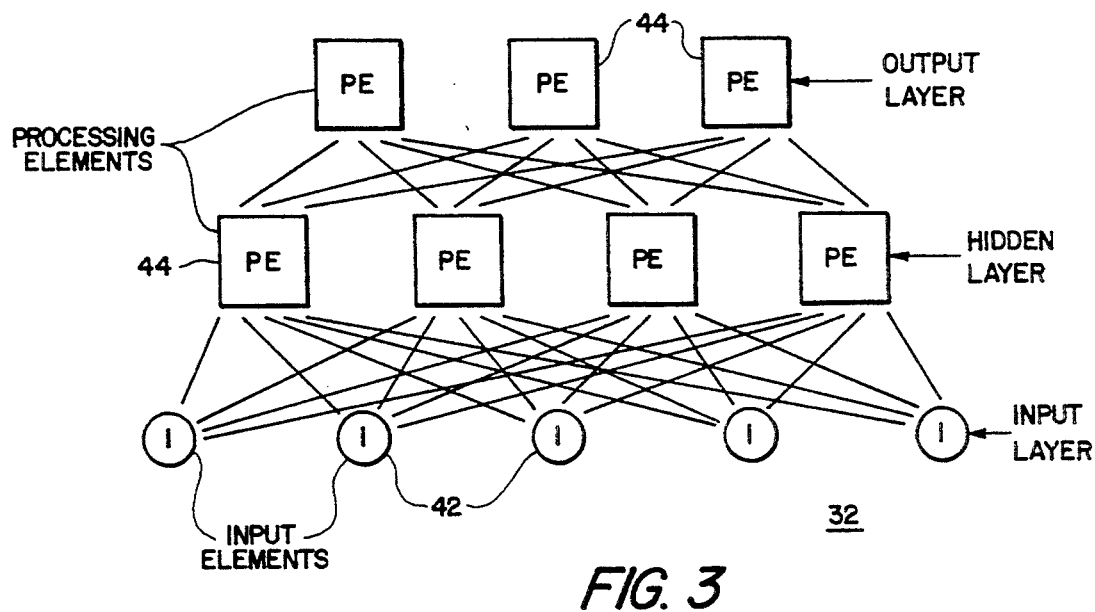
FIG. 3 shows a neural network according to the present invention.

Turning now to FIG. 3, the neural network 32 is shown in detail as including five input elements 42 extending horizontally in an input layer. The input elements or nodes simply receive input data and convert it into the proper signal level or format such that it may be received by one or more of the processing elements 44, which processing elements are arranged in a horizontal row of four processing elements in a hidden layer and three processing elements in an output layer, also extending horizontally. For ease of illustration, not all of the processing elements or input elements have been labeled with the numerals. Those processing elements in the hidden layer may be referred to as hidden processing elements, whereas those in the output layer may be referred to as output processing elements. Although the structure has been shown as only including a single hidden layer, it will be apparent that more than one hidden layer may be used.

The neural network 32 of FIG. 3 operates in a generally conventional manner except for certain important features which will be discussed below. Thus, the operation will be understood by those of skill in the art. However, it may be useful to briefly review the principles of operation of such a neural network 32, which networks often use neural chips and are sometimes referred to as connectionist systems.

Each of the processing elements 44 receives inputs from each of the elements (either input elements or processing elements) in the upstream (lower in FIG. 3) layer. In the arrangement of FIG. 3, each element in one layer is connected to each element in the next (i.e., closer to output) layer and there are no connections directly from one layer to a non-adjacent layer. However, neural networks with other structures might also be used with the present invention. The output of any of the processing elements is given by $$OUT = g\left(\Sigma w_i x_i - \Theta\right)$$

where $w_i$ and $x_i$ are input weights and inputs respectively, $\Theta$ is the threshold, and the function g is the squashing function (sometimes called a transfer function or activation function) and is often chosen to be a sigmoid. A sigmoid function is:

$$g(net) = \frac{1}{1 + e^{-\lambda net}}$$

where $\lambda$ determines the steepness of the function and net is simply the input to the function. For ease of discussion, the following description shall use the term sigmoid-sum to denote the sigmoid of the sum minus $\Theta$, that is, $$sigmoid-sum = g\,(sum - \Theta)$$

By use of the multiple layers of processing elements, the neural network 32 can, after proper training, make decisions or draw conclusions based upon a pattern of data supplied at the input layer.

The inputs supplied to each processing element may be considered as attributes. These attributes correspond to $x_i$ and affect the concept corresponding to the output of a particular processing element. A concept at the output of a processing element may be a hidden concept if it is at the output of a processing element in the hidden layer or the concept may be a final or target concept if the concept corresponds to an output of a processing element in the output layer.

An example may be useful in order to explain the terminology. If the neural network 32 has been trained to determine if a mushroom is poisonous or edible, the input elements 42 of the input layer would be supplied with information about the characteristics, such as shape, coloring, odor, etc. of the mushroom in question. The input elements 42 encode these attributes and supply them to the processing elements 44 within the hidden layer. For example, if the shape of the cap of the mushroom was conical, an input would be supplied to the processing elements 44 in the hidden layer, which input corresponds to the attribute of a conical cap shape.

In the mushroom example, the final or target concept would be whether the mushroom is edible or poisonous. That conclusion is a concept corresponding to the output of the output layer. In order to provide that final or target concept, the processing elements 44 of the output layer use attributes corresponding to the outputs or concepts supplied by the processing elements 44 of the hidden layer. For example, one of the processing elements 44 within the hidden layer might output a concept indicating that the mushroom was in a particular family of mushrooms. That hidden concept would be supplied as an attribute to the processing elements 44 in the output layer and might be used in combination with other signals supplied by the hidden layer in order to reach the final or target concept indicating whether the mushroom is poisonous or edible. Note that the concept out of one layer of processing elements serves as an attribute at the next downstream layer of processing elements. The example of a hidden concept corresponding to the fact that the mushroom is in a particular family of mushrooms is a defined hidden concept, meaning that an expert on mushrooms might readily appreciate and understand the concept of whether a mushroom was in a particular family or not. However, hidden concepts are often undefined, meaning that they are complex combinations of characteristics. For example, a hidden concept might correspond to the mushroom stalk shape being tapering, the cap shape being conical, the spore print color being purple, and the odor being almond. This arbitrary example might be considered as an undefined hidden concept because an expert on mushrooms would not be able to say that this combination of characteristics identifies a particular family or grouping of mushrooms or otherwise identifies a particular single property commonly referred to by experts in this field.

The individual processing elements 44 within the neural network 32 may be constructed using known structures, which structures are occasionally referred to as neurons because of the rough similarity between the operation of a neural or connectionist network and the neurons in a human brain. Of course, the processing elements 44 could be made of resistors, capacitors, and/or other components commonly used in neural chips, which chips are in turn used to make neural networks.

The output of a processing element may be considered to range between 0 and 1. If the output of a processing element is close to 1, this means that the concept defined by that processing element is true, whereas if the output of a processing element 44 approaches 0, this indicates that the concept corresponding to that processing element is not true or does not exist. Turning back to the example of the hidden processing element having a hidden concept at its output which indicates whether a mushroom is in a particular family of mushrooms, a level of approximately 1 at the output would indicate that the mushroom is indeed within that family of mushrooms. An output of about 0 would indicate that the mushroom in question is not within the particular family of mushrooms. The closeness required for the output to be considered 1 and the closeness required for the output to be considered 0 will be discussed below.

Two kinds of attributes to a particular processing element may be considered. For a given concept corresponding to the output of a particular processing element, an attribute tending to confirm that concept (making the activation or output approach 1) is considered a positive attribute. A negative attribute for the given concept refers to attributes which disconfirm (making the activation or output approach 0) the concept. An attribute is a positive attribute for a concept if and only if it links to the concept through a connection with a positive weight. An attribute is a negative attribute for a concept if and only if it links to the concept through a connection with a negative weight. Note that an attribute which is positive relative to one concept may be a negative attribute relative to another concept. The given definitions of positive and negative attributes are based on the fact that the sigmoid function is a monotonically increasing function and based on the restriction of activation to the range between 0 and 1. It should also be mentioned that in a multi-layer network (two or more layers of processing elements) positive attributes and negative attributes are only defined relative to each layer. This is true because an attribute may support a hidden concept (i.e., the mushroom is in a particular family) which is a positive attribute for the final concept (the mushroom is edible) and at the same time support another hidden concept which is a negative attribute for the final concept. It may turn out that in this case, the type of contribution of an attribute to a final concept is conditioned on the values of other attributes.

In order to train the neural network 32 of FIG. 3, training cases or data are supplied to the neural network. As the training process proceeds, the weights $w_i$ are adjusted in magnitude in polarity.

Figure 4:
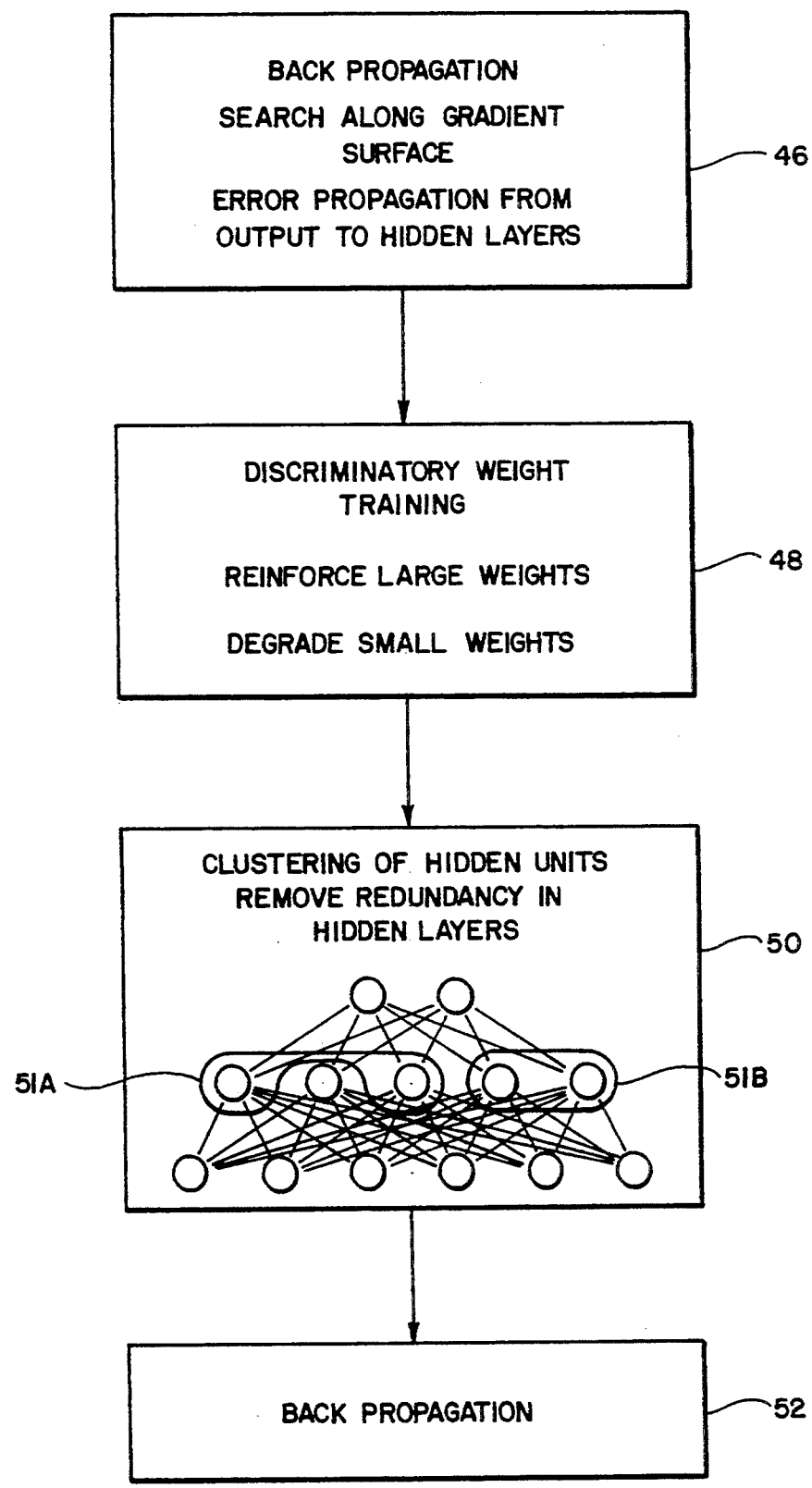
FIG. 4 is amplified flowchart showing how a neural network is trained by the present invention.

The training process used with the present invention is shown in FIG. 4 and begins with block 46 wherein backpropagation is performed. This backpropagation involves a search along the gradient surface and error propagation from the output layer to hidden layers. However, as backpropagation is known in this field, the details of the backpropagation need not be discussed in detail. However, the backpropagation would be of the type described in Rumelhart, Hinton, and Williams 1986 article entitled "Learning Internal Representation by Error Propagation" which appeared in *Parallel Distributed Processing: Explorations in the Microstructures of Cogniting*, Volume 1, MIT Press, Cambridge, Mass. That article is hereby incorporated by reference.

Following the backpropagation of block 46, the training process of FIG. 4 leads to block 48. In that block, discriminatory weight training is performed. This discriminatory weight training involves nullifying (setting to zero) relatively small absolute value input weights to each processing element in a layer such that only a certain number of the larger absolute value input weights remain with non-zero values. For example, if a processing element had input weights $w_i$ of 0.1, 0.2, 0.1, 0.5, 0.6, 0.5, and 0.7, discriminatory weight training in which the four input weights having the largest absolute value are selected and the remaining input weights are set to zero would involve changing the first three listed input weights to zero. Note that the polarity of the input weights does not affect this decision as the discriminatory weight training nulls the smallest weights in terms of absolute value. Assuming that the procedure selected only the top four weights in terms of their absolute value, the input weights listed above would be changed to be 0, 0, 0, 0.5, 0.6., 0.5, and 0.7. Note that in actual practice, one might want to use the top seven weights in terms of absolute value or one might use any other number. The discriminatory weight training avoids having very small effects on a concept at the output of a processing element and will ease the translation of the knowledge in the neural network 32 into the rules format for a rule-based expert system. More generally, the discriminatory weight training simply puts the neural network 32 in a better form for later translation than would otherwise be the case.

Following block 48, control is transferred to block 50 wherein clustering of hidden processing elements is performed in order to remove redundancy within the hidden layers. This clustering may best be explained by use of an example. Assume that a hidden processing element or unit H has input weights of $w_1h$, $w_2h$, and $w_3h$ and that another processing element G within that same hidden layer as H has input weights of $w_1g$, $w_2g$, and $w_3g$. The input weights of the two different hidden units may be considered to constitute vectors. If these input weights have similar patterns of information, there will be some redundancy between the information stored in element G and the information stored in processing element H. The present invention compares the cosine of the angle between the two vectors defined by the three input weights for each of the two processing elements. If the cosine of the angle is approximately equal to one, this means that the patterns of the two input weight vectors are approximately the same. By using a threshold value to determine the similarity of the two input weight vectors as indicated by the cosine of the angle between the weight vectors, one can determine if the corresponding processing elements are encoding redundant information. Although the example given here simply refers to weight vectors having three components, it will be readily appreciated that the input weight vectors may have a larger number of components and the same test for similarity may be applied. It should also be noted that each of the processing elements within a particular hidden layer are tested for similarity relative to each of the other processing elements within that hidden layer. Thus, the clustering may indicate that three processing elements have redundant information in that they are essentially duplicative of each other and the clustering process may indicate that two other hidden processing elements are redundant relative to each other. In that case, the three hidden processing elements of the first group are replaced by a new hidden unit having an input weight vector corresponding to the average of the three elements or units which are being replaced. Likewise, the group of two redundant hidden processing elements would be replaced by a single processing element having an input weight vector which is the average of the two input weight vectors of those two units being replaced. Block 50 illustrates a group 51A of two hidden processing elements or units which are clustered and a group 51B of two other clustered units.

Figure 5A:
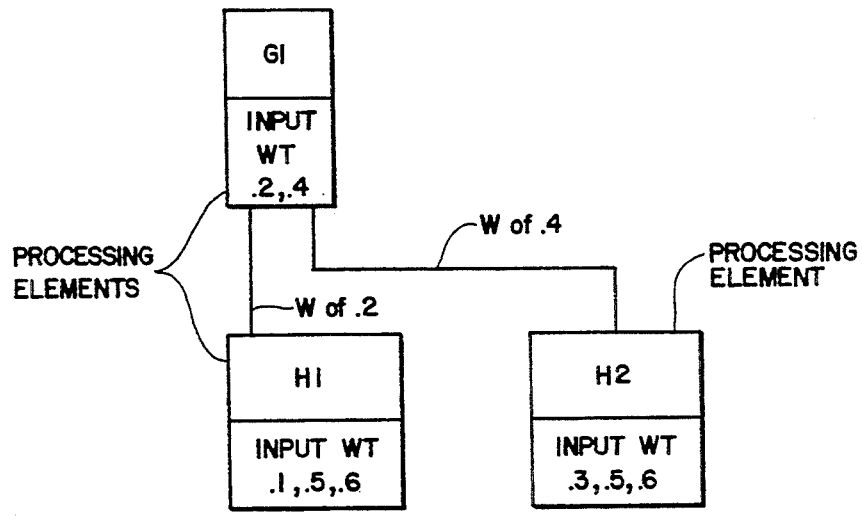
FIGS. 5A shows parts of a neural network before replacement of redundant hidden processing elements.
Figure 5B:
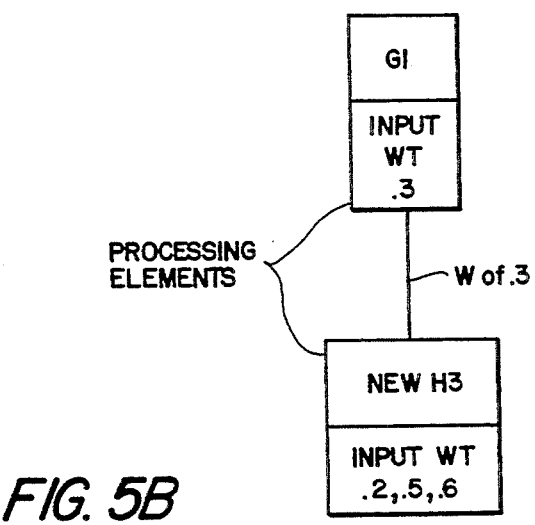
FIG. 5B shows parts of a neural network after replacement of a redundant hidden processing elements.

Turning momentarily to FIGS. 5A and 5B, a small portion of a neural network is illustrated in order to show how this clustering and replacement process works. Processing elements H1 and H2 of FIG. 5A receive signals from three different previous units (not shown) and have input weights as illustrated. Assuming that the threshold test indicates the redundancy between the information of elements H1 and H2, these two units would be replaced by a single unit new H3 of FIG. 5B. Note that H1 and H2 supply signals to processing element G1 which is in the output layer or in a hidden layer closer to the output than the layer in which H1 and H2 are disposed. In order to remove the redundancy of H1 and H2 essentially duplicating each other, H1 and H2 of FIG. 5A are replaced as shown at FIG. 5B where new H3 has input weights which are the average of the input weights for former H1 and H2. Note also that the output weight vector of the new H3 element or unit would also be given the average output weight vector of the units H1 and H2. In other words, the input weight at unit G1 is replaced by the average of the two output weights (i.e., input weights to the next element) which are being replaced.

Following the removal of the redundancy in the hidden units by the cluster and replacement process as described, block 50 of FIG. 4 proceeds to block 52 wherein a further step of backpropagation is performed. This further step of backpropagation helps to improve the accuracy of the neural network.

Although FIG. 4 shows the simplified process for the training of the neural network according to the present invention, an Appendix A is attached as part of this application and shows the actual computer program named KTBP in LISP for the indicated training process.

Once the neural network is trained, the present invention interprets or translates its knowledge into rules. In order to do so, a mechanism is required to translate numerical knowledge into symbolic knowledge. As the activation level at each node in the neural network may range between 0 and 1, parameters $\alpha$ and $\beta$ are used such that the activation level smaller than the $\alpha$ value is treated as a logical no and the activation level greater than the $\beta$ value is treated as a yes. The $\beta$ must be greater than the $\alpha$ value in order to avoid ambiguities. The possibilities of the $\alpha$ value range between 0 and 0.5, whereas the possibilities for the $\beta$ value fall between 0.5 and 1 when the choices for $\alpha$ and $\beta$ approach 0.5, rules formed are more general, but may be noisy. On the other hand, when the choices go to the extremes ($\alpha$ almost 0, $\beta$ almost 1) rules tend to be more specific and restrictive. It appears that rules in the former case reflect more the continuous nature of the neural network, whereas rules in the latter case capture the more discreet nature of the neural network. The choice of values for $\alpha$ and $\beta$ will vary depending on the domain under study. In addition, the present invention preferably will use different values for $\alpha$ and $\beta$ for the hidden units than the values used for $\alpha$ and $\beta$ for the output units. For example, the values used for $\alpha$ and $\beta$ at the output processing elements or units may be 0.1 and 0.9 respectively, whereas the values at the hidden layers may be 0.4 and 0.6.

Figure 6:
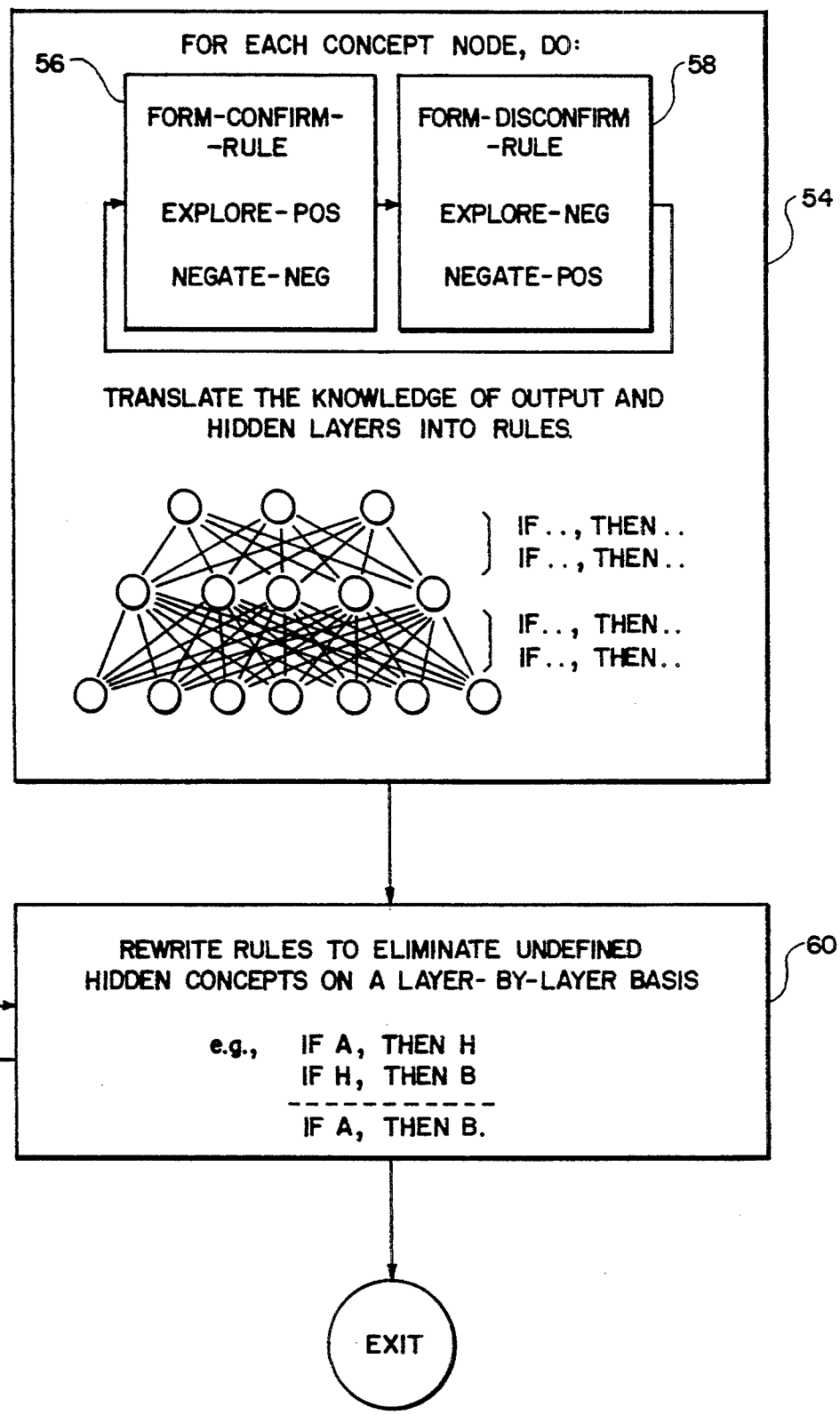
FIG. 6 is simplified flowchart showing how a neural network is translated into rules by the present invention.

Turning now to FIG. 6, there is shown a simplified flowchart of the translator 34 of FIG. 2 corresponding to the translation operation of block 12 of FIG. 1. As shown at block 54, the translation process initially requires that the knowledge of the output layer and each hidden layer are translated into rules. The form of the rules is diagramed at the bottom of block 54 which also shows how the rules relate to different layers within the neural network. In order to translate the knowledge in each layer into rules, block 54 includes within it blocks 56 and 58 which are different procedures. Each of the procedures is performed for each processing element, also referred to as a concept node.

The block 56 procedure FORM-CONFIRM-RULE searches for rules, each of which is able to confirm a particular concept independently. This procedure of block 56 involves simulating the firing of a rule by presenting the network with any input matching the antecedent of any such rule such that the activation of the corresponding processing element will be greater than the $\beta$ value. The procedure FORM-CONFIRM-RULE calls the procedures EXPLORE-POS and NEGATE-NEG which involve heuristic search derived from numerical constraints associated with positive attributes and negative attributes as will be discussed below.

The rules which are to be generated for a rule-based expert system will have one or multiple conditions and one conclusion. The size of a rule is determined by the number of conditions. In each layer of processing elements, the translation process explores the number of attributes in combinations up to k. The maximum possible rule size is determined by $k^d$ where d is the number of layers. For example, given k equals 5 and d equals 3, the largest possible rule size is 125. This is believed to be more than adequate in practical domains.

The output of EXPLORE-POS is a set PA of all combinations of at most k pos-atts Pi (positive attributes) each of which can confirm the concept if all neg-atts Ni (negative attributes) are absent. Then, NEGATE-NEG is applied to each such combination in an attempt to finding all rules each of which can confirm the concept in the absence of some or no negatts. In brief, EXPLORE-POS searches for combinations of pos-atts {{P1, ..., Pi}{ ... } ... } such that sigmoid-sum-wt(P1, ..., Pi)>$\beta$ where sigmoid- sum-weight denotes the sigmoid-sum of weights. NEGATENEG searches for combinations of pos-atts and negated neg-atts {{P1, ..., Pi, (not N1), ... (not Nj )}{ ... } ... } such that sigmoid-sum-wt (P1, ..., Pi, Nj+1, ..., Nq)>$\beta$. Note that {Nj+1, ..., Nq} is the complement of {N1, ..., Nj} with respect to the set of all neg-atts.

Figure 7:
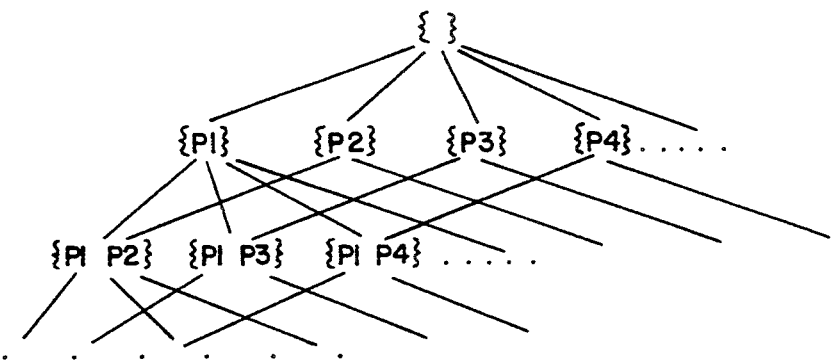
FIG. 7 is a tree diagram illustrating how the present invention searches for rules within a neural network.

The search tree in EXPLORE-POS shown in FIG. 7 starts with an empty set as the root node. A node is expanded by adding a new (not in the node) pos-att in all possible ways. Redundant nodes, nodes with conflicting attributes as declared (such as mutually exclusive attributes), and nodes with more than k attributes are pruned. Mutual exclusiveness can be declared explicitly for input attribute values, or can be deduced using theorem proving for hidden attributes once their necessary characteristics are learned. Suppose a node has l attributes. If the sigmoid-sum of their weights plus those of k−1 other strongest (strongest in terms of the absolute magnitude of associated weights), non-conflicting pos-atts is not greater than the $\beta$ value, then prune the node, because the node cannot produce any good confirming rule. A node kept in the tree will be put in the output set PA if the sigmoid-sum of the associated weights of all attributes contained in the node is greater than the $\beta$ value. Although the translation process attempts to find the most general rules, EXPLORE-POS may keep all nodes which meet the above condition. So, for example, if EXPLORE-POS accepts the combination of attributes A1 and A2, it also accepts the combination of attributes A1, A2, and A3. Though the latter combination is more restrictive (or specific) than the former, they may take different combinations of negated neg-atts in conjunction to form confirming rules and the subsumption relationship may no longer exist. Thus, EXPLORE-POS may keep all rather than the most general combinations of pos-atts under the predefined criterion. However, there is one case when a node needs not be further specialized; that is, when the attributes of the node in conjunction with all neg-atts (for mutually exclusive attributes, select the strongest one) yield a sigmoid-sum greater than the $\beta$ value. Under the circumstance, adding more pos-atts is not necessary. The depth of the search tree (or graph) will not exceed k.

The search of EXPLORE-POS is heuristic in that, as it generates the combinations of positive attributes a particular node or processing element, it does not supply unnecessary combinations to the processing element. An example may be useful in understanding this with reference to FIG. 7. Assuming that the single positive attribute P1 is sufficient to cause a processing element to have an activation level higher than $\beta$ (in other words the output concept of that processing element is confirmed), one knows that any other positive attributes combined with P1 will likewise confirm the output concept. Thus, the combinations {P1 P2}, {P1 P3}, {P1 P4} will necessarily result in the output concept being confirmed as well. Thus, those last three combinations may be included in a set PA without necessarily having to supply those input combinations to the processing element being tested. From the fact that P1 confirms the concept, and the knowledge that P2, P3, and P4 are positive attributes, one will realize that they in combination with P1 will confirm the concept.

The EXPLORE-POS program is further illustrated by programming design language corresponding to it as shown in Appendix B attached to the present application.

Figure 8:
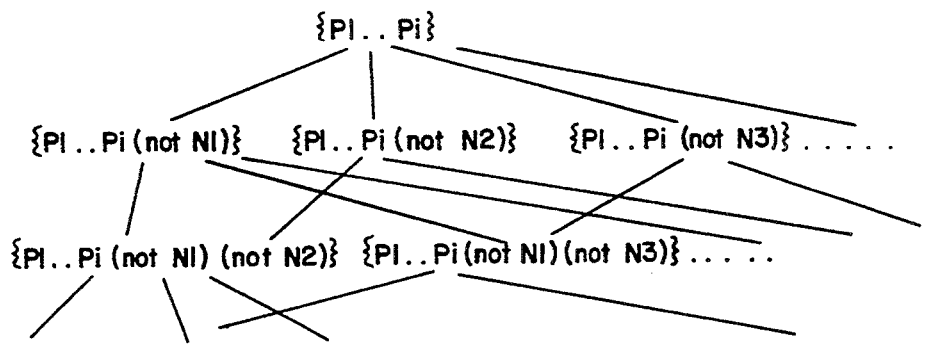
FIG. 8 is another tree diagram further illustrating how the present invention searches for rules.

The search tree shown in FIG. 8 in NEGATE-NEG (programming design language attached as Appendix C) starts with any combination of pos-atts (set PA) returned by EXPLORE-POS. A node is expanded by adding a new, negated neg-att in all possible ways. Redundant nodes, nodes with conflicting attributes as declared, and nodes with more than k attributes are pruned. A node kept in the tree will not generate successors if the sigmoid-sum of the associated weights of all non-negated attributes present plus those neg-atts absent in the node is greater than the $\beta$ value (the neg-atts absent in a rule may be present or absent in the environment, and we assume the worst scenario). Since the conjunction of all attributes in such a node is already strong enough to form a confirming rule, there is no need to add more negated neg-atts. Recall that the translation is intended to find the most general rules. Such a node will be put in the output.

Note that the output of NEGATE-NEG is a set (PAN) of premises to confirm the given concept. A confirming rule is formed by putting the conjunction of all members in a premise on the left hand side and the concept on the right hand side.

Consider a simple example here. Suppose the posatts and neg-atts relevant to forming rules for a certain concept are: P1, P2, P3, N1, N2, and N3; their respective associated weights are: 0.05, 0.09, 0.03, −0.05, −0.01, and −0.01. Assume that the nodal threshold for the concept $\Theta=0$, the sigmoid slope $\lambda=20$, $5<\lambda<30$, and $\beta=0.9$. Then, the combination of P1 and P2 ({P1 P2}) will be in the output of EXPLORE-POS since their sigmoid-sum is calculated to be 0.94. And the combination of P1, P2, negated N1 ({P1 P2 (not N1)}) will be in the output of NEGATE-NEG because the sigmoid-sum of P1, P2, N2, and N3 is 0.92.

The procedure FORM-DISCONFIRM-RULE of block 58 of FIG. 6 is similar to FORM-CONFIRM-RULE. The difference is that the roles of pos-atts and neg-atts are exchanged. It searches for rules each of which produces an activation level less than the $\alpha$ value for the given concept as long as its premise is true. The pruning heuristics are changed accordingly. EXPLORENEG generates a set NA and NEGATE-POS generates a set NAP.

The rules are kept in the most general form. In terms of the cost and the efficiency of using rules, general rules are more desirable than specific rules. Some machine learning programs perform maximally specific generalization when no sufficient number of counterexamples is available for learning.

To deal with multi-layer networks, the translation learns rules on a layer-by-layer basis, then rewrites rules to obtain rules which link attributes directly to a final (target) concept. In forming rules between a hidden layer and a concept, each hidden unit in the layer is treated as an attribute. Since this is not an original attribute, it is called a hidden attribute (or a hidden concept). The hidden attributes with non-zero weights are then categorized into pos-hidden-atts and neg-hidden-atts. The KT translator algorithm treats pos-hidden-atts and neg-hidden-atts the same as pos-atts and neg-atts respectively.

The purpose of rewriting is to eliminate undefined hidden concepts. However, if some hidden units encode useful intermediate concepts (e.g., the example above of membership in a family of mushrooms), they can be kept. In other words, predefined or useful hidden concepts are not rewritten. In this way, the present invention can generate a hierarchical rule-based system as well.

The procedure REWRITE of block 60, which follows block 58 of FIG. 6, rewrites rules of one layer in terms of rules of another layer. For example, in layer, there is one rule:

M1 and NOT (M2)→C.

"X→Y" reads "if X, then Y". In layer2, there are three rules:

A1 and NOT (B1)→M1.

A3→M1.

B2 and NOT (A2)→NOT (M2).

Rewriting rules of layer1 in terms of rules of layer2, we obtain:

A1 and NOT (B1) and B2 and NOT (A2)→C.

A3 and B2 and NOT (A2)→C.

This rewriting process is backward in the sense that the antecedent of a rule is rewritten on the basis of rules whose consequents deal with its antecedent. Every time, REWRITE rewrites rules of a layer in terms of rules of the next layer closer to the input of the net. Rewriting repeats until rules which associate attributes with final concepts result.

After each rewriting, if a rule contains an attribute and its negation, then delete the rule; if a rule contains conflicting attributes, then delete the rule; if a rule contains redundant attributes, then delete the redundant ones; remove redundant rules; in addition, remove a rule whose premise part is a superset of that of any other rule (that is, remove subsumption). A rule which cannot be rewritten will be discarded.

The present translator can learn rules based on a single case by focusing on those attribute combinations applicable to that case (the case-based mode). In the hidden layer, only those hidden units which get activated with the case input are considered for rule formation. Because of a smaller search space, more efficient search is permitted. This case-based mode is taken to supplement the general mode to learn rules.

The overall translation process of FIG. 6 including the generation of the layer set of rules and the rewriting of the rules is shown in detail by the translator program KT in the LISP language in Appendix D to the present application.

Figure 9:
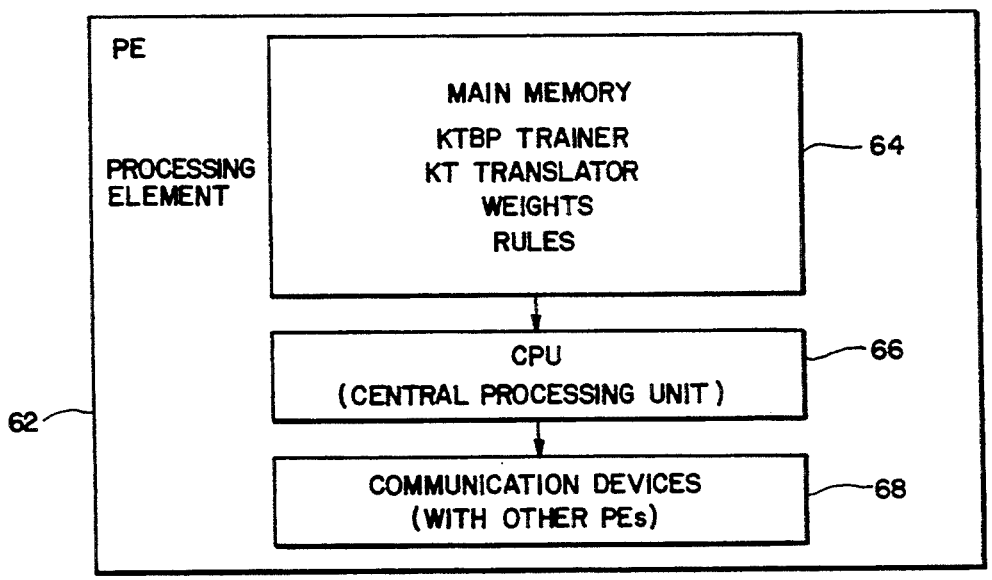
FIG. 9 shows the structure of a processing element which maybe used in a sophisticated version of the neural computer according to the present invention.

With reference now to FIG. 9, there is shown a processing element 62 which may be used in the arrangement of FIG. 3 in order to provide a neural computer. In other words, this may provide an alternative to the structure of FIG. 2 wherein the translator 34 is within the memory of a digital computer. The processing element 62 of FIG. 9 would, when configured with other such processing elements according to the structure of FIG. 3, realize a distributed computing network. The processing element 62 is sophisticated in that it includes a main memory 64 having the trainer and translator therein in addition to the weights and rules. The memory 64 is connected to a CPU 66 and in turn connected to communication devices 68 used to communicate with other such processing elements. By using a processing element as sophisticated as that of FIG. 9, with the structure of FIG. 3, one may realize a neural computer which, following its training, may translate and provide rules without requiring a separate digital computer to perform the translation process. In such a neural computer arrangement network training and rule translation are performed in parallel. Each processing element has its stored weights translated into rules independently and in parallel. Rewriting proceeds from the input towards the output on a layer-by-layer basis, but processing elements in each layer rewrite in parallel.

Figure 10:
FIG. 10 shows how a neural computer according to the present invention may supply rules to a digital computer rule-based expert system.

Following the use of a neural computer structured like FIG. 3 and using the sophisticated processing elements 62 of FIG. 9, such a neural computer shown as 70 in FIG. 10 could be connected to a digital computer 72 for supplying the rules thereto.

Figure 11:
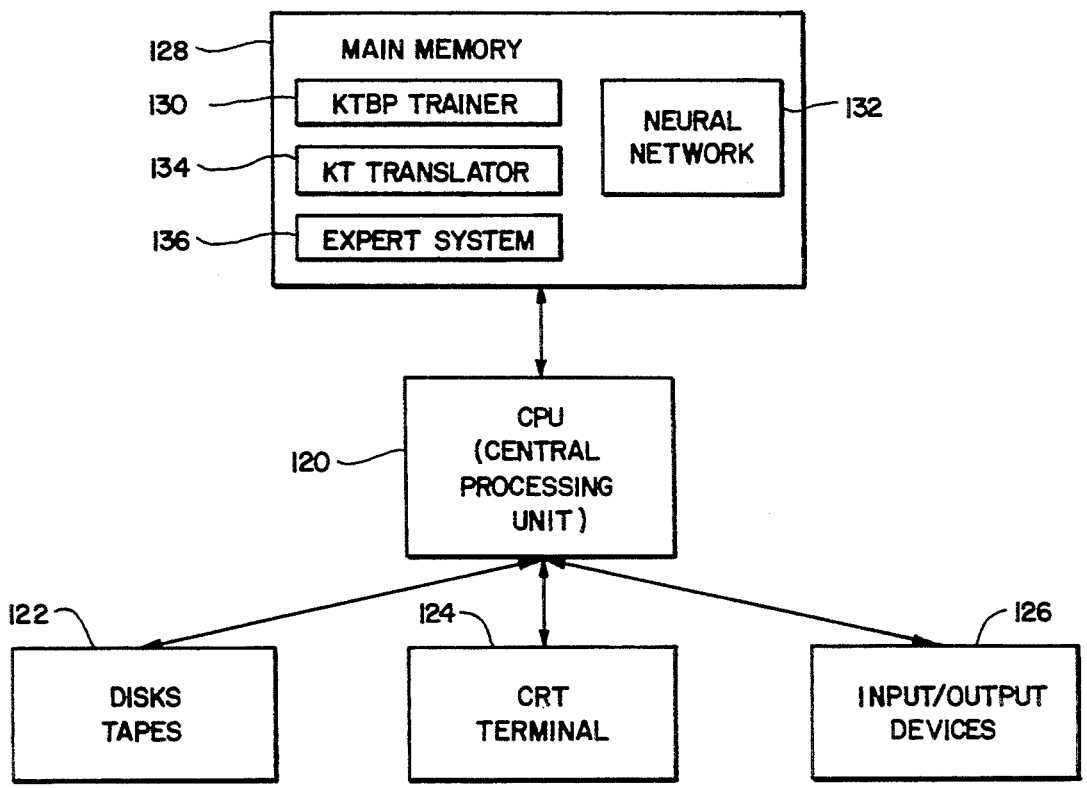
FIG. 11 shows the hardware configuration for an alternate embodiment of the present invention which uses a software neural network.

Turning now to FIG. 11, there is shown an alternate embodiment of the system of the present invention. The system 116 of FIG. 11 has the components with the same last two digits as the corresponding component, if any, from the embodiment of FIG. 2. The FIG. 11 embodiment uses a software neural network 132 which is disposed in the main memory 128. The software neural network 132 would be structured using software components corresponding to the processing elements and input nodes or input elements as discussed above. The memory 128 would also include trainer 130, translator 134, and expert system 136. The expert system 136 may be configured as shown in more detail for the expert system 36 of FIG. 2.

The memory 128 connects to the CPU 120, which in turn is connected to the disc/tapes 122, terminal 124, and input/output devices 126.

Note that the rules produced by any of the versions of the present invention may be printed so as to provide a written set of rules for use by a person.

The present invention (software version of FIG. 11) has been applied to create expert systems in several different domains. As a relatively simple problem, the present invention was used to provide an expert system on the characteristics of an exclusive or gate. The present invention easily found the four rules governing the exclusive or function. Although the exclusive or problem or function is a relatively small problem, it is nonlinear.

In addition to the exclusive or problem, the present invention has been applied to wind shear detection, genetic trait analysis, and mushroom classification.

In the domain of wind shear detection by infrared sensors, the present invention can efficiently produce a small set of rules from a neural network with nearly 100% mutual coincidence rate in prediction. In other words, the rules, which may be used as a rule base in an expert system, correspond well with the neural network.

In genetic trait analysis, the present invention has successfully identified five genes related to diabetic mellitus trait on mouse chromosome 3, 6, 9, 11, 17 among 62 genetic loci. The present invention offers a useful mechanism to appraise the phenotypic effect of gene combinations.

Figure 12:
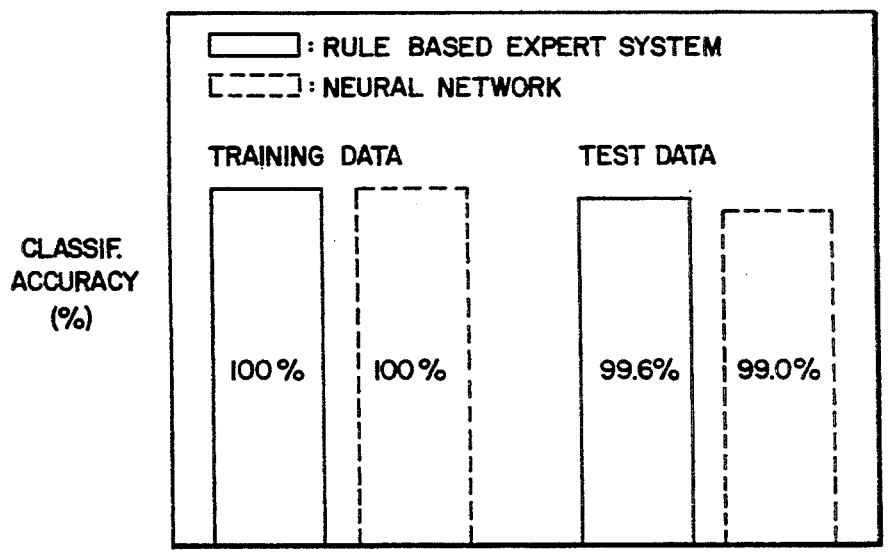
FIG. 12 is a chart showing the classification accuracy of a neural network and a rule-based expert system according to the present invention.

In the publicly accessible mushroom domain which contains 8,124 cases, the present invention generated a rule-based system of 233 rules based upon 1,000 training instances or cases. The neural network built for this domain included 127 input units (encoding 127 nominal feature values; there are 22 features, and the number of values for each feature ranges from 2 to 12), 63 hidden units, 2 output units, and 8,127 connections. The result of classification by the rule base system is given in FIG. 12. Unclassified cases refer to those cases which do not match any rule in the rule base. This rule-based system is able to classify the 1,000 training instances with 100% accuracy and a disjoint set of 1,000 test instances with 99.6 percent accuracy (both misclassified and unclassified cases were considered incorrect). The contrast in performance between the neural network and the rule-based system is shown in FIG. 12. Somewhat surprisingly, the rule-based system classified the test set more accurately than the neural network. This result may be explained by the capability of the present invention to sort out decision knowledge from information distributively entangled in the network; the loss of desired information versus noise seems negligible. Among the 233 rules, 67 rules are matched by at least one training instance. The other rules are statistically implied by the training instances and could be invoked by unseen instances. In other words, cases which were not used in training may be answered by the system. Appendix E to the present application includes a small number of the rules in IF-THEN form generated by the present invention relative to the mushroom example.

Although various specific structures and details have been presented herein, it is to be understood that these are for illustrative purposes only. Various modifications and adaptations will be apparent to those of skill in this art. Accordingly, the scope of the present invention should be determined by reference to the claims appended hereto.

APPENDIX A:   KTBP Trainer

```
; The suggested learn rate: 0.0015
; -----------------------------------------------------
; To use, (ktbp)      ////  Copyright 1991 University of Florida
; -----------------------------------------------------

(defun act-combine (l)
        (apply #'+ l))

(defun pos-neg (l) (prog (x y z)
        (setq x l)(setq y nil)(setq z nil)
        lp (cond((null x)(return (list y z))))
        (cond((< (car x) 0)(setq z (cons (- (car x)) z)))
             (t (setq y (cons (car x) y))))
        (setq x (cdr x))
        (go lp)))

(defun act-combine1 (l)(prog(x y)
        (cond((null l)(return 0)))
        (setq x (cdr l))(setq y (car l))
        lp(cond((null x)(return y)))
        (setq y (+ y (car x) (- (* y (car x)))))
        (setq x (cdr x))
        (go lp)))

(defun cal-act2 (n)
        (cond((numberp (get n 'act2))(get n 'act2))
             (t (cal-act n))))

(defun threshold-sign (a b) (prog(x y z w)
        (cond((null a)(return '(0))))
        (setq x a)(setq y b)(setq z nil)
        lp(cond((null x)(return z)))
           (cond((null (car y))(setq w (car x)))
                ((equal (car y) '-) (setq w (- (car x))))
                (t (setq w (car x))))
           (setq w (squash w))
           (setq z (append z (list w)))
           (setq x (cdr x))
           (setq y (cdr y))
           (go lp)))

(defun null-zero (a)
        (cond((numberp a) a)(t 0)))

(defun s-assoc (k l)
        (cond((null l) nil)
             ((or (equal k (caar l))(and (eq (car k) (cadr (caar l)))
                                         (eq (cadr k) (caaar l))))
              (car l))
             (t (s-assoc k (cdr l)))))

(defun eff-act (a b) (prog(x y z w)
        (setq x (cdr a))(setq y (cdr b))(setq z (list (car a)))(setq w (car b))
        lp(cond((or (null x)(null y))(return z)))
           (cond((< (car y) w)(setq z (list (car x)))(setq w (car y)))
                ((= (car y) w)(setq z (cons (car x) z))))
           (setq x (cdr x))
           (setq y (cdr y))
           (go lp)))
```

```
(defun forward-propagate1(1)
    (setq cur-layer 1)
    (mapcar #'cal-act (cadr (assoc 1 layer-node-lst))))

(defun forward-propagate nil
    (assign-act (cadr (assoc (car layer-order) layer-node-lst))
        (car cur-sample))
    (mapcar #'forward-propagate1 (cdr layer-order)))

(defun forward-propagate1-test(1)
    (setq cur-layer 1)
    (mapcar #'cal-act (cadr (assoc 1 layer-node-lst))))

(defun forward-propagate-test nil
    (assign-act (cadr (assoc (car layer-order) layer-node-lst))
        (car cur-sample))
    (mapcar #'forward-propagate1-test (cdr layer-order)))

(defun assign-act (l s)
    (cond((null l) nil)
        (t
            (setf (get (car l) 'act) (car s))
            (assign-act (cdr l) (cdr s)))))

(defun my-truncate(n)
    (cond((or (> n 1)(< n -1))(truncate n))
        (t 0)))

(defun cal-error-output nil (prog(x y z)
    (setq x (cadr cur-sample))
    (setq y (cadr (assoc (car (reverse layer-order)) layer-node-lst)))
    (setq z (mapcar #'(lambda(e)(get e 'act)) y))
    lp(cond((null x)(return nil)))
    (cond((numberp (car x))
        (setf (get (car y) 'error)
            (* 20 (car z) (- 1 (car z))(- (car x) (car z))))))
    (setq x (cdr x))
    (setq y (cdr y))
    (setq z (cdr z))
    (go lp)))

(defun find-max(l v)(prog(x y z w)
    (setq x (cdr l))(setq y (cdr v))(setq z (car l))(setq w (car v))
    lp(cond((or (null x)(null y))(return z)))
    (cond((< w (car y) )(setq z (car x))(setq w (car y))))
    (setq x (cdr x))
    (setq y (cdr y))
    (go lp)))

(defun cal-error1 (l)
    (mapcar #'cal-error11 (cadr (assoc l layer-node-lst))))

(defun cal-error11 (n)(prog(x y e)
    (cond((numberp (get n 'error))(return nil)))
    (setq y (get n 'act))
    (setq x (get-connb-wts cur-layer n))
    (setq e (dot-product x (mapcar #'(lambda(e)(get e 'error))
        (cadr (assoc (output-layer cur-layer layer-order)
            layer-node-lst)))))
    (setq e (* 20 e y (- 1 y)))
    (setf (get n 'error) e)(return e)))

(defun get-connb-wts (l n)
    (setq p (position n (cadr (assoc l layer-node-lst))))
    (cond((member 'b (cadr (assoc (car layer-order) layer-node-lst)))
        (setq p (1+ p))))
    (mapcar #'(lambda(e)(nth p e)
        )
        (cadr (assoc (output-layer l layer-order)
            cur-conn-wt))))
```

```
(defun my-inv (n)
        (cond((< n 0.000001) 0)
                    (t (/ 1 n))))

(defun combine-2(e)
        (list (mapcar #'car e) (mapcar #'cadr e)))

(defun get-p (l)
        (cons (car l) (get-pl (cadr l) (caddr l))))

(defun get-pl (a b)
        (cond((null a) nil)
                    (t (cons (list (car a) (car b)) (get-pl (cdr a) (cdr b))))))

(defun s-member (k l)
      (cond((null l) nil)
           ((or (equal k (car l))(and (eq (car k) (cadr (car l)))
                                     (eq (cadr k) (caar l))))
            t)
           (t (s-member k (cdr l)))))

(defun cal-error nil (prog(x xl y f)
      (setq x (cdr (reverse (cdr layer-order))))
      (cal-error-output)
      lp(cond((null x)(return nil)))
      (setq cur-layer (car x))
      (cal-errorl (car x))
      (setq x (cdr x))
      (go lp)))

(defun clean-eff-conn nil (setq eff-conn nil))

(defun clean-prop nil
      (mapcar #' (lambda(e) (remprop e 'act)(remprop e 'error)) node-lst))

(defun clean-act nil
      (mapcar #' (lambda(e) (remprop e 'act))
                              node-lst))

(defun ktbp nil (prog(c s gc lc pc)
      (setq c 0)
      (set-s-file)
      (terpri)(princ "Cylces: ")(setq cycles (read))
      (terpri)(princ "Learning rate: ")(setq learn-rate (read))
          (terpri)(princ "Weight upper bound: ")(setq wt-ub (read))
          (terpri)(princ "Weight lower bound: ")(setq wt-lb (read))
          (terpri)(princ "Output file: ")(setq o-file (read))
          (terpri)(princ "Show per cycles: ")(setq per-c (read))
      (setq diag-lst nil)(setq error-lst nil)
          (create-ini-conn-wt)
      (setq cur-conn-wt ini-conn-wt)
      ; (setq s samples)
      (setq gc 1) (setq lc 1)(setq pc per-c)
      (terpri)(princ "Begin!")
      (test-error-top)
      lp(cond((> gc cycles) (test-error-top)
                              (write-out)
                              (terpri)(princ "Error curve:")(princ error-lst)(terpri)
                              (terpri)(princ "Diagnostic accuracy curve:")
                              (princ diag-lst)(terpri)
                              (close is2)(delete-file "tem.sam")
                              (close is3)(delete-file "tes.sam")
                              (return t)))
            (cond((= c sample-no)(setq c 0)(close is2)
                  (setq is2 (open "tem.sam" :direction :input))))
            (setq cur-sample (read is2))
            (clean-eff-conn)
            (clean-prop)
            (forward-propagate)
            (backward-propagate)
            (cond((> lc per-c) (terpri)(princ "cycle #: ")(princ pc)
                  (setq lc (- lc per-c))(setq pc (+ pc per-c))(test-sl-error)))
```

```
            (setq gc (+ gc 1))
            (setq lc (+ lc 1))
            (setq c (1+ c))
            (go lp)))

(defun set-s-file nil
       (setq sample-no (length samples))
       (with-open-file (os2 "tem.sam" :direction :output)
       (mapcar #'(lambda(e)(print e os2)) samples) t)
       (with-open-file (os3 "tes.sam" :direction :output)
       (mapcar #'(lambda(e)(print e os3)) samples) t)
       (setq samples nil)
       (setq is2 (open "tem.sam" :direction :input))
       (setq is3 (open "tes.sam" :direction :input))
       t)

(defun test-sl-error nil (prog(x y z e)
       (setq x (cadr cur-sample))
       (setq y (cadr (assoc (car (reverse layer-order)) layer-node-lst)))
       (setq z (mapcar #'(lambda(e)(get e 'act)) y))
       (setq e (/ (apply #'+
       (mapcar2 #'(lambda(a b)(expt (- a b) 2)) x z) )
       (length x)))
       (terpri)(princ "Error: ")(princ e)(return e)
       ))

(defun create-ini-conn-wt nil
       (cond((or (not (boundp 'ini-conn-wt))(null ini-conn-wt))
       (setq ini-conn-wt
       (mapcar #'(lambda(e)(list e (create-ini-wtl e))) (cdr layer-order))))))

(defun create-ini-wtl (l)(prog(c1 c2 x y)
       (setq d1 (length (cadr (assoc l layer-node-lst))))
       (setq d2 (length (add-b l (cadr (assoc (input-layer l layer-order)
       layer-node-lst)))))
       (setq c1 0)(setq c2 0)
            (setq r-count 1)
       (setq y nil)
lp1(cond((= c1 d1)(return y)))
       (setq x nil)
       (setq c2 0)
lp2(cond((= c2 d2)(setq c1 (1+ c1))(setq y (append y (list x)))
       (go lp1)))
       (setq x (append x (list (random-gen))))
       (setq c2 (1+ c2))
       (go lp2)))

(defun add-b (l ns)
       (cond((and (member 'b (cadr (assoc (car layer-order) layer-node-lst)))
            (member l (cddr layer-order)))(cons 'b ns))
            (t ns)))

(defun random-gen nil
       (/ (- (random 100) 50) 1000.0))

(defun test-error-top nil (prog(x)
       (setq x (test-error))
       (setq diag-lst (append diag-lst (list (cadr x))))
       (setq error-lst (append error-lst (list (car x))))
            (terpri)(princ "error: ")(princ (car x))
            (terpri)(princ "diagnostic accuracy: ")(princ (cadr x))
       (return nil)))

(defun write-out nil
       (with-open-file (x o-file :direction :output)
            (princ "(setq trained-conn-wt '(" x)(terpri x)
            (mapcar #'(lambda(e)(princ e x)(terpri x)) cur-conn-wt)
            (terpri x)
            (princ "))" x)
            (terpri x)
            (princ "(setq error-lst '" x)
```

```
                (princ error-lst x)
                (princ ")" x)
                (terpri x)
                (princ "(setq diag-lst '" x)
                (princ diag-lst x)
                (princ ")" x)
                (terpri x)))

(defun update-wt (l)
        (setq array-wts (cadr (assoc l cur-conn-wt)))
        (setq l1 (length array-wts))
        (setq l2 (length (car array-wts)))
        (update-wt1 l)
            (setq cur-conn-wt (insert-back (list l array-wts) cur-conn-wt)) t)

(defun insert-back (l ls)
        (cond((null ls) nil)
              ((eq (car l) (caar ls))(cons l (cdr ls)))
              (t (cons (car ls) (insert-back l (cdr ls))))))

(defun convert-to-lst (a d1 d2)(prog(c1 c2 x y)
        (setq c1 0)(setq c2 0)
        (setq y nil)
        lp1(cond((= c1 d1)(return y)))
        (setq x nil)
        (setq c2 0)
        lp2(cond((= c2 d2)(setq c1 (1+ c1))(setq y (append y (list x)))
        (go lp1)))
        (setq x (append x (list (aref a c1 c2))))
        (setq c2 (1+ c2))
        (go lp2)))

(defun update-wt1 (l)
        (setq cur-layer l)
        (mapcar #'update-wt11 (cadr (assoc l layer-node-lst))))

(defun update-wt11 (n) (prog(c d x der p  nw nws)
        (setq c 0)
        (setq nws nil)
        (setq x (add-b cur-layer (cadr (assoc (input-layer cur-layer
            layer-order) layer-node-lst) )))
        (setq p (position n (cadr (assoc cur-layer layer-node-lst))))
        lp(cond((null x)
        (setq array-wts
        (update-array-wt array-wts p  nws))
                (return nil)))
                (setq nw (nth c (nth p array-wts)))
        (cond( (and (not (= 0 (get n 'error)))
                (not (s-member (list n (car x)) unmod-wt)))
        (setq d  (* learn-rate (get n 'error) (get (car x) 'act)))
        (setq nw (+ nw d))
        (setq nw (set-to-range nw))    ))
        (setq nws (append nws (list nw)))
        (setq x (cdr x))
        (setq c (1+ c))
        (go lp)))

(defun update-array-wt (a d1 w)(prog(c x y)
            (setq x a)
            (setq c 0)(setq y nil)
            lp(cond((= c (length a))(return y)))
            (cond
                ((= c d1)(return
                    (setq y (append y (list w)  (cdr x))) )))
            (setq y (append y (list (car x))))
            (setq x (cdr x))
            (setq c (1+ c))
            (go lp)))

(defun replace-nth (d nw ows)(prog(n c x y)
        (setq x ows)
```

```
             (setq c 0)(setq y nil)(setq n (length ows))
             lp(cond((= c n)(return y)))
             (cond((= c d)(setq y (append y (list nw))))
                  (t (setq y (append y (list (car x))))))
             (setq c (1+ c))
             (setq x (cdr x))
             (go lp)))

(defun set-to-range (n)
       (cond((> n wt-ub) wt-ub)
            ((< n wt-lb) wt-lb)
            (t n)))

(defun update-conn-wt (l w)
       (setf (get (implode l) 'connwt) w))

(defun s-equal (a b)
       (cond((or (atom a) (atom b)) nil)
            (t (or (equal a b)
                   (and (eq (car a) (cadr b))(eq (cadr a)(car b)))))))

(defun backward-propagate nil
       (cal-error)
       (mapcar #'update-wt (cdr layer-order)))

; (defun expt (b e) (prog(c x)
;           (setq c 0)(setq x 1)
;           lp(cond((= c e)(return x)))
;           (setq x (* x b))
;           (setq c (+ c 1))
;           (go lp)))

(setq *print-level* nil)
(setq *print-length* nil)

(defun roundoff (n) n)

; (defun squash (n) (/ 1 (+ 1 (exp (- n)))))
; The slope is 20 times steep.
; use learn rate = 0.001-0.005

(defun squash (n) (/ 1 (+ 1 (exp (- (* 20 n))))))

; same as nlinear.lsp except
; CAL-CF and CAL-CF-TEST, there is the variable SPECIAL-NODE
; which serves as the offset for gated data (defun thresholding (n) (squash n))

(defun thresholding2 (n) (cond((> n 0) 1)(t 0)))

(defun roundoff (n) n)

(defun cal-act (n) (prog (x y z w u ul)
       (cond((numberp (get n 'act)) (return (get n 'act))))
                              (setq y (get-connf-wts cur-layer n))
                              (setq w (mapcar #'cal-act (add-b cur-layer
                                  (cadr (assoc (input-layer
                                     cur-layer layer-order) layer-node-lst)))))
                              (setq u (dot-product y w))
                              (setq z (roundoff (squash u)))
                              (setf (get n 'act) z)
                              (return z)))

(defun get-connf-wts (l n)
       (nth (position n (cadr (assoc l layer-node-lst)))
            (cadr (assoc l cur-conn-wt))))
```

```
(defun input-layer (l ls)
        (cond((null ls) nil)
             ((eq l (cadr ls)) (car ls))
             (t (input-layer l (cdr ls)))))

(defun output-layer (l ls)
        (cond((null ls) nil)
             ((eq l (car ls)) (cadr ls))
             (t (output-layer l (cdr ls)))))

(defun dot-product (l1 l2)
        (cond((not (equal (length l1)(length l2))) 0)
             (t (apply #'+
                  (mapcar2 #'* l1 l2)))))

(defun test-error nil (prog(c a e ss x y y1 z)
      (setq c 0)
      ; (setq ss samples)
      (setq e 0)(setq a 0)
      up(cond((= c sample-no)
              (close is3)(setq is3 (open "tes.sam" :direction :input))
              (setq e  (/ (/ e  sample-no)
                            (length (cadr cur-sample))))
              (setq a (/ a  sample-no))
              (return (list e a))))
      (setq cur-sample (read is3))
      (clean-act)
      (forward-propagate-test)
      (setq x (cadr cur-sample))
          (setq y (apply #'append
                   (mapcar #'(lambda(e) (cadr (assoc e layer-node-lst)))
                             (reverse  (cdr layer-order)))))
      (setq y1 (cadr (assoc (car (reverse layer-order))
                            layer-node-lst)))
      (setq z (mapcar #'(lambda(e)(get e 'act)) y))
      (cond ((= (length x) 1)(cond
             ((< (abs (-  (car x)  (car z))) 0.5)(setq a (+ a 1)))))
            ((eq (find-max y1 x) (find-max y1 z))
             (setq a (+ a 1))))
      llp(cond((null y1) (setq c (1+ c))(go up))
      (cond((numberp (car x))
      (setq e (+ e (expt (- (car x) (car z)) 2)))))
      (setq x (cdr x))
      (setq y (cdr y))
      (setq y1 (cdr y1))
      (setq z (cdr z))
      (go llp)))

(defun implode (l)
        (intern (eval (append (list
           'concatenate '(quote(string)))
           (mapcar #'(lambda(e)(string e)) l)))))

(defun mapcar2(f l1 l2)
        (cond((null l1) nil)
             ((not (equal (length l1)(length l2))) nil)
             (t (cons (funcall f (car l1) (car l2))
                   (mapcar2 f (cdr l1) (cdr l2))))))
           'concatenate '(quote(string)))
           (mapcar #'(lambda(e)(string e)) l))))

(defun pack (l)
        (implode (mapcar #'(lambda(e)(cond((numberp e)
                  (cadr (assoc e
                      '((1 |1|)(2 |2|)(3 |3|)(4 |4|)(5 |5|)
```

```
                    (6 |6|)(7 |7|)(8 |8|)(9 |9|)(0 |0|)) )))
          (t e))) 1))))

(defun my-gensym nil
      (cond((not (boundp 'gensym-c))(setq gensym-c 0)))
      (pack (append '(new-h) (convert-n-l (setq gensym-c (+ 1 gensym-c))))))

(defun convert-n-l (n)(prog(x y)
      (setq x n)
      (setq y nil)
      lp(cond((< x 10)(return (cons x y))))
      (setq y (cons (mod x 10) y))
      (setq x (floor x 10))
      (go lp)))

(defun dot-product (l1 l2)
      (cond((not (equal (length l1)(length l2))) 0)
           (t (apply #'+
               (mapcar2 #'* l1 l2)))))

(defun simi-measure2 (v1 v2)
      (- 1 (/ (length-v (mapcar2 #'- v1 v2))(+ (length-v v1)(length-v v2)))))

(defun kt-simi-measure2 (v1 v2)
      (setq x (sub-v v1 input-dim))
      (setq y (sub-v v2 input-dim))
      (- 1 (/ (length-v (mapcar2 #'- x y))(+ (length-v x)(length-v y)))))

(defun kt-simi-measure1 (v1 v2)
      (setq x (normalize-v (sub-v v1 input-dim)))
      (setq y (normalize-v (sub-v v2 input-dim)))
      (dot-product x y))

(defun sub-v (v d)(prog(c y)
      (setq y nil)
      (setq c 0)
      lp(cond((= c d)(return y)))
      (setq y (append y (list (nth c v))))
      (setq c (1+ c))
      (go lp)))

(defun mapcar2(f l1 l2)
      (cond((null l1) nil)
           ((not (equal (length l1)(length l2))) nil)
           (t (cons (funcall f (car l1) (car l2))
                (mapcar2 f (cdr l1) (cdr l2))))))

(defun mapcar4(f l1 l2 l3 l4)
      (cond((null l1) nil)
           ((not (equal (length l1)(length l4))) nil)
           (t (cons (funcall f (car l1) (car l2)(car l3)(car l4))
                (mapcar4 f (cdr l1) (cdr l2)(cdr l3)(cdr l4))))))

(defun mapcar5(f l1 l2 l3 l4 l5)
      (cond((null l1) nil)
           ((not (equal (length l1)(length l5))) nil)
           (t (cons (funcall f (car l1) (car l2)(car l3)(car l4)(car l5))
                (mapcar5 f (cdr l1) (cdr l2)(cdr l3)(cdr l4)(cdr l5))))))

(defun length-v (l)
      (sqrt (apply #'+
            (mapcar #'(lambda(e)(expt e 2)) l))))

(defun normalize-v (l)
      (setq v-length (sqrt (apply #'+
            (mapcar #'(lambda(e)(expt e 2)) l))))
      (mapcar #'(lambda(e)(/ e v-length)) l))

(defun float-v (l)
      (mapcar #'float l))

(defun kt-cluster nil (prog(x y)
```

```
(cond((not(boundp 'sigma))(setq sigma 0.7)))
(cond((not(boundp 'p-width))(setq p-width 7)))
(setq ini-conn-wt nil)
(setq cluster-lst nil)
(princ "Welcome to Fu's kt-cluster program!")
(terpri)
(princ "Do not forget to load the network file and
the trained result file.")
(terpri)
(princ "output-file: ")
(setq o-file (read))
(setq y (cdr (reverse (cdr (reverse layer-order)))))
lp1(cond((null y)(write-out-nn)
        (return t)))
    (setq instance-lst (build-instance (car y)))
    (setq x instance-lst)
    lp2(cond((null x)(final-check)(set-nn-para (car y) cluster-lst)
            (setq cluster-lst nil)
            (setq y (cddr y))(go lp1)))
    (kt-cluster1 (float-v (car x)))
    (setq x (cdr x))
    (go lp2)))

(defun build-instance (l)
    (setq x (add-b l
        (cadr (assoc (input-layer l layer-order) layer-node-lst))))
    (setq b (car (cadr (assoc (car layer-order) layer-node-lst))))
    ; assume the first node in the first layer is the bias unit
    (cond((not (member b x))(setq x (cons b x))))
    (setq y (cadr (assoc (output-layer l layer-order) layer-node-lst)))
    (setq z (cadr (assoc l layer-node-lst)))
    (setq input-dim (length x))
    (setq output-dim (length y))
    (mapcar #'(lambda(e)(keep-top-7 (length x)
            (append (get-connf-wts l e) (get-connb-wts l e))
                )) z))

(defun get-connf-wts (l n)
    (nth (position n (cadr (assoc l layer-node-lst)))
        (cadr (assoc l trained-conn-wt))))

(defun get-connb-wts (l n)
    (setq p (position n (cadr (assoc l layer-node-lst))))
    (cond((member 'b (cadr (assoc (car layer-order) layer-node-lst)))
            (setq p (1+ p))))
    (mapcar #'(lambda(e)(nth p e)
            )
        (cadr (assoc (output-layer l layer-order)
        trained-conn-wt))))

(defun keep-top-7 (lh l)   ; keep top half of rule-size (seven) input wts
                           ; in terms of absolute values
    (prog(y z w u)
    (setq y (sub-v l lh))
    (setq z (reverse (sub-v (reverse l) (- (length l) lh))))
    (setq w (my-sort y #'(lambda(a b)(cond((> (abs a) (abs b)) )))))
    (setq u (nth (truncate (* 0.5 p-width)) w))
    (cond((null u) nil)(t
    (setq y (mapcar #'(lambda(e)(cond((>= (abs e) (abs u))  e)(t 0))) y))))
    (return (append y z))))

(defun set-nn-para (l cs)
    (setq x (add-b l
        (cadr (assoc (input-layer l layer-order) layer-node-lst))))
    (setq b (car (cadr (assoc (car layer-order) layer-node-lst))))
    ; assume the first node in the first layer is the bias unit
    (cond((not (member b x))(setq x (cons b x))))
    (setq y (cadr (assoc (setq ol (output-layer l layer-order))
        layer-node-lst)))
```

```
        (setq layer-node-lst
        (replace-node l (list l (mapcar #'car cs)) layer-node-lst))
        (setq ini-conn-wt (append ini-conn-wt (list (list l
        (mapcar #'(lambda(e)
                (setq n -1)
                (mapcar #'(lambda(m)(setq n (1+ n))
                (nth n (caddr e)))    x )  )
                cs)     ))))
        (setq bws (mapcar #'(lambda(e)(car e))
            (cadr (assoc ol trained-conn-wt))))
        (setq ini-conn-wt (append ini-conn-wt (list (list
        ol    (add-bw bws (get-column
        (mapcar #'(lambda(e)
                (setq n (- (length x) 1))
                    (mapcar #'(lambda(m)(setq n (1+ n))
                (* (cadr e)(nth n (caddr e)))
                    y))
                    cs)     ))))  )  )
                )

(defun add-bw (w l)
        (mapcar2 #'(lambda(a b)(cons a b)) w l))

(defun get-column (m)(prog(c l y)
        (setq y nil)
        (setq c 0)
        (setq l (length (car m)))
        lp(cond((= c l)(return y)))
        (setq y (append y (list
            (mapcar #'(lambda(e)(nth c e)) m))))
        (setq c (1+ c))
        (go lp)))

(defun replace-node (l ns ls)
        (cond((null ls) nil)
            ((eq l (caar ls))(cons ns (cdr ls)))
            (t (cons (car ls) (replace-node l ns (cdr ls))))))

(defun nil-to-0 (n)
        (cond((null n) 0)(t n)))

(defun input-layer (l ls)
        (cond((null ls) nil)
            ((eq l (cadr ls))  (car ls))
            (t (input-layer l (cdr ls)))))

(defun output-layer (l ls)
        (cond((null ls) nil)
            ((eq l (car ls))  (cadr ls))
            (t (output-layer l (cdr ls)))))

(defun kt-cluster1 (i) (prog(x y)
        (setq x cluster-lst)
        lp(cond((null x)
            (return (setq cluster-lst
                (append cluster-lst (list (list (my-gensym)
                    1 i
                    (mapcar #'(lambda(e) 0) i)
                    (max-min-p2 i)))))))
        (cond((> (kt-simi-measure1 i (caddr (car x))) sigma)
            (setq y (update-cluster (car x) i))
            (return (setq cluster-lst
                (my-subst y (car x) cluster-lst)))))
        (setq x (cdr x))
        (go lp)))

(defun my-subst (a b c)
        (cond((null c) nil)
```

```
          ((equal b (car c))(cons a (cdr c)))
          (t (cons (car c) (my-subst a b (cdr c)))))))

(defun max-min-p2 (l)
      (mapcar #'(lambda(e) (list e e)) l))

(defun update-cluster (c i)
      (list (car c) (+ 1 (cadr c))
            (setq x (new-average (cadr c) (caddr c) i))
            (mapcar4 #'(lambda(e1 e2 e3 e4) (update-sd (cadr c) e1 e2 e3 e4))
                  (cadddr c) (caddr c) x i)
            (max-min-p1 (cadddr (cdr c)) i)))

(defun new-average (n v1 v2)
      (mapcar2 #'(lambda(e1 e2)(/ (+ (* n e1) e2) (+ n 1))) v1 v2))

(defun max-min-p1 (v1 v2)
      (mapcar2 #'(lambda(e1 e2)(cond((< e2 (car e1))(list e2 (cadr e1)))
                  ((> e2 (cadr e1))(list (car e1) e2))
                  (t e1))) v1 v2))

(defun max-min-p3 (v1 v2)
      (mapcar2 #'(lambda(e1 e2) (list (min (car e1)(car e2))(max (cadr e1)(cadr e2
                  v1 v2))

(defun write-out-cluster nil
          (with-open-file (x o-file :direction :output)
                (princ "(setq cluster-lst '(" x)
                (mapcar #'(lambda(e)(print e x)) cluster-lst)
                (princ "))" x)  ))

(defun which-cluster (i)(prog(x)
          (setq x cluster-lst)
          lp(cond((null x)(return nil)))
            (cond((> (kt-simi-measure1 i
                              (caddr (car x))) sigma)
                  (return (caar x))))
            (setq x (cdr x))
            (go lp)))

(defun sd (l)
      (cond((equal 1 (length l)) 0)
          (t
            (sqrt (/ (-
                  (apply #'+ (mapcar #'(lambda(e) (expt e 2)) l))
                  (* (length l)
                        (expt (/ (apply #'+ l) (length l)) 2)))
                  (- (length l) 1))))))

(defun update-sd (n s ao an i)
      (sqrt (/ (+ (* (- n 1) (expt s 2))
                  (* n (expt ao 2))
                  (expt i 2)
                  (- (* (+ n 1)(expt an 2))))
            n)))

(defun update-sd-2c(n1 s1 ao1 n2 s2 ao2 an)
      (sqrt (/ (+
                  (* (- n1 1)(expt s1 2))
                  (* n1 (expt ao1 2))
                  (* (- n2 1)(expt s2 2))
                  (* n2 (expt ao2 2))
                  (- (* (+ n1 n2)(expt an 2))))
            (+ n1 n2 (- 1)))))

(defun update-mean-2c(n1 ao1 n2 ao2)
      (mapcar2 #'(lambda(e1 e2) (/ (+ (* n1 e1)(* n2 e2)) (+ n1 n2))) ao1 ao2))
```

```
(defun merge-2c(c1 c2)
      (list (pack (list (car c1)(car c2))) (+ (cadr c1) (cadr c2))
            (setq x (update-mean-2c (cadr c1) (caddr c1) (cadr c2)(caddr c2)))
            (mapcar5 #'(lambda(e1 e2 e3 e4 e5) (update-sd-2c
            (cadr c1) e1 e2 (cadr c2) e3 e4 e5))
            (cadddr c1) (caddr c1) (cadddr c2) (caddr c2) x)
            (max-min-p3 (cadddr (cdr c1)) (cadddr (cdr c2))))))

(defun final-check nil (prog (x)
      (cond((not(boundp 'sigma))(setq sigma 0.8)))
      (setq x  (cdr cluster-lst))
      (setq cluster-lst (list (car cluster-lst)))
      lp(cond((null x)(return cluster-lst)))
      (final-check1 (car x))
      (setq x (cdr x))
      (go lp)))

(defun final-check1 (c) (prog(x y)
      (setq x  cluster-lst)
      lp(cond((null x)
              (return (setq cluster-lst
                  (append cluster-lst (list c))))))
          (cond((> (kt-simi-measure1 (caddr  c) (caddr (car x))) sigma)
                  (setq y (merge-2c c (car x)))
                  (return (setq cluster-lst
                       (my-subst y (car x) cluster-lst)))))
      (setq x (cdr x))
      (go lp)))

(defun my-remove (m l)
       (cond((null l) nil)
            ((equal m (car l)) (cdr l))
            (t (cons (car l) (my-remove m (cdr l))))))

(defun s-assoc (k l)
         (cond((null l) nil)
              ((or (equal k (caar l))(and (eq (car k) (cadr (caar l)))
                                          (eq (cadr k) (caaar l))))
                (car l))
              (t (s-assoc k (cdr l)))))

; modified from gennn.lsp
; assume fully connected between adjacent layers

; The input is a layer-node-lst and ini-conn-wt
;    (setq layer-node-lst '((l1 (a1 a2 ..))(l2 (m1 m2 ..)) ..))
;    (setq point-conn-lst '((a1 m1)(a2 m2)..))   means if a1 then m1,....
;  Note you can set sampleno, else it will be set by default (defun write-out-nn nil
     (setq node-lst (apply #'append (mapcar #'cadr layer-node-lst)))
     (setq unmod-wt nil)
     (cond((not (boundp 'mex-lst))(setq mex-lst nil)))
     (with-open-file (os o-file :direction :output)
         (mapcar #'(lambda(e) (princ "(setq " os)(princ e os)(princ "(quote" os)
                    (terpri os)(princ (eval e) os)(terpri os)
                    (princ "))" os)(terpri os))
              '(node-lst layer-node-lst layer-order mex-lst
                   unmod-wt ini-conn-wt samples))) t )

(defun my-sort (l f)
       (setq l1 (copy-list l))
       (sort l1 f))

(defun add-b (l ns)
       (cond((and (member 'b (cadr (assoc (car layer-order) layer-node-lst)))
              (member l (cddr layer-order)))(cons 'b ns))
              (t ns)))
```

```
        (intern (eval (append (list
          'concatenate '(quote(string)))
          (mapcar #'(lambda(e)(string e)) l)))))

(defun pack (l)
    (implode (mapcar #'(lambda(e)(cond((numberp e)
                  (cadr (assoc e
                    '((1 |1|)(2 |2|)(3 |3|)(4 |4|)(5 |5|)
                      (6 |6|)(7 |7|)(8 |8|)(9 |9|)(0 |0|))) ))
                  (t e))) l)))

(defun my-gensym nil
    (cond((not (boundp 'gensym-c))(setq gensym-c 0)))
    (pack (append '(new-h) (convert-n-l (setq gensym-c (+ 1 gensym-c))))))

(defun convert-n-l (n)(prog(x y)
    (setq x n)
    (setq y nil)
    lp(cond((< x 10)(return (cons x y))))
    (setq y (cons (mod x 10) y))
    (setq x (floor x 10))
    (go lp)))

(defun dot-product (l1 l2)
    (cond((not (equal (length l1)(length l2))) 0)
         (t (apply #'+
              (mapcar2 #'* l1 l2)))))

(defun simi-measure2 (v1 v2)
    (- 1 (/ (length-v (mapcar2 #'- v1 v2))(+ (length-v v1)(length-v v2)))))

(defun kt-simi-measure2 (v1 v2)
    (setq x (sub-v v1 input-dim))
    (setq y (sub-v v2 input-dim))
    (- 1 (/ (length-v (mapcar2 #'- x y))(+ (length-v x)(length-v y)))))

(defun kt-simi-measure1 (v1 v2)
    (setq x (normalize-v (sub-v v1 input-dim)))
    (setq y (normalize-v (sub-v v2 input-dim)))
    (dot-product x y))

(defun kt-simi-measure3 (v1 v2)
    (setq x (normalize-v v1))
    (setq y (normalize-v v2))
    (dot-product x y))

(defun orthogonal? (v1 v2)
    (< (abs (kt-simi-measure3 v1 v2)) 0.2))

(defun opposite? (v1 v2)
    (< (kt-simi-measure3 v1 v2) -0.2))

(defun sub-v (v d)(prog(c y)
    (setq y nil)
    (setq c 0)
    lp(cond((= c d)(return y)))
    (setq y (append y (list (nth c v))))
    (setq c (1+ c))
    (go lp)))

(defun mapcar2(f l1 l2)
    (cond((null l1) nil)
         ((not (equal (length l1)(length l2))) nil)
         (t (cons (funcall f (car l1) (car l2))
              (mapcar2 f (cdr l1) (cdr l2))))))

(defun mapcar4(f l1 l2 l3 l4)
    (cond((null l1) nil)
         ((not (equal (length l1)(length l4))) nil)
         (t (cons (funcall f (car l1) (car l2) (car l3) (car l4))
              (mapcar4 f (cdr l1) (cdr l2) (cdr l3) (cdr l4))))))
```

```
(defun mapcar5(f l1 l2 l3 l4 l5)
      (cond((null l1) nil)
           ((not (equal (length l1)(length l5))) nil)
           (t (cons (funcall f (car l1) (car l2) (car l3) (car l4) (car l5))
                    (mapcar5 f (cdr l1) (cdr l2) (cdr l3) (cdr l4) (cdr l5)))))))

(defun length-v (l)
      (sqrt (apply #'+
            (mapcar #'(lambda(e)(expt e 2)) l))))

(defun normalize-v (l)
      (setq v-length (sqrt (apply #'+
            (mapcar #'(lambda(e)(expt e 2)) l))))
      (mapcar #'(lambda(e)(/ e v-length)) l))

(defun float-v (l)
      (mapcar #'float l))

(defun kt-mex nil (prog(x x1 y)
      (cond((not(boundp 'sigma))(setq sigma 0.7)))
      (cond((not(boundp 'rulesize))(setq rulesize 7)))
      (cond((not (boundp 'mex-lst))(setq mex-lst nil)))
      (princ "Do not forget to load the clustered network file .cnn
      and the training result file .wt")
      (terpri)
      (princ "output-file: ")
      (setq o-file (read))
      (setq os (open "tem.tem" :direction :output))
      (princ "(setq mex-lst '(" os)(terpri os)
      (cond((not (null mex-lst))
            (mapcar #'(lambda(e)(princ e os)(terpri os)) mex-lst)))
      (setq y (cdr (reverse (cdr (reverse layer-order)))))
 lp1(cond((null y)(princ "))" os) (close os) (load "tem.tem") (write-out-nn)
            (return t)))
      (setq instance-lst (build-instance (car y)))
      (setq x instance-lst)
 lp2(cond((null x)
            (setq y (cdr y))(go lp1)))
      (setq x1 (cdr x))
 lp3(cond((null x1)(setq x (cdr x))(go lp2)))
      (cond((and (opposite? (caddar x) (caddar x1))
            (orthogonal? (cadar x) (cadar x1)))
            (princ (list (caar x) (caar x1)) os)(terpri os)))
      (setq x1 (cdr x1))
      (go lp3)))

(defun build-instance (l)
      (setq x (add-b l
        (cadr (assoc (input-layer l layer-order) layer-node-lst))))
      (setq b (car (cadr (assoc (car layer-order) layer-node-lst))))
 ;    assume the first node in the first layer is the bias unit
      (cond((not (member b x))(setq x (cons b x))))
      (setq y (cadr (assoc (output-layer l layer-order) layer-node-lst)))
      (setq z (cadr (assoc l layer-node-lst)))
      (setq input-dim (length x))
      (setq output-dim (length y))
      (mapcar #'(lambda(e)(list e
                  (get-connf-wts l e)
                  (get-connb-wts l e))
                        ) z))

(defun get-connf-wts (l n)
      (nth (position n (cadr (assoc l layer-node-lst)))
            (cadr (assoc l trained-conn-wt))))

(defun get-connb-wts (l n)
      (setq p (position n (cadr (assoc l layer-node-lst))))
      (cond((member 'b (cadr (assoc (car layer-order) layer-node-lst)))
            (setq p (1+ p))))
      (mapcar #'(lambda(e)(nth p e)
```

```
                )
         (cadr (assoc (output-layer l layer-order)
                trained-conn-wt))))

(defun keep-top-7 (lh l)  ; keep top half of rule-size (seven) input wts
                          ; in terms of absolute values
       (prog(y z w u)
       (setq y (sub-v l lh))
       (setq z (reverse (sub-v (reverse l) (- (length l) lh))))
       (setq w (my-sort y #'(lambda(a b)(cond((> (abs a) (abs b)) )))))
       (setq u (nth (truncate (* 0.5 rulesize)) w))
       (cond((null u) nil)(t
       (setq y (mapcar #'(lambda(e)(cond((>= (abs e) (abs u))  e)(t 0))) y))))
       (return (append y z))))

(defun add-bw (w l)
       (mapcar2 #'(lambda(a b)(cons a b)) w l))

(defun get-column (m)(prog(c l y)
       (setq y nil)
       (setq c 0)
       (setq l (length (car m)))
       lp(cond((= c l)(return y)))
       (setq y (append y (list
             (mapcar #'(lambda(e)(nth c e)) m))))
       (setq c (1+ c))
       (go lp)))

(defun replace-node (l ns ls)
       (cond((null ls) nil)
            ((eq l (caar ls))(cons ns (cdr ls)))
            (t (cons (car ls) (replace-node l ns (cdr ls))))))

(defun nil-to-0 (n)
       (cond((null n) 0)(t n)))

(defun input-layer (l ls)
       (cond((null ls) nil)
            ((eq l (cadr ls)) (car ls))
            (t (input-layer l (cdr ls)))))

(defun output-layer (l ls)
       (cond((null ls) nil)
            ((eq l (car ls)) (cadr ls))
            (t (output-layer l (cdr ls)))))

(defun kt-cluster1 (i) (prog(x y)
       (setq x cluster-lst)
       lp(cond((null x)
           (return (setq cluster-lst
              (append cluster-lst (list (list (my-gensym)
                   l i
                   (mapcar #'(lambda(e) 0) i)
                 (max-min-p2 i))))))))
       (cond((> (kt-simi-measure1 i (caddr (car x))) sigma)
             (setq y (update-cluster (car x) i))
             (return (setq cluster-lst
                 (my-subst y (car x) cluster-lst)))))
       (setq x (cdr x))
       (go lp)))

(defun my-subst (a b c)
       (cond((null c) nil)
            ((equal b (car c))(cons a (cdr c)))
            (t (cons (car c) (my-subst a b (cdr c))))))
```

```
(defun max-min-p2 (l)
      (mapcar #'(lambda(e) (list e e)) l))

(defun update-cluster (c i)
      (list (car c) (+ 1 (cadr c))
            (setq x (new-average (cadr c) (caddr c) i))
            (mapcar4 #'(lambda(e1 e2 e3 e4) (update-sd (cadr c) e1 e2 e3 e4))
                  (cadddr c) (caddr c) x i)
            (max-min-p1 (cadddr (cdr c)) i)))

(defun new-average (n v1 v2)
      (mapcar2 #'(lambda(e1 e2)(/ (+ (* n e1) e2) (+ n 1))) v1 v2))

(defun max-min-p1 (v1 v2)
      (mapcar2 #'(lambda(e1 e2)(cond((< e2 (car e1))(list e2 (cadr e1)))
                  ((> e2 (cadr e1))(list (car e1) e2))
                  (t e1))) v1 v2))

(defun max-min-p3 (v1 v2)
      (mapcar2 #'(lambda(e1 e2) (list (min (car e1)(car e2))(max (cadr e1)(cadr e2
                  v1 v2))

(defun write-out-cluster nil
      (with-open-file (x o-file :direction :output)
            (princ "(setq cluster-lst '(" x)
            (mapcar #'(lambda(e)(print e x)) cluster-lst)
            (princ "))" x)  ))

(defun which-cluster (i)(prog(x)
      (setq x cluster-lst)
      lp(cond((null x) (return nil)))
         (cond((> (kt-simi-measure1 i
                        (caddr (car x))) sigma)
            (return (caar x))))
         (setq x (cdr x))
         (go lp)))

(defun sd (l)
     (cond((equal 1 (length l)) 0)
          (t
            (sqrt (/ (-
                  (apply #'+ (mapcar #'(lambda(e)(expt e 2)) l))
                  (* (length l)
                     (expt (/ (apply #'+ l) (length l)) 2)))
                  (- (length l) 1))))))

(defun update-sd (n s ao an i)
      (sqrt (/ (+ (* (- n 1) (expt s 2))
                  (* n (expt ao 2))
                  (expt i 2)
                  (- (* (+ n 1)(expt an 2))))
            n)))

(defun update-sd-2c(n1 s1 ao1 n2 s2 ao2 an)
      (sqrt (/ (+
                  (* (- n1 1)(expt s1 2))
                  (* n1 (expt ao1 2))
                  (* (- n2 1)(expt s2 2))
                  (* n2 (expt ao2 2))
                  (- (* (+ n1 n2)(expt an 2))))
            (+ n1 n2 (- 1)))))

(defun update-mean-2c(n1 ao1 n2 ao2)
      (mapcar2 #'(lambda(e1 e2) (/ (+ (* n1 e1)(* n2 e2)) (+ n1 n2))) ao1 ao2))

(defun merge-2c(c1 c2)
      (list (pack (list (car c1)(car c2))) (+ (cadr c1) (cadr c2))
            (setq x (update-mean-2c (cadr c1) (caddr c1) (cadr c2)(caddr c2)))
            (mapcar5 #'(lambda(e1 e2 e3 e4 e5) (update-sd-2c
```

```
              (cadr c1) e1 e2 (cadr c2) e3 e4 e5))
              (cadddr c1) (caddr c1) (cadddr c2) (caddr c2) x)
              (max-min-p3 (cadddr (cdr c1)) (cadddr (cdr c2))))))

(defun final-check nil (prog (x)
       (cond((not(boundp 'sigma))(setq sigma 0.8)))
       (setq x   (cdr cluster-lst))
       (setq cluster-lst (list (car cluster-lst)))
       lp(cond((null x)(return cluster-lst)))
       (final-check1 (car x))
       (setq x (cdr x))
       (go lp)))

(defun final-check1 (c) (prog(x y)
       (setq x   cluster-lst)
       lp(cond((null x)
             (return (setq cluster-lst
                 (append cluster-lst (list c))))))
           (cond((> (kt-simi-measure1 (caddr  c) (caddr (car x))) sigma)
                 (setq y (merge-2c c (car x)))
                 (return (setq cluster-lst
                     (my-subst y (car x) cluster-lst)))))
       (setq x (cdr x))
       (go lp)))

(defun my-remove (m l)
       (cond((null l) nil)
            ((equal m (car l)) (cdr l))
            (t (cons (car l) (my-remove m (cdr l))))))

(defun s-assoc (k l)
       (cond((null l) nil)
            ((or (equal k (caar l))(and (eq (car k) (cadr (caar l)))
                                        (eq (cadr k) (caaar l))))
             (car l))
            (t (s-assoc k (cdr l)))))

; modified from gennn.lsp
; assume fully connected between adjacent layers

; The input is a layer-node-lst and ini-conn-wt
;    (setq layer-node-lst '((l1 (a1 a2 ..))(l2 (m1 m2 ..)) ..))
;    (setq point-conn-lst '((a1 m1)(a2 m2)..))   means if a1 then m1,....
;  Note you can set sampleno, else it will be set by default (defun write-out-nn nil
      (setq node-lst (apply #'append (mapcar #'cadr layer-node-lst)))
      (setq unmod-wt nil)
      (cond((not (boundp 'mex-lst))(setq mex-lst nil)))
      (with-open-file (os o-file :direction :output)
          (mapcar #'(lambda(e)(princ "(setq " os)(princ e os)(princ "(quote" os)
                     (terpri os)(princ (eval e) os)(terpri os)
                     (princ "))" os)(terpri os))
                  '(node-lst layer-node-lst layer-order mex-lst
                     unmod-wt trained-conn-wt samples))) t )

(defun my-sort (l f)
      (setq l1 (copy-list l))
      (sort l1 f))

(defun add-b (l ns)
       (cond((and (member 'b (cadr (assoc (car layer-order) layer-node-lst)))
                  (member l (cddr layer-order)))(cons 'b ns))
            (t ns)))
```

APPENDIX B  Copyright 1991 University of Florida
EXPLORE-POS 1. allnodes <- nil.
2. open <- {{}}.
3. closed <- nil.
lp 4. if open = nil, then return allnodes.
5. head <- the first element of open.
6. if head is in closed,
   then open <- open - {head} and go lp.
7. closed <- closed in union with {head}.
8. if the sigmoid-sum of the associated
   weights of all 1 attributes in head plus
   k - 1 other strongest, non-conflicting
   pos-atts is not greater than the beta value,
   then open <- open - {head} and go lp.
9. if the sigmoid-sum of the associated
   weights of all attributes in head is
   greater than the beta value,
   then
   allnodes <- allnodes in union with {head}.
10. if head has k attributes,
    then open <- open - {head} and go lp.
11. if the sigmoid-sum of the associated
    weights of all attributes in head
    plus all neg-atts (for mutually exclusive
    attributes, take the strongest one)
    is greater than the beta value,
    then open <- open - {head} and go lp.
12. successors <- a set of the sets formed by
                  adding a new, non-conflicting
                  pos-att to head in all
                  possible ways.
13. successors <- remove the elements from
                  successors which are in
                  open or closed.
14. open <- open - {head}.
15. open <- open in union with successors.
16. go lp.

APPENDIX C  Copyright 1991 University of Florida
NEGATE-NEG 1. allnodes <- nil.
2. open <- a singleton set containing an element
           of the output set from EXPLORE-POS.
3. closed <- nil..
lp 4. if open = nil, then return allnodes.
5. head <- the first element of open.
6. if head is in closed,
   then open <- open - {head} and go lp.
7. head-neg <- head in union with all neg-atts
              whose negations are not in head.
              (special attention for mutually
              exclusive attributes).
8. if the sigmoid-sum of the associated
   weights of all non-negated attributes in
   head-neg is greater than the beta value,
   than
   8.1. allnodes <- allnodes in union with {head};

```
        8.2. closed <- closed in union with {head};
        8.3. open <- open - {head};
        8.4. go lp.
    9. else
        9.1. closed <- closed in union with {head};
        9.2  if head has k attributes,
             then open <- open - {head} and go lp;
        9.3. successors <- a set of the sets formed by
                          adding to head the negation of
                          an appropriate neg-att
                          which has not been in head in all
                          possible ways;
        9.4. successors <- remove the elements from
                          successors which are in
                          open or closed;
        9.5. open <- open - {head};
        9.6. open <- open in union with successors;
        9.7. go lp.
```

APPENDIX D: KT TRANSLATOR
Copyright 1991 University of Florida

```
; Three intermediate files: tem.tem (kt-node-rules),
;    tem1.tem (confirm and disconfirm rules)
;    tem2.tem (rewrite)

;   and the wt-upth = 0.6 and wt-loth = 0.4 by default
;   For the output layer wt-upth = 0.9 and wt-loth = 0.1 because
;   the output layer does not consider simultaneously confirming and
;   disconfirming patterns and thus needs higher thresholds.
;   (the same as knowtron2)

; Input: 1. ((a1 w1) (a2 w2) ...)
;        2. the concept
;        3. the threshold (negation of the weight of the bias unit)
;        4. the rule set name for the rules to be learned ; -----------------------------------------------------------------
; NOTE: The threshold is the negation of the weight of the bias unit.
; -----------------------------------------------------------------

; The program structure:
;   knowtron
;           gen-all-att
;           gen-pos-neg-att
;           form-conf-rule
;                       explore-pos
;                       neg-neg
;           form-disconf-rule
;                       explore-neg
;                       neg-pos
;   print-rule (to printout rules)
;   rewrite: (handle multi-layer nn) to get direct link from
;           attributes to final concept.
;   The test file is in delcotest
; -----------------------------------------------------------------
;   To run: 1. load the network file and the trained result, then
;           2. Setq width and setq mex-lst (mutually-exclusive lists)
;               e.g. (setq width 7)  search width (number of atts
;                    combination) for each layer
;                    (setq mex-lst '((a1 a2)(b1 b2 b3))) (a list of lists)
;                    note that you can set (a1 a2) (a1 a3) but a2 a3 are NOT
;                    mutually exclusive
;           3. You may set the alpha and the beta values by ASK-TH
;           (kt-main)
; -----------------------------------------------------------------
;
; version 2 (is implemented in this version, knowtron2.lsp):
```

```
;       1. Change EXPLORE-POS and EXPLORE-NEG into search from
;          the most general (see aaai91.tex).
;       2. Handling mutually exclusive attributes:
;          Suppose M1, M2, .., Mn are mutually exclusive,
;          Mi and Mj    --> delete the node during EXPLORE-POS (or NEG)
;          Mi and not Mj --> delete the node during NEGATE-NEG (or POS)
;               (because Mi implies not Mj).
;          not M1 and not M2 and ,,, not Mn-1 --> delete the node
;                         during NEGATE-NEG (or POS)
;                      (because it implies Mn).
;          not M1 and not M2 and ,,, not Mn  --> delete the node
;                         during NEGATE-NEG (or POS)
;                      (because it is impossible).
;          To calculate sigmoid-sum in NEGATE-NEG (or POS),
;             only keep the MEX attributes with the largest abs. wt.
;       3. Limit the number of attributes to k (7).
;          (setq width ..) the default is 7.
;       4. Modify the mutual exclusiveness handling facility such that
;                networks may not be easy,
;                Because we can evaluate the global performance
;                but it is hard to evaluate individual connections.
;                To break the network into a set of rules makes
;                this objective achievable.
;
; -------------------------------------------------------------------

;  mutually exclusive attributes is stored in:
;     (setq mex-lst '((a1 a2) (b1 b2 b3) ..))

; (defun squash (n) (/ 1 (+ 1 (exp (- n))))))
; The slope is 20 times steep.
; use learn rate = 0.001-0.005
(defun squash (n) (/ 1 (+ 1 (exp (- (* 20 n))))))

(defun ask-th nil
       (terpri)(princ "Upper-Threshold: ")
       (setq wt-upth (read))
       (terpri)(princ "Lower-Threshold: ")
       (setq wt-loth (read)) )

; need trained-conn-wt and nn information
; the bias unit is b.
; the 1st result is kt-data: ((n1 t1 at-list1)(n2 t2 at-list2)...)
;      where ti is threshold and at-listi is attribute-list.
; the 2nd result is kt-node-rules: ((n1 '(((a1)(n1))((b1)(not n1)))
;                                   (n2 '((....................))) ...)
(defun pre-process nil
       (setq kt-data nil)
       (mapcar #'(lambda(e)(setq cur-layer e)
       (mapcar #'pre-process1 (remove 'b
                 (cadr (assoc e layer-node-lst)))))
                              (cdr layer-order)))

(defun pre-process1 (n) (prog(th a p ws)
       (setq p (position n (cadr (assoc cur-layer layer-node-lst))))
       (setq ws (nth p (cadr (assoc cur-layer trained-conn-wt))))
       (setq th (- (car ws)))
       (setq a (mapcar2 #'(lambda(a b)(list a b))
                 (remove 'b (cadr (assoc (input-layer cur-layer
                    layer-order) layer-node-lst)))
                 (cdr ws)))
       (setq kt-data (append kt-data (list (list n th a))))
       (return t)))

(defun generate-node-rule nil (prog (x y)
       (setq os (open "tem.tem" :direction :output))
       (setq x (cdr layer-order))
       (setq kt-node-rules nil)
       (princ "(setq kt-node-rules '(" os)(terpri os)
lp(cond((null x) (princ "))" os)
       (close os)(load "tem.tem")(return t)))
         (cond((and out-dis-flag (eq (car x)(car (reverse layer-order))))
```

```
                        (setq dis-flag t))(t (setq dis-flag nil)))
                (cond((eq (car x) (car (reverse layer-order)))
                      (setq wt-upth 0.9)(setq wt-loth 0.1))
                     (t (setq wt-upth 0.6)(setq wt-loth 0.4)))
                (setq y (mapcar #'(lambda(e)(assoc e kt-data))
                      (cadr (assoc (car x) layer-node-lst))))
                (mapcar #'(lambda(e)
                (princ "(" os)(princ (car e) os)(terpri os)
                (princ "'(" os)(mapcar #'(lambda(m)(terpri os)(princ m os))
                    (knowtron (caddr e) (car e) (cadr e) 'rules))
                (princ ")" os)
                (princ ")" os)(terpri os)
                ) y)
                    ; (detect-mex (car x))  ; now, i use ktmex.lsp
                (setq x (cdr x))
                (go lp)))

(defun kt-main nil
        (terpri)
        (princ "Welcome to Knowledgetron!")
        (terpri)
        (princ "You must load the net and the trained result!")
        (terpri)
        (princ "You may load mutually-exclusive attribute list!")
        (terpri)
        (princ "Output file for rules: ")
        (setq o-file (read))
        (terpri)
        (princ "What is the search width for each layer?
        (enter a number, e.g., 3 for a large net)> ")
        (setq width (read))
        (terpri)
        (princ "Do you want to form disconfirm rules for the
        final concepts? (y or n) >")
        (setq x (read))
        (cond((or (eq x 'n)(eq x 'no))(setq out-dis-flag t))
             (t (setq out-dis-flag nil)))
        (setq wt-upth 0.6)
        (setq wt-loth 0.4)
        (cond((not (boundp 'width)) (setq width 7)))
        (cond((not (boundp 'mex-lst)) (setq mex-lst nil)))
        (set-mex-prop)
        (pre-process)
        (generate-node-rule)
        (setq final-rules
        (apply #'append (mapcar #'kt-main1 (cadr
             (assoc (car (reverse layer-order)) layer-node-lst)))))
        (setq final-rules
           (remove nil (mapcar #'(lambda(e)
                          (cond((final-prune? (car e)) nil)
                               (t e))) final-rules)))
        (with-open-file (x o-file :direction :output)
            (princ "(setq rules '(" x)
            (mapcar #'(lambda(e)(print e x)) final-rules)
            (princ "))" x)(terpri x)
            )
            (mapcar #'print final-rules) (terpri) t
            )

(defun set-mex-prop nil
        (mapcar #'(lambda(e)(mapcar #'(lambda(m)(setf (get m 'mex)
                        (append-no-red (get m 'mex) e)))
                        e)) mex-lst))

(defun append-no-red (l1 l2)
        (cond((null l1) l2)
             ((member (car l1) l2)(append-no-red (cdr l1) l2))
             (t (cons (car l1) (append-no-red (cdr l1) l2)))))

(defun kt-main1 (c) (prog(rs1 rss2 x frule)
        (setq x (cdr (reverse (cdr layer-order))))
        (cond((null x)(return (eval (cadr (assoc c kt-node-rules))))))
        (setq rs1 (assoc c kt-node-rules))
```

```
            lp(cond((null x)(return frule)))
              (setq rss2 (mapcar #'(lambda(e)
                            (assoc e kt-node-rules))
                          (cadr (assoc (car x) layer-node-lst))))
              (setq rs1 (list c (list 'quote
                      (setq frule    (rewrite rs1 rss2)))))
            (setq x (cdr x))
            (go lp)))

(defun knowtron (al cn th rs)
          (setq attribute-list al)
          (set-wt-prop al)
          (setq concept-name cn)
          (setq threshold th)
          (setq rule-set-name rs)
          (gen-all-att al)
          (setq x
          (gen-pos-neg-att al))
          (setq pos-att (car x))
          (setq neg-att (cadr x))
          (setq ordered-pos-att (my-sort pos-att #'pos>))
          (setq ordered-neg-att (my-sort neg-att #'neg<))
          (setq os1 (open "tem1.tem" :direction :output))
          (princ "(setq rules '(" os1)(terpri os1)
          (form-conf-rule al cn th)
          (form-disconf-rule al cn th)
          (princ "))" os1)
          (close os1)(load "tem1.tem") rules)

(defun set-wt-prop (l)
        (mapcar #'(lambda(e)(setf (get (car e) 'wt) (cadr e)))
                l))

(defun pos> (x y)
        (cond((>
              (get x 'wt)
              (get y 'wt)) t)
          (t nil)))

(defun neg< (x y)
        (cond((<
              (get x 'wt)
              (get y 'wt)) t)
          (t nil)))

(defun gen-all-att (l)
        (setq all-att (mapcar #'car l)))

(defun gen-pos-neg-att (l)
        (setq pos-att nil)
        (setq neg-att nil)
        (mapcar #'(lambda(e)
                    (cond((< (cadr e) 0) (setq neg-att
                                          (append neg-att (list (car e)))))
                      ((> (cadr e) 0) (setq pos-att
                                          (append pos-att (list (car e)))))))
                l) (list pos-att neg-att))

(defun form-conf-rule (al cn th) (prog (premises allnodes )
        (setq allnodes (explore-pos all-att))
        (setq premises (apply #'append (mapcar #'neg-neg allnodes)))
        (setq allnodes nil)
        (setq premises (mapcar #'remove-neg premises))
        (setq premises (remove-subsume
                      (mapcar #'(lambda(e)(mex-refine e))
                        premises)))
        (setq rules (add-concept premises))
        (mapcar #'(lambda(e)(princ e os1)(terpri os1)) rules)
```

```
        (setq rules nil)
        (setq premises nil)
        (return rules)) )

(defun explore-pos (l) (prog (allnodes open closed)
        (setq allnodes nil)
        (setq open (list nil))
        (setq closed nil)
        lp(cond((null open) (return allnodes)))
          (cond((my-member (car open) closed)(setq open (cdr open)) (go lp))
               ((not (pre-test-pos (car open)))
                  (setq closed (cons (car open) closed))
                  (setq open (cdr open))(go lp))
               (t (cond((retain-pos (car open))
                         (setq allnodes (cons (car open) allnodes))))
                  (setq closed (cons (car open) closed))
                  (cond((and (< (length (car open)) width)
        (not (retain-pos (mex-rx (append (car open) (check-mex-a (car open)
neg-att))))))
                         (setq open (append (not-in-closed-open nil closed
                           (kt-sort (specialize-pos (car open)))) (cdr open))))
                        (t (setq open (cdr open))))
                  (go lp) ))))

(defun retain-pos (x)
        (cond( (>
                (squash (+ (- threshold) (apply #'+
                   (mapcar #'(lambda(e)(get e 'wt))
                        x)))) wt-upth) t)
              (t nil)))

(defun get-pos (x)
        (cond((null x) nil)
             ((member (car x) pos-att) (cons (car x) (get-pos (cdr x))))
             (t (get-pos (cdr x)))))

(defun retain-neg (x)
        (cond( (<
                (squash (+ (- threshold) (apply #'+
                   (mapcar #'(lambda(e)(get e 'wt))
                        x)))) wt-loth) t)
              (t nil)))

(defun get-neg (x)
        (cond((null x) nil)
             ((member (car x) neg-att) (cons (car x) (get-neg (cdr x))))
             (t (get-neg (cdr x)))))

(defun not-in-closed-open (o c l)
        (cond((null l) nil)
             ( (my-member (car l) c) (not-in-closed-open o c (cdr l)))
             (t (cons (car l) (not-in-closed-open o c (cdr l))))))

(defun specialize-pos (n)
        (remove nil (mapcar #'(lambda(e) (cond ((not (member e n))
                                       (cons e n))))
                            (check-mex-a n pos-att))))

(defun check-mex-a (a b)
        (cond((null a) b)
             (t (mapcar #'(lambda(n)
                     (setq b (my-remove n b))) a)
                (mapcar #'(lambda(e)(mapcar #'(lambda(m)
                                       (setq b
                                         (my-remove m b))) (get e 'mex))) a)
                b)))

(defun my-remove (m l)
        (cond((null l) nil)
             ((equal m (car l)) (cdr l))
             (t (cons (car l) (my-remove m (cdr l))))))
```

```
(defun set-intersect? (s1 s2)
      (mapcar-any #'(lambda(e1)(member e1 s2)) s1) )

(defun mapcar-any (f l)
      (cond((null l) nil)
           ((funcall f (car l)) t)
           (t (mapcar-any f (cdr l)))))

(defun neg-neg (l) (prog (lx allnodes open closed)
        (setq allnodes nil)
        (setq lx (length l))
        (setq open (list (append l (check-mex-a l neg-att))))
        (setq closed nil)
        lp(cond((null open) (return allnodes)))
          (cond((my-member (car open) closed)(setq open (cdr open)) (go lp))
               ((prune? (car open))
                   (setq closed (cons (car open) closed))
                    (setq open (cdr open)) (go lp))
               (t (cond((> (sigmoidal-sum (mex-rx (car open))) wt-upth)
                    (setq allnodes (cons (car open) allnodes))
                    (setq closed (cons (car open) closed))
                    (setq open (cdr open)) (go lp))
                   (t
                    (setq closed (cons (car open) closed))
                    (cond((< (+ lx (length (collect-not (car open)))) width)
                    (setq open (append (not-in-closed-open nil closed
                       (kt-sort (neg-one-neg (car open)))) (cdr open))))
                      (t (setq open (cdr open))))
                    (go lp) ))))))

(defun prune? (n) (prog(c x y)
        (setq y (car (separate-h-i n)))  ; only care input attributes
        (setq x (mapcar #'(lambda(e)(get e 'mex))
                (collect-not y)))
        lp(cond((null x)(return nil)))
        (setq c (how-many (car x) x) )
        (cond((> c (- (length (car x)) 1))(return t)))
        (setq x (remove-list-all (car x) x))
        (go lp)))

(defun separate-h-i (n)     ; separate the list of attributes
                            ; into hidden and not hidden nodes
        (prog (x y z i)
        (setq x n)
        (setq y nil)
        (setq z nil)
        (setq i (cadr (assoc (car layer-order) layer-node-lst)))
        lp(cond((null x)(return (list y z))))
          (cond((or (and (atom (car x))(member (car x) i))
                    (and (listp (car x))(member (cadar x) i)))
                (setq y (append y (list (car x)))))
               (t (setq z (append z (list (car x))))))
          (setq x (cdr x))
          (go lp)))

(defun mex-refine (n) (prog(c x y y2 z w v)
        (setq y (separate-h-i n))
        (setq y2 (cadr y))
        (setq y (car y))
        (setq v (strip-not y))
        (setq z (collect-not y))
        (setq x  (mapcar #'(lambda(e)(get e 'mex))
                z))
        lp(cond((null x)(return (append y y2))))
        (setq c (how-many (car x) x) )
        (cond((= c (- (length (car x)) 1))
              (mapcar #'(lambda(e)(setq y (my-remove e y)))
                    (add-not (set-intersect v (car x))))
              (setq w (in-a-not-b (car x) v))
              (cond((not(null w))(setq y (cons w y))))))
        (setq x (remove-list-all (car x) x))
        (go lp)))
```

```
(defun strip-not (l)
     (cond((null l) nil)
          ((atom (car l))(cons (car l) (strip-not (cdr l))))
          (t (cons (cadar l) (strip-not (cdr l))))))

(defun set-intersect (a b)(prog(x y)
     (setq x a)
     (setq y nil)
     lp(cond((null x)(return y)))
     (cond((member (car x) b)(setq y (append (list (car x)) y))))
     (setq x (cdr x))
     (go lp)))

(defun add-not (l)
     (mapcar #'(lambda(e)(list 'not e)) l))

(defun in-a-not-b (a b) (prog(x)
     (setq x a)
     lp(cond((null x)(return nil)))
     (cond((not(member (car x) b))(return (car x))))
     (setq x (cdr x))
     (go lp)))

(defun remove-list-all (l1 l2)
     (cond((null l2) nil)
          ((equal l1 (car l2))(remove-list-all l1 (cdr l2)))
          (t (cons (car l2) (remove-list-all l1 (cdr l2))))))

(defun how-many (n l)(prog(c x)
     (cond((null n)(return -10)))
     (setq c 0)
     (setq x l)
     lp(cond((null x)(return c)))
     (cond((equal n (car x))(setq c (+ 1 c))))
     (setq x (cdr x))
     (go lp)))

(defun collect-not (n)
     (cond((null n) nil)
          ((atom (car n))(collect-not (cdr n)))
          (t (cons (cadar n) (collect-not (cdr n))))))

(defun collect-aff (n)
     (cond((null n) nil)
          ((atom (car n))(cons (car n) (collect-aff (cdr n))))
          (t (collect-aff (cdr n)))))

(defun mex-rx (n) (prog(x y)
     (setq x (find-mex-lst n))
     (setq y n)
     lp(cond((null x)(return y)))
     (setq y (mex-rx1 y (car x)))
     (setq x (cdr x))
     (go lp)))

(defun find-mex-lst (n)
     (my-remove nil
     (remove-equal (apply #'append
          (mapcar #'(lambda(e)(member-member e mex-lst))
               (collect-aff n))))))

(defun member-member (e l)(prog(x y)
     (setq y nil) (setq x l)
     lp(cond((null x)(return y)))
     (cond((member e (car x))(setq y (append y (list (car x))))))
     (setq x (cdr x))
     (go lp)))

(defun remove-equal(l)
     (cond((null l) nil)
          ((my-member (car l) (cdr l))(remove-equal (cdr l)))
          (t (cons (car l) (remove-equal (cdr l))))))
```

```
(defun mex-rxl (a b) (prog(x y z w)
      (setq x a)
      (setq w a)
      (setq y nil)
      lp(cond((null w)(return x)))
         (cond( (member (car w) b)
              (cond((null y) (setq y (car w)))
                 (t (setq z (car w))
                    (cond((> (abs (get z 'wt))
                             (abs (get y 'wt)))
                          (setq x (remove y x))
                          (setq y z))
                         (t (setq x (remove z x))))
                    ))))
         (setq w (cdr w))
         (go lp)))

(defun neg-one-neg (n)
      (mapcar #'(lambda(e) (my-subst (list 'not e) e n)) neg-att))

(defun my-subst (a b c)
      (cond((null c) nil)
           ((equal b (car c))(cons a (cdr c)))
           (t (cons (car c) (my-subst a b (cdr c))))))

(defun sigmoidal-sum (l)
      (squash (+ (- threshold) (apply #'+
                 (mapcar #'(lambda(e)
                            (cond((atom e)(get e 'wt))
                                 (t 0))) l)))))

(defun remove-neg (p)
      (cond((null p) nil)
           ((not (atom (car p)))
            (cons (car p) (remove-neg (cdr p))))
           ((member (car p) pos-att)
            (cons (car p) (remove-neg (cdr p))))
           (t (remove-neg (cdr p)))))

(defun add-concept (r)
      (mapcar #'(lambda(e) (list e (list concept-name))) r))

(defun remove-subsume (l) (prog(item result x y)
      (setq result nil)
      (setq y l)(setq x l)
      lp1(cond((null y)(return result)))
         (setq item (car y))
         (setq x (cdr y))
      lp2(cond((null x)(setq result (append (list item) result))
               (setq y (cdr y))(go lp1)))
         (cond((subset? item (car x)) (setq y
                    (cons item (remove-list (car x) (cdr y)))))
              ((subset? (car x) item)(setq y (cdr y))(go lp1)))
         (setq x (cdr x))
         (go lp2)))

(defun remove-list (a b)
      (cond((null b) nil)
           ((equal a (car b)) (cdr b))
           (t (cons (car b) (remove-list a (cdr b))))))

(defun subset? (a b)
      (cond((= (length a) 1)(my-member (car a) b))
           ((null a) nil)
           ((my-member (car a) b)(subset? (cdr a) b))
           (t nil)))

(defun superset? (a b)
      (subset? b a))
```

```
(defun my-member (e l)
      (cond((null l) nil)
           ((equal e (car l)) t)
           (t (my-member e (cdr l)))))

(defun superset-member (e l)
      (cond((null l) nil)
           ((superset? e (car l)) t)
           (t (superset-member e (cdr l)))))

(defun subset-member (e l)
      (cond((null l) nil)
           ((subset? e (car l)) t)
           (t (subset-member e (cdr l)))))

(defun set-member (e l)
      (cond((null l) nil)
           ((set-equal e (car l)) t)
           (t (set-member e (cdr l)))))

(defun form-disconf-rule (al cn th) (prog (premises allnodes rules)
      (cond(dis-flag (return nil)))
      (setq allnodes (explore-neg all-att))
      (setq premises (apply #'append (mapcar #'neg-pos allnodes)))
      (setq allnodes nil)
      (setq premises (mapcar #'remove-pos premises))
      (setq premises (remove-subsume
                      (mapcar #'(lambda(e)(mex-refine e))
                         premises)))
      (setq rules (add-not-concept premises))
      (mapcar #'(lambda(e)(princ e osl)(terpri osl)) rules)
      (setq rules nil)
      (setq premises nil)
      (return rules)) )

(defun explore-neg (l) (prog (allnodes open closed)
      (setq allnodes nil)
      (setq open (list nil))
      (setq closed nil)
      lp(cond((null open) (return allnodes)))
        (cond((my-member (car open) closed)(setq open (cdr open)) (go lp))
             ((not (pre-test-neg (car open)))
                (setq closed (cons (car open) closed))
                (setq open (cdr open))(go lp))
             (t (cond((retain-neg (car open))
                (setq allnodes (cons (car open) allnodes))))
                (setq closed (cons (car open) closed))
                (cond((and (< (length (car open)) width)
      (not (retain-neg (mex-rx (append (car open) (check-mex-a (car open)
      pos-att))))))
                (setq open (append (not-in-closed-open nil closed
                   (kt-sort (specialize-neg (car open)))) (cdr open))))
                (t (setq open (cdr open))))
             (go lp) ))))

(defun specialize-neg (n)
       (remove nil (mapcar #'(lambda(e) (cond ((not (member e n))
                                   (cons e n)))
                                   (check-mex-a n neg-att))))

(defun neg-pos (l) (prog (lx allnodes open closed)
      (setq allnodes nil)
      (setq lx (length l))
      (setq open (list (append l (check-mex-a l pos-att))))
      (setq closed nil)
      lp(cond((null open) (return allnodes)))
        (cond((my-member (car open) closed)(setq open (cdr open)) (go lp))
             ((prune? (car open))
                (setq closed (cons (car open) closed))
                (setq open (cdr open)) (go lp))
             (t (cond((< (sigmoidal-sum (mex-rx (car open))) wt-loth)
```

```
            (setq allnodes (cons (car open) allnodes))
            (setq closed (cons (car open) closed))
            (setq open (cdr open)) (go lp))
           (t
            (setq closed (cons (car open) closed))
            (cond((< (+ lx (length (collect-not (car open))))  width)
              (setq open (append (not-in-closed-open nil closed
                 (kt-sort (neg-one-pos (car open)))) (cdr open))))
                (t (setq open (cdr open))))
           (go lp) ))))))

(defun neg-one-pos (n)
        (mapcar #'(lambda(e) (my-subst (list 'not e) e n)) pos-att))

(defun remove-pos (p)
        (cond((null p) nil)
             ((not (atom (car p)))
              (cons (car p) (remove-pos (cdr p))))
             ((member (car p) neg-att)
              (cons (car p) (remove-pos (cdr p))))
             (t (remove-pos (cdr p)))))
(defun add-not-concept (r)
        (mapcar #'(lambda(e) (list e (list 'not concept-name))) r))

(defun print-rule (rsname)
        (terpri)(princ "Output file:")
        (setq o-file (read))
        (with-open-file (x o-file :direction :output)
                (princ "(setq " x)
                (princ rsname x)
                (princ " '(" x)
                (mapcar #'(lambda(e)(print e x))   (eval rsname))
                (princ "))" x)))

(setq *print-level* nil)
(setq *print-length* nil)

;   rewrite(rsname1 rsnamelist2)
;   e.g., rsname1: (c rule0)
;         rsnamelis2: ((m1 rule1)(m2 rule2)...)
;   global variable: frules, closed-prem, rsname1, rsnamelist2, intervar,
;                    final-rules (this is the result).
;   wt-upth (wt upper threshold) e.g. 0.6-.08
;   wt-loth (wt lower threshold) e.g. 0.2-.04

(defun rewrite (rs1 rss2)
        (setq rsname1 rs1)
        (setq rsnamelist2 rss2)
        (setq concept-name (car rs1))
        (setq frules nil)
        (setq conf-rules nil)
        (setq disconf-rules nil)
        (setq closed-prem nil)
        (setq intervar (mapcar #'car rss2))
        (setq os2 (open "tem2.tem" :direction :output))
        (princ "(setq frules '(" os2)(terpri os2)
        (mapcar #'rewrite1 (get-conf-rule (eval (cadr rs1))))
        (princ "))" os2)
        (close os2)(load "tem2.tem")
        (cond((not (null frules))
         (setq conf-rules (add-concept (remove-subsume
                (mapcar #'(lambda(e)(max-refine e))
                (mapcar #'car frules)))))))
        (setq frules nil)
        (setq closed-prem nil)
        (setq os2 (open "tem2.tem" :direction :output))
        (princ "(setq frules '(" os2)(terpri os2)
        (mapcar #'rewrite1 (get-disconf-rule (eval (cadr rs1))))
        (princ "))" os2)
```

```
          (close os2)(load "tem2.tem")
          (cond((not (null frules))
          (setq disconf-rules
                (add-not-concept (remove-subsume
                     (mapcar #'(lambda(e)(mex-refine e))
                  (mapcar #'car frules)))))))
          (setq final-rules (append conf-rules disconf-rules))))

(defun get-conf-rule (rs)
          (assoc-reverse-all-new (list concept-name) rs))

(defun get-disconf-rule (rs)
          (assoc-reverse-all-new (list 'not concept-name) rs))

(defun assoc-reverse-all-new (k l)
          (cond((null l) nil)
               ((equal k (cadar l))(cons (car l)
                                         (assoc-reverse-all-new k (cdr l))))
               (t (assoc-reverse-all-new k (cdr l)))))

(defun rewrite1 (r) (prog (open)
          (setq open (list (car r)))
       lp(cond((null open)(return t)))
          (cond((superset-member (car open) closed-prem)
                (setq open (cdr open))(go lp)))
          (cond((nointervar (car open))
                (princ (list  (car open) (cadr r)) os2)(terpri os2)
                                     (setq open (cdr open))(go lp)))
          (setq closed-prem (cons (car open) closed-prem))
          (setq open (append (not-in-closed-open nil closed-prem
             (rewritell (car open))) (cdr open)))
          (go lp)))

(defun nointervar (p)
          (not (intersection (att-in p) intervar)))

(defun att-in (p)
          (cond((null p) nil)
               ((atom (car p))(cons (car p) (att-in (cdr p))))
               (t (cons (cadar p) (att-in (cdr p))))))

(defun rewritell (p) (prog(x y z w u)
          (setq w nil)
          (setq x (first-inter p))
          (setq y (first-intervar x))
          (setq z (mapcar #'(lambda(e)(new-subst e x p))
                          (get-all-ant y x)))
          (mapcar #'(lambda(e)
                      (cond((setq u (checkconfred e))(setq w (cons u w)))
                           (t nil))) z)
          (return w)))

(defun first-inter (p)
          (cond((null p) nil)
               ((inter? (car p)) (car p))
               (t (first-inter (cdr p)))))

(defun inter? (v)
          (cond((atom v)(cond((member v intervar))))
               (t (cond((member (cadr v) intervar))))))

(defun first-intervar (x)
          (cond((atom x) x)
               (t (cadr x))))

(defun get-all-ant (y x)
          (assoc-reverse-all (givelist x) (eval (cadr (assoc y rsnamelist2)))))

(defun givelist (x)
          (cond((atom x)(list x))
               (t x)))
```

```
(defun assoc-reverse-all (k l)
       (cond((null l) nil)
            ((equal k (cadar l))(cons (caar l)
                                    (assoc-reverse-all k (cdr l))))
            (t (assoc-reverse-all k (cdr l)))))

(defun new-subst (a b c)
       (cond((null c) nil)
            ((equal b (car c))(append a (cdr c)))
            (t (cons (car c) (new-subst a b (cdr c))))))

(defun checkconfred (l)
       (setq ll (checkconfred1 l))
       (cond((my-member '(nil) ll) nil)
            (t ll)))

(defun checkconfred1 (l)
       (cond((null l) nil)
            ((= 1 (length l)) l)
            ((or (conflict-a-d (car l) (cdr l))
                 (mex-conf-a-d (car l) (cdr l)))
                 (list (list nil)))
            ((my-member (car l) (cdr l))
                (checkconfred1 (cdr l)))
            (t (cons (car l)
                (checkconfred1 (cdr l))))
            ))

(defun conflict-a-d (a l)
       (mapcar-any #'(lambda(e)(conflict? a e)) l))

(defun mex-conf-a-d (a l)
       (mapcar-any #'(lambda(e)(mex-conf? a e)) l))

(defun mex-conf? (a b)
       (cond((equal a b) nil)
            (t
             (subset-member (list (de-not a) (de-not b)) mex-lst))))

(defun de-not (e)
       (cond((atom e) e)
            (t (cadr e))))

; (defun checkconfred (l) (prog(item result x y)
;        (setq result nil)
;        (setq y l)(setq x l)
;   lp1(cond((null y)(return result)))
;        (setq item (car y))
;        (setq x (cdr y))
;   lp2(cond((or (inter? x)(null x))
;              (setq result (append (list item) result))
;              (setq y (cdr y))(go lp1)))
;        (cond((conflict? (car x) item)(return nil)))
;        (cond((equal (car x) item)(setq y (cdr y))(go lp1)))
;        (setq x (cdr x))
;        (go lp2)))

(defun conflict? (a b)
       (or
        (and (atom a) (not (atom b)) (eq a (cadr b)))
        (and (atom b) (not (atom a)) (eq b (cadr a))) ))

(defun s-assoc (k l)
       (cond((null l) nil)
            ((or (equal k (caar l))(and (eq (car k) (cadr (caar l)))
                                        (eq (cadr k) (caaar l))))
             (car l))
            (t (s-assoc k (cdr l)))))

(defun final-prune? (n)
```

```
             (or (prune1? n) (prune? n)))

(defun prune1? (n)
       (mapcar-any #'(lambda(e)(prune11? n e)) mex-1st))

(defun prune11? (n e)(prog(x y)
      (setq x e)
      (setq y 0)
      lp(cond((null x)(return nil)))
      (cond((member (car x) n)(setq y (+ 1 y))))
      (cond((> y 1)(return t)))
      (setq x (cdr x))
      (go lp)))

(defun pre-test-pos (n) (prog(y z)
      (setq y n)
      (setq z ordered-pos-att)
      lp(cond((or (= (length y) width)(null z))
             (return (retain-pos y))))
      (cond((not (member (car z) n))(setq y (cons (car z) y))))
      (setq z (cdr z))
      (go lp)))

(defun pre-test-neg (n) (prog(y z)
      (setq y n)
      (setq z ordered-neg-att)
      lp(cond((or (= (length y) width)(null z))
             (return (retain-neg y))))
      (cond((not (member (car z) n))(setq y (cons (car z) y))))
      (setq z (cdr z))
      (go lp)))

(defun select-att (l n)(prog(x y z)
      (setq x l)
      (setq y 0)
      (setq z nil)
      lp(cond((or (= y n)(null x))(return z)))
      (setq z (append z (list (nth y l))))
      (setq y (+ 1 y))
      (setq x (cdr x))
      (go lp)))

(defun set-equal (s1 s2)
      (and (subset? s1 s2)(subset? s2 s1)))

; (defun subsetp (s1 s2)
;      (cond((and (null s1)(null s2)) t)
;           ((null s2) nil)
;           ((member (car s1) s2)(subsetp (cdr s1) s2))
;           (t nil)))
(setq *print-level* nil)
(setq *print-length* nil)
(defun kt-sort (l)
      (mapcar #'kt-sort1 l))

(defun kt-sort1(e)
      (my-sort e #'kt-sort-f))

(defun kt-sort-f (a b)
      (string< (string (cond((atom a) a)(t (cadr a))))
               (string (cond((atom b) b)(t (cadr b)))) ))

(defun my-sort (l f)
      (setq l1 (copy-list l))
      (sort l1 f))

; (defun my-sort (l f) (prog(x y)
;      (setq x nil)
;      (setq y l)
;      lp(cond((null y)(return x)))
;      (setq x (sort-insert f (car y) x))
;      (setq y (cdr y))
;      (go lp)))
```

```
(defun sort-insert (f m l)
       (cond((null l) (list m))
            ((funcall f m (get-middle l))
              (append (sort-insert f m (get-upto l))
                      (list (get-middle l))
                      (get-after l)))
            (t
              (append (get-upto l) (list (get-middle l))
                      (sort-insert f m (get-after l)))) ))

(defun get-middle (l)
       (nth (- (ceiling (/ (length l) 2)) 1) l))

(defun get-middle-no (l)
       (ceiling (/ (length l) 2)) )

(defun get-upto (l)(prog(b x y)
       (setq x (+ 1 (- (length l) (get-middle-no l))))
       (setq b 0)
       (setq y (reverse l))
       lp(cond((= b x)(return (reverse y))))
       (setq y (cdr y))
       (setq b (+ b 1))
       (go lp)))

(defun get-after (l)(prog(b x y)
       (setq x (get-middle-no l))
       (setq b 0)
       (setq y l)
       lp(cond((= b x)(return y)))
       (setq y (cdr y))
       (setq b (+ b 1))
       (go lp)))

(defun detect-mex (l) (prog(x y z w)
       (setq x (cadr (assoc l layer-node-lst)))
       (setq y (cdr x))
       (setq z nil)
       (setq w mex-lst)
       (cond((eq 1 (cadr layer-order))(setq exhaustive-flag t))  ; for the first
                                                                 ; hidden layer, assume
                                                                 ; exhaustive input
                                                                 ; attribute values
            (t (setq exhaustive-flag nil)))
       (mapcar #'(lambda(e)
                   (mapcar #'(lambda(m)
                               (cond((mexeval (get-clause e)
                                      (append (get-clause-mex w)
                                              (get-clause m)))
                                     (setq mex-lst (append mex-lst (list (list e m)))))))
                          t)  y) (setq y (cdr y))) x)
       (return t)))

(defun mex-pair (l) ; turn a mex-lst into such that each item is a pair
       (apply #'append (mapcar #'mex-pairl l)))

(defun mex-pairl (p) (apply #'append
       (maplist #'(lambda(e)(mapcar #'(lambda(m)(list (car e) m)) (cdr e))) p)))
(defun get-clause-mex (l)
     (cond(exhaustive-flag
          (apply #'append (mapcar #'(lambda(e)(cons e
              (mapcar #'(lambda(m)(mapcar #'complement m))
                  (mex-pairl e)))) l)))
         (t
          (apply #'append (mapcar #'(lambda(e)
              (mapcar #'(lambda(m)(mapcar #'complement m))
                  (mex-pairl e))) l)) ))

(defun get-clause (h) (prog(x y)
       (setq x (eval (cadr (assoc h kt-node-rules))))
       (setq y nil)
```

```
         lp(cond((null x)(return y)))
           (cond((eq 'not (car (cadr (car x))))
                 (setq y (cons (mapcar #'complement (caar x))
                               y)) ))
                (setq x (cdr x))
                (go lp)))

; this program is to detect the mutual exclusiveness between two
; clause sets , for example
; cs1 = ( (a1 (not a2)) (a3 (not a4)))
; cs2 = ( ((not a1)) (a4 (not a5)))
; ----------------------------------------
; The function mexeval1 is like resolution
; I use unit resolution strategy to be efficient, see
;    the function RESOLVE
; ----------------------------------------

(defun mexeval (cs1 cs2)   ; return t if cs1 and cs2 lead to empty clause
                           ; else return nil
         (mexeval1         ; (subsumed?-del (pure-literal-del
            (cons (car cs1) (append cs2 (cdr cs1))))))

(defun pure-literal (e s)
       (mapcar-any #'(lambda(m) (pure-literal1 m (apply #'append s))) e))

(defun pure-literal1(m ss)
       (cond
            ((atom m) (not (my-member (list 'not m) ss)))
            (t (not (member (cadr m) ss)))))

(defun subsumed? (e s)
       (mapcar-any #'(lambda(m) (subsumed?1 e m)) s))

(defun subsumed?1 (e m)
       (cond((null m) t)
            ((not (member (car m) e)) nil)
            (t (subsumed?1 e (cdr m)))))

(defun pure-literal-del (l)(prog(x y)
       (setq x l)
       (setq y nil)
       lp(cond((null x) (return y)))
         (cond((not(pure-literal (car x) l))(setq y (append y (list (car x))))))
         (setq x (cdr x))
         (go lp)))

(defun subsumed?-del (l)
       (cond((null l) nil)
            ((subsumed? (car l) (cdr l))(subsumed?-del (cdr l)))
            (t (cons (car l)(subsumed?-del (cdr l))))))

(defun mexeval1 (cs)(prog (x y z w)
         ; like resolution
         (setq w cs)
         (setq x cs)(setq y (cdr x))
         lp(cond((null x)(return nil)))
         (setq z (resolve (car x) (car y)))
         (cond((eq z t)(return t))
              ((and (> (length z) 0)(new? z w))
                         (setq w (remove-red-set (append z w)))
                         (setq x w)
                         (setq y (cdr w)))
              (t (setq y (cdr y))))
         (cond((null y)(setq y w)(setq x (cdr x))))
         (go lp)))

(defun new? (s1 s2)
       (cond((null s2) t)
```

```
              ((null s1) nil)
              ((not (set-member (car s1) s2)) t)
              (t (new? (cdr s1) s2))))

(defun resolve (a b)
       (cond
             ((and (= 1 (length a))(= 1 (length b))
                (complementary (car a) (car b))) t)
             ((and (not (= 1 (length a)))(not (= 1 (length b) )))
              nil)   ; unit resolution
             (t (resolve1 a b))))

(defun intersect>1 (s1 s2)(prog(x c)
       (setq x s1)(setq c 0)
       lp(cond((null x)(return nil)))
       (cond((my-member (car x) s2)(setq c (1+ c)))).
       (cond((> c 1)(return t)))
       (setq x (cdr x))
       (go lp)))

(defun complementary (x y)
       (or
            (and (atom x)(listp y)(eq x (cadr y)))
            (and (atom y)(listp x)(eq y (cadr x)))  ))

(defun resolve1 (a b) (prog(x y z)
          (setq x a)
          (setq y nil)
          lp(cond((null x)(return y)))
          (setq z (my-remove (complement (car x)) b))
          (cond((not (equal b z))
                  (setq y (cons
                           (remove-red (append (my-remove (car x) a) z)) y))))
          (setq x (cdr x))
          (go lp)))

(defun remove-red (l)
       (cond((null l) nil)
            ((my-member (car l) (cdr l))(remove-red (cdr l)))
            (t (cons (car l) (remove-red (cdr l))))))

(defun remove-red-set (l)
       (cond((null l) nil)
            ((my-set-member (car l) (cdr l))(remove-red-set (cdr l)))
            (t (cons (car l) (remove-red-set (cdr l))))))

(defun my-set-member (e l)
       (cond((null l) nil)
            ((set-equal e (car l)) t)
            (t (my-set-member e (cdr l)))))

(defun complement(x)
       (cond((atom x) (list 'not x))
            (t (cadr x))))

(defun mapcar2(f l1 l2)
       (cond((null l1) nil)
            ((not (equal (length l1)(length l2))) nil)
            (t (cons (funcall f (car l1) (car l2))
                     (mapcar2 f (cdr l1) (cdr l2))))))

(defun input-layer (l ls)
```

```
           (cond((null ls) nil)
                ((eq 1 (cadr ls)) (car ls))
                (t (input-layer 1 (cdr ls))))))
```
; this is the same as knowtron2.lsp but modified for
;   case-based mode, you must load case information:
; (setq case-info '((c1 ((h1 h2 ..)(h4 h5)))(c2 ((h2 h3. )(h6 h7))) ..))
; where c1, c2.. are final concepts and hi are hidden units
;   which are activated (> 0.6) for a certain case
;  In this version, the explore-pos and explore-neg have
;   been modified to conduct a bias (sorted) search
;   which means search for combination of sorted hidden attributes wts
;     greater than 0.9 and the pattern matches the case information
; ----------------------------------------------------------
; Note the search width can be large (e.g., the number of hidden units
;   in one layer, especially use .mnn file since the pattern econde
; ; a small no. of attributes
; and since for a given case, maybe a small no of hidden units
;   are activated, so even if you use a large search width
;   the effective width may be small.
; Note that a large width may be dangerous because a large
;   combination of hidden attributes makerewrittine terrible
; ----------------------------------------------------------

; ----------------------------------------------------------
; To run: (kt-casemode)   (similar to kt-main in knowtron2.lsp)
; ----------------------------------------------------------

; ----------------------------------------------------------
; NOte that You CANNOT run multiple processes under the same
;   directory because the program will generate some intermediate files
;   but you CAN run multiples under different directories.
; ----------------------------------------------------------

; computing mutual exclusiveness for
;   hidden units  by preprocessing by ktmex.lsp
; ----------------------------------------------------------
; In this new version, must use ktbp.lsp which uses
;   new formats for nn file and the trained conn wts
; ----------------------------------------------------------
; ----------------------------------------------------------
; Note that the mutually exlcusive input attribute values are
;   assumed to be exhaustive, while hidden attributes are not
; ----------------------------------------------------------
; ----------------------------------------------------------
;   ktbp2.lsp -> ktcluster.lsp -> ktbp2cnn.lsp -> ktmex.lsp -> knowtron2.lsp
; (.nn->.wt) (.nn, .wt->.cnn) (.cnn-> .wt) (.cnn,.wt->.mnn) (.mnn)->.rule
; ----------------------------------------------------------

; Three intermediate files: tem.tem (kt-node-rules),
;    tem1.tem (confirm and disconfirm rules)
;    tem2.tem (rewrite)

;    and the wt-upth = 0.6 and wt-loth = 0.4 by default
;    For the output layer wt-upth = 0.9 and wt-loth = 0.1 because
;      the output layer does not consider simultaneous confirming and
;      disconfirming patterns and thus needs higher thresholds.
;      (the same as knowtron2)

; Input: 1. ((a1 w1) (a2 w2) ...)
;        2. the concept
;        3. the threshold (negation of the weight of the bias unit)
;        4. the rule set name for the rules to be learned ; ----------------------------------------------------------
; NOTE: The threshold is the negation of the weight of the bias unit.
; ----------------------------------------------------------
; need trained-conn-wt and nn information
; the bias unit is b.
; the 1st result is kt-data: ((n1 t1 at-list1)(n2 t2 at-list2)...)
;        where ti is threshold and at-listi is attribute-list.
; the 2nd result is kt-node-rules: ((n1 '(((a1)(n1))((b1)(not n1)))

```
;                                           (n2 '((....................))) ...)
(defun pre-process nil
      (setq kt-data nil)
      (mapcar #'(lambda(e)(setq cur-layer e)
      (mapcar #'pre-process1 (remove 'b
                  (cadr (assoc e layer-node-lst)))))
                                  (cdr layer-order)))

(defun pre-process1 (n) (prog(th a p ws)
      (setq p (position n (cadr (assoc cur-layer layer-node-lst))))
      (setq ws (nth p (cadr (assoc cur-layer trained-conn-wt))))
      (setq th (- (car ws)))
      (setq a (mapcar2 #'(lambda(a b)(list a b))
                  (remove 'b (cadr (assoc (input-layer cur-layer
                        layer-order) layer-node-lst)))
                        (cdr ws)))
      (setq kt-data (append kt-data (list (list n th a))))
      (return t)))

(defun generate-node-rule nil (prog (x y)
      (setq os (open "tem.tem" :direction :output))
      (setq x (cdr layer-order))
      (setq kt-node-rules nil)
      (princ "(setq kt-node-rules '(" os)(terpri os)
   lp(cond((null x) (princ ")" os)
      (close os)(load "tem.tem")(return t)))
      (cond((and out-dis-flag (eq (car x)(car (reverse layer-order))))
            (setq dis-flag t))(t (setq dis-flag nil)))
      (cond((eq (car x) (car (reverse layer-order)))
            (setq wt-upth f-beta)(setq wt-loth 0.1))
            (t (setq wt-upth 0.6)(setq wt-loth 0.4)))
      (setq y (mapcar #'(lambda(e)(assoc e kt-data))
            (cadr (assoc (car x) layer-node-lst))))
      (mapcar #' (lambda(e)
      (princ "(" os)(princ (car e) os)(terpri os)
      (princ "'(" os)(mapcar #'(lambda(m)(terpri os)(princ m os))
            (knowtron (caddr e) (car e) (cadr e) 'rules))
      (princ ")" os)
      (princ ")" os)(terpri os)
            ) y)
            ; (detect-mex (car x))    ; now, i use ktmex.lsp
      (setq x (cdr x))
      (go lp)))

(defun kt-casemode nil
      (terpri)
      (princ "Welcome to Knowledgetron!")
      (terpri)
      (princ "You must load the net and the trained result!")
      (terpri)
      (princ "You may load mutually-exclusive attribute list!")
      (terpri)
      (princ "Output file for rules: ")
      (setq o-file (read))
      (terpri)
      (princ "What is the search width for each layer?
      (enter a number, e.g., 60 for a large net)> ")
      (setq width (read))
      (terpri)
      (princ "Do you want to form disconfirm rules for the
      final concepts? (y or n) >")
      (setq x (read))
      (cond((or (eq x 'n)(eq x 'no))(setq out-dis-flag t))
      (t (setq out-dis-flag nil)))
      (terpri)
      (princ "What is the beta threshold for the final rules?
      (enter a number between 0.9-1, e.g., 0.9 by default)
      (the higher the threshold, the less noisy the rules)")
      (terpri)(princ ">")
      (setq f-beta (read))
      (setq wt-upth 0.6)
      (setq wt-loth 0.4)
      (cond((not (boundp 'width)) (setq width 7)))
```

```
        (cond((not (boundp 'mex-lst)) (setq mex-lst nil)))
        (set-mex-prop)
        (pre-process)
        (generate-node-rule)
        (setq final-rules
        (apply #'append (mapcar #'kt-main1 (cadr
              (assoc (car (reverse layer-order)) layer-node-lst)))))
        (setq final-rules
            (remove nil (mapcar #'(lambda(e)
                            (cond((final-prune? (car e)) nil)
                                  (t e))) final-rules)))
        (with-open-file (x o-file :direction :output)
            (princ "(setq rules '(" x)
            (mapcar #'(lambda(e)(print e x)) final-rules)
            (princ "))" x)(terpri x)
            )
            (mapcar #'print final-rules) (terpri) t
        )

(defun set-mex-prop nil
        (mapcar #'(lambda(e)(mapcar #'(lambda(m)(setf (get m 'mex)
                                    (append-no-red (get m 'mex) e)))
                                 e)) mex-lst))

(defun append-no-red (l1 l2)
        (cond((null l1) l2)
             ((member (car l1) l2)(append-no-red (cdr l1) l2))
             (t (cons (car l1) (append-no-red (cdr l1) l2)))))

(defun kt-main1 (c) (prog(rs1 rss2 x frule)
        (setq x (cdr (reverse (cdr layer-order))))
        (cond((null x)(return (eval (cadr (assoc c kt-node-rules))))))
        (setq rs1 (assoc c kt-node-rules))
    lp(cond((null x)(return frule)))
        (setq rss2 (mapcar #'(lambda(e)
                        (assoc e kt-node-rules))
                    (cadr (assoc (car x) layer-node-lst))))
            (setq rs1 (list c (list 'quote
                    (setq frule   (rewrite rs1 rss2)))))
        (setq x (cdr x))
        (go lp)))

(defun knowtron (al cn th rs)
        (cond((null (assoc cn case-info))(setq legal-patterns 'dummy))
             (t
              (setq legal-patterns (cadr (assoc cn case-info)))))
           (setq attribute-list al)
           (set-wt-prop al)
           (setq concept-name cn)
           (setq threshold th)
           (setq rule-set-name rs)
           (gen-all-att al)
           (setq x
            (gen-pos-neg-att al))
           (setq pos-att (car x))
           (setq neg-att (cadr x))
           (setq ordered-pos-att (my-sort pos-att #'pos>))
           (setq ordered-neg-att (my-sort neg-att #'neg<))
           (setq os1 (open "tem1.tem" :direction :output))
           (princ "(setq rules '(" os1)(terpri os1)
           (form-conf-rule al cn th)
           (form-disconf-rule al cn th)
           (princ "))" os1)
           (close os1)(load "tem1.tem") rules)

(defun set-wt-prop (l)
        (mapcar #'(lambda(e)(setf (get (car e) 'wt) (cadr e)))
                l))

(defun pos> (x y)
```

```
            (cond((>
                     (get x 'wt)
                     (get y 'wt)) t)
                 (t nil)))
(defun neg< (x y)
        (cond((<
                     (get x 'wt)
                     (get y 'wt)) t)
                 (t nil)))

(defun gen-all-att (l)
        (setq all-att (mapcar #'car l)))

(defun gen-pos-neg-att (l)
        (setq pos-att nil)
        (setq neg-att nil)
        (mapcar #' (lambda(e)
                        (cond((< (cadr e) 0) (setq neg-att
                                                 (append neg-att (list (car e)))))
                             ((> (cadr e) 0) (setq pos-att
                                                 (append pos-att (list (car e)))))))
                       l) (list pos-att neg-att))

(defun form-conf-rule (al cn th) (prog (premises allnodes )
        (setq allnodes (explore-pos all-att))
        (setq premises (apply #'append (mapcar #'neg-neg allnodes)))
        (setq allnodes nil)
        (setq premises (mapcar #'remove-neg premises))
        (setq premises (remove-subsume
                            (mapcar #' (lambda(e) (mex-refine e))
                               premises)))
        (setq rules (add-concept premises))
        (mapcar #' (lambda(e) (princ e os1)(terpri os1)) rules)
        (setq rules nil)
        (setq premises nil)
        (return rules)) )

(defun explore-pos (l) (prog (allnodes open closed)
       (cond( (not (eq legal-patterns 'dummy))
              (return (explore-pos-case))))
       (setq allnodes nil)
       (setq open (list nil))
       (setq closed nil)
       lp(cond((null open) (return  allnodes)))
          (cond((my-member (car open) closed)(setq open (cdr open)) (go lp))
               ((not (pre-test-pos (car open)))
                   (setq closed (cons (car open) closed))
                   (setq open (cdr open))(go lp))
               (t (cond((retain-pos (car open))
                   (setq allnodes (cons (car open) allnodes))))
                   (setq closed (cons (car open) closed))
                   (cond((and (< (length  (car open)) width)
       (not (retain-pos (mex-rx (append (car open) (check-mex-a (car open)
neg-att))))))
                   (setq open (append (not-in-closed-open nil closed
                      (kt-sort (specialize-pos (car open)))) (cdr open))))
                  (t (setq open (cdr open))))
                  (go lp) ))))

(defun explore-pos-case nil
        (remove nil (mapcar #'explore-pos-case1 legal-patterns)))

(defun explore-pos-case1 (p) (prog(x y)
       (setq x ordered-pos-att)
       (setq y nil)
       lp(cond((null x) (return nil)))
         (cond((member (car x) p)(setq y (append y (list (car x))))))
         (cond((retain-pos y)(return y)))
         (setq x (cdr x))
         (go lp)))
```

```
(defun explore-neg-case nil
      (remove nil (mapcar #'explore-neg-case1 legal-patterns)))

(defun explore-neg-case1 (p)(prog(x y)
      (setq x ordered-neg-att)
      (setq y nil)
      lp(cond((null x)(return nil)))
      (cond((member (car x) p)(setq y (append y (list (car x))))))
      (cond((retain-neg y)(return y)))
      (setq x (cdr x))
      (go lp)))

(defun retain-pos (x)
      (cond( (>
            (squash (+ (- threshold) (apply #'+
              (mapcar #'(lambda(e)(get e 'wt))
                   x)))) wt-upth) t)
        (t nil)))

(defun get-pos (x)
      (cond((null x) nil)
         ((member (car x) pos-att) (cons (car x) (get-pos (cdr x))))
         (t (get-pos (cdr x)))))

(defun retain-neg (x)
      (cond( (<
            (squash (+ (- threshold) (apply #'+
              (mapcar #'(lambda(e)(get e 'wt))
                   x)))) wt-loth) t)
        (t nil)))

(defun get-neg (x)
      (cond((null x) nil)
         ((member (car x) neg-att) (cons (car x) (get-neg (cdr x))))
         (t (get-neg (cdr x)))))

(defun not-in-closed-open (o c l)
      (cond((null l) nil)
         ( (my-member (car l) c) (not-in-closed-open o c (cdr l)))
         (t (cons (car l) (not-in-closed-open o c (cdr l))))))

(defun specialize-pos (n)
      (remove nil (mapcar #'(lambda(e) (cond ((not (member e n))
                                (cons e n))))
                       (check-mex-a n pos-att))))

(defun check-mex-a (a b)
      (cond((null a) b)
         (t  (mapcar #'(lambda(n)
            (setq b (my-remove n b))) a)
            (mapcar #'(lambda(e)(mapcar #'(lambda(m)
                                (setq b
                                  (my-remove m b))) (get e 'mex))) a)
                      b)))

(defun my-remove (m l)
      (cond((null l) nil)
         ((equal m (car l)) (cdr l))
         (t (cons (car l) (my-remove m (cdr l))))))

(defun set-intersect? (s1 s2)
      (mapcar-any #'(lambda(el)(member el s2)) s1) )

(defun mapcar-any (f l)
      (cond((null l) nil)
         ((funcall f (car l)) t)
         (t (mapcar-any f (cdr l)))))

(defun neg-neg (l) (prog (lx allnodes open closed)
      (cond( (not (eq legal-patterns 'dummy))
```

```
                (return (list l))))
        (setq allnodes nil)
        (setq lx (length l))
        (setq open (list (append l (check-mex-a l neg-att))))
        (setq closed nil)
     lp(cond((null open) (return allnodes)))
         (cond((my-member (car open) closed)(setq open (cdr open)) (go lp))
             ((prune? (car open))
                (setq closed (cons (car open) closed))
                (setq open (cdr open)) (go lp))
             (t (cond((> (sigmoidal-sum (mex-rx (car open))) wt-upth)
                (setq allnodes (cons (car open) allnodes))
                (setq closed (cons (car open) closed))
                (setq open (cdr open)) (go lp))
                 (t
                 (setq closed (cons (car open) closed))
                 (cond((< (+ lx (length (collect-not (car open)))) width)
                 (setq open (append (not-in-closed-open nil closed
                    (kt-sort (neg-one-neg  (car open)))) (cdr open))))
                    (t (setq open (cdr open))))
                 (go lp) ))))))

(defun prune? (n) (prog(c x y)
        (setq y (car (separate-h-i n)))   ; only care input attributes
        (setq x  (mapcar #'(lambda(e)(get e 'mex))
                (collect-not y)))
     lp(cond((null x)(return nil)))
        (setq c (how-many (car x) x) )
        (cond((> c (- (length (car x)) 1))(return t)))
        (setq x (remove-list-all (car x) x))
        (go lp)))

(defun separate-h-i (n)    ; separate the list of attributes
                           ; into hidden and not hidden nodes
        (prog (x y z i)
        (setq x n)
        (setq y nil)
        (setq z nil)
        (setq i (cadr (assoc (car layer-order) layer-node-lst)))
     lp(cond((null x)(return (list y z))))
        (cond((or (and (atom (car x))(member (car x) i))
                  (and (listp (car x))(member (cadar x) i)))
                 (setq y (append y (list (car x)))))
             (t (setq z (append z (list (car x))))))
        (setq x (cdr x))
        (go lp)))

(defun mex-refine (n) (prog(c x y y2 z w v)
        (setq y (separate-h-i n))
        (setq y2 (cadr y))
        (setq y (car y))
        (setq v (strip-not y))
        (setq z (collect-not y))
        (setq x   (mapcar #'(lambda(e)(get e 'mex))
                z))
     lp(cond((null x)(return (append y y2))))
        (setq c (how-many (car x) x) )
        (cond((= c (- (length (car x)) 1))
             (mapcar #'(lambda(e)(setq y (my-remove e y)))
                    (add-not (set-intersect v (car x))))
             (setq w (in-a-not-b  (car x) v))
             (cond((not(null w))(setq y (cons w y))))))
        (setq x (remove-list-all (car x) x))
        (go lp)))

(defun strip-not (l)
        (cond((null l) nil)
             ((atom (car l))(cons (car l) (strip-not (cdr l))))
             (t (cons (cadar l) (strip-not (cdr l))))))

(defun set-intersect (a b)(prog(x y)
        (setq x a)
```

```
        (setq y nil)
        lp(cond((null x)(return y)))
        (cond((member (car x) b)(setq y (append (list (car x)) y))))
        (setq x (cdr x))
        (go lp)))

(defun add-not (l)
        (mapcar #'(lambda(e)(list 'not e)) l))

(defun in-a-not-b (a b) (prog(x)
        (setq x a)
        lp(cond((null x)(return nil)))
        (cond((not(member (car x) b))(return (car x))))
        (setq x (cdr x))
        (go lp)))

(defun remove-list-all (l1 l2)
        (cond((null l2) nil)
                ((equal l1 (car l2))(remove-list-all l1 (cdr l2)))
                (t (cons (car l2) (remove-list-all l1 (cdr l2))))))

(defun how-many (n l)(prog(c x)
        (cond((null n)(return -10)))
        (setq c 0)
        (setq x l)
        lp(cond((null x)(return c)))
        (cond((equal n (car x))(setq c (+ 1 c))))
        (setq x (cdr x))
        (go lp)))

(defun collect-not (n)
        (cond((null n) nil)
                ((atom (car n))(collect-not (cdr n)))
                (t (cons (cadar n) (collect-not (cdr n))))))

(defun collect-aff (n)
        (cond((null n) nil)
                ((atom (car n))(cons (car n) (collect-aff (cdr n))))
                (t (collect-aff (cdr n)))))

(defun mex-rx (n) (prog(x y)
        (setq x (find-mex-lst n))
        (setq y n)
        lp(cond((null x)(return y)))
        (setq y (mex-rx1 y (car x)))
        (setq x (cdr x))
        (go lp)))

(defun find-mex-lst (n)
        (my-remove nil
           (remove-equal (apply #'append
                (mapcar #'(lambda(e)(member-member e mex-lst))
                        (collect-aff n))))))

(defun member-member (e l)(prog(x y)
    (setq y nil)(setq x l)
    lp(cond((null x)(return y)))
    (cond((member e (car x))(setq y (append y (list (car x))))))
    (setq x (cdr x))
    (go lp)))

(defun remove-equal(l)
        (cond((null l) nil)
                ((my-member (car l) (cdr l))(remove-equal (cdr l)))
                (t (cons (car l) (remove-equal (cdr l))))))

(defun mex-rx1 (a b) (prog(x y z w)
        (setq x a)
        (setq w a)
```

```
            (setq y nil)
       lp(cond((null w)(return x)))
           (cond( (member (car w) b)
               (cond((null y) (setq y (car w)))
                    (t (setq z (car w))
                       (cond((> (abs (get z 'wt))
                                (abs (get y 'wt)))
                             (setq x (remove y x))
                             (setq y z))
                            (t (setq x (remove z x))))
                       ))))
           (setq w (cdr w))
           (go lp)))

(defun neg-one-neg (n)
      (mapcar #'(lambda(e) (my-subst (list 'not e) e n)) neg-att))

(defun my-subst (a b c)
      (cond((null c) nil)
           ((equal b (car c))(cons a (cdr c)))
           (t (cons (car c) (my-subst a b (cdr c))))))

(defun sigmoidal-sum (l)
      (squash (+ (- threshold) (apply #'+
               (mapcar #'(lambda(e)
                           (cond((atom e)(get e 'wt))
                                (t 0))) l)))))

(defun remove-neg (p)
      (cond((null p) nil)
           ((not (atom (car p)))
            (cons (car p) (remove-neg (cdr p))))
           ((member (car p) pos-att)
            (cons (car p) (remove-neg (cdr p))))
           (t (remove-neg (cdr p)))))

(defun add-concept (r)
      (mapcar #'(lambda(e) (list e (list concept-name))) r))

(defun remove-subsume (l) (prog(item result x y)
      (setq result nil)
      (setq y l)(setq x l)
      lp1(cond((null y)(return result)))
          (setq item (car y))
          (setq x (cdr y))
      lp2(cond((null x)(setq result (append (list item) result))
               (setq y (cdr y))(go lp1)))
          (cond((subset? item (car x)) (setq y
                  (cons item (remove-list (car x) (cdr y)))))
               ((subset? (car x) item)(setq y (cdr y))(go lp1)))
          (setq x (cdr x))
          (go lp2)))

(defun remove-list (a b)
      (cond((null b) nil)
           ((equal a (car b)) (cdr b))
           (t (cons (car b) (remove-list a (cdr b))))))

(defun subset? (a b)
      (cond((= (length a) 1)(my-member (car a) b))
           ((null a) nil)
           ((my-member (car a) b)(subset? (cdr a) b))
           (t nil)))

(defun superset? (a b)
      (subset? b a))

(defun my-member (e l)
      (cond((null l) nil)
           ((equal e (car l)) t)
```

```
                (t (my-member e (cdr l)))))

(defun superset-member (e l)
       (cond((null l) nil)
            ((superset? e (car l)) t)
            (t (superset-member e (cdr l)))))

(defun subset-member (e l)
       (cond((null l) nil)
            ((subset? e (car l)) t)
            (t (subset-member e (cdr l)))))

(defun set-member (e l)
       (cond((null l) nil)
            ((set-equal e (car l)) t)
            (t (set-member e (cdr l)))))

(defun form-disconf-rule (al cn th) (prog (premises allnodes rules)
       (cond(dis-flag (return nil)))
       (setq allnodes (explore-neg all-att))
       (setq premises (apply #'append (mapcar #'neg-pos allnodes)))
       (setq allnodes nil)
       (setq premises (mapcar #'remove-pos premises))
       (setq premises (remove-subsume
                       (mapcar #'(lambda(e)(mex-refine e))
                          premises)))
       (setq rules (add-not-concept premises))
       (mapcar #'(lambda(e)(princ e osl)(terpri osl)) rules)
       (setq rules nil)
       (setq premises nil)
       (return rules)) )

(defun explore-neg (l) (prog (allnodes open closed)
     (cond( (not (eq legal-patterns 'dummy))
            (return (explore-neg-case)).))
       (setq allnodes nil)
       (setq open (list nil))
       (setq closed nil)
      lp(cond((null open) (return allnodes)))
         (cond((my-member (car open) closed)(setq open (cdr open)) (go lp))
              ((not (pre-test-neg (car open)))
                 (setq closed (cons (car open) closed))
                 (setq open (cdr open))(go lp))
              (t (cond((retain-neg (car open))
                  (setq allnodes (cons (car open) allnodes))))
                 (setq closed (cons (car open) closed))
                 (cond((and (< (length (car open)) width)
        (not (retain-neg (mex-rx (append (car open) (check-mex-a (car open)
pos-att))))))
                      (setq open (append (not-in-closed-open nil closed
                        (kt-sort (specialize-neg (car open)))) (cdr open))))
                    (t (setq open (cdr open))))
                 (go lp) ))))

(defun specialize-neg (n)
        (remove nil (mapcar #'(lambda(e) (cond ((not (member e n))
                                       (cons e n))))
                                    (check-mex-a n neg-att))))

(defun neg-pos (l) (prog (lx allnodes open closed)
     (cond( (not (eq legal-patterns 'dummy))
            (return (list l))))
       (setq allnodes nil)
       (setq lx (length l))
       (setq open (list (append l (check-mex-a l pos-att))))
       (setq closed nil)
      lp(cond((null open) (return allnodes)))
         (cond((my-member (car open) closed)(setq open (cdr open)) (go lp))
              ((prune? (car open))
                 (setq closed (cons (car open) closed))
                 (setq open (cdr open)) (go lp))
```

```
          (t (cond((< (sigmoidal-sum (mex-rx (car open))) wt-loth)
              (setq allnodes (cons (car open) allnodes))
              (setq closed (cons (car open) closed))
              (setq open (cdr open)) (go lp))
             (t
              (setq closed (cons (car open) closed))
              (cond((< (+ lx (length (collect-not (car open)))) width)
                 (setq open (append (not-in-closed-open nil closed
                    (kt-sort (neg-one-pos (car open)))) (cdr open))))
                (t (setq open (cdr open))))
              (go lp) ))))))

;
(defun neg-one-pos (n)
        (mapcar #'(lambda(e) (my-subst (list 'not e) e n)) pos-att))

(defun remove-pos (p)
        (cond((null p) nil)
             ((not (atom (car p)))
              (cons (car p) (remove-pos (cdr p))))
             ((member (car p) neg-att)
              (cons (car p) (remove-pos (cdr p))))
             (t (remove-pos (cdr p)))))

.(defun add-not-concept (r)
        (mapcar #'(lambda(e) (list e (list 'not concept-name))) r))

(defun print-rule (rsname)
           (terpri)(princ "Output file:")
           (setq o-file (read))
           (with-open-file (x o-file :direction :output)
               (princ "(setq " x)
               (princ rsname x)
               (princ " '(" x)
               (mapcar #'(lambda(e)(print e x))  (eval rsname))
               (princ "))" x)))

(setq *print-level* nil)
(setq *print-length* nil)

;   rewrite(rsname1 rsnamelist2)
;   e.g., rsname1: (c rule0)
;         rsnamelis2: ((m1 rule1)(m2 rule2)...)
; global variable: frules, closed-prem, rsname1, rsnamelist2, intervar,
;                  final-rules (this is the result).
; wt-upth (wt upper threshold) e.g. 0.6-.08
; wt-loth (wt lower threshold) e.g. 0.2-.04

(defun rewrite (rs1 rss2)
       (setq rsname1 rs1)
       (setq rsnamelist2 rss2)
       (setq concept-name (car rs1))
       (setq frules nil)
       (setq conf-rules nil)
       (setq disconf-rules nil)
       (setq closed-prem nil)
       (setq intervar (mapcar #'car rss2))
       (setq os2 (open "tem2.tem" :direction :output))
       (princ "(setq frules '(" os2)(terpri os2)
       (mapcar #'rewrite1 (get-conf-rule (eval (cadr rs1))))
       (princ "))" os2)
       (close os2)(load "tem2.tem")
       (cond((not (null frules))
         (setq conf-rules (add-concept (remove-subsume
              (mapcar #'(lambda(e) (mex-refine e))
                 (mapcar #'car frules))))))))
       (setq frules nil)
       (setq closed-prem nil)
       (setq os2 (open "tem2.tem" :direction :output))
```

```
        (princ "(setq frules '(" os2)(terpri os2)
        (mapcar #''rewritel (get-disconf-rule (eval (cadr rs1))))
        (princ "))" os2)
        (close os2)(load "tem2.tem")
        (cond((not (null frules))
        (setq disconf-rules
                (add-not-concept (remove-subsume
                    (mapcar #'(lambda(e)(mex-refine e))
                (mapcar #'car frules))))))))
        (setq final-rules (append conf-rules disconf-rules)))

(defun get-conf-rule (rs)
        (assoc-reverse-all-new (list concept-name) rs))

(defun get-disconf-rule (rs)
        (assoc-reverse-all-new (list 'not concept-name) rs))

(defun assoc-reverse-all-new (k l)
        (cond((null l) nil)
             ((equal k (cadar l))(cons (car l)
                                    (assoc-reverse-all-new k (cdr l))))
             (t (assoc-reverse-all-new k (cdr l)))))

(defun rewritel (r) (prog (open)
        (setq open (list (car r)))
     lp(cond((null open)(return t)))
        (cond((superset-member (car open) closed-prem)
                (setq open (cdr open))(go lp)))
        (cond((nointervar (car open))
                (princ (list  (car open) (cadr r)) os2)(terpri os2)
                                    (setq open (cdr open))(go lp)))
        (setq closed-prem (cons (car open) closed-prem))
        (setq open (append (not-in-closed-open nil closed-prem
           (rewritell (car open))) (cdr open)))
        (go lp)))

(defun nointervar (p)
        (not (intersection (att-in p) intervar)))

(defun att-in (p)
        (cond((null p) nil)
             ((atom (car p))(cons (car p) (att-in (cdr p))))
             (t (cons (cadar p) (att-in (cdr p))))))

(defun rewritell (p) (prog(x y z w u)
        (setq w nil)
        (setq x (first-inter p))
        (setq y (first-intervar x))
        (setq z (mapcar #'(lambda(e)(new-subst e x p))
                        (get-all-ant y x)))
        (mapcar #'(lambda(e)
                    (cond((setq u (checkconfred e))(setq w (cons u w)))
                         (t nil))) z)
        (return w)))

(defun first-inter (p)
        (cond((null p) nil)
             ((inter? (car p)) (car p))
             (t (first-inter (cdr p)))))

(defun inter? (v)
        (cond((atom v) (cond((member v intervar))))
             (t (cond((member (cadr v) intervar))))))

(defun first-intervar (x)
        (cond((atom x) x)
             (t (cadr x))))

(defun get-all-ant (y x)
        (assoc-reverse-all (givelist x) (eval (cadr (assoc y rsnamelist2)))))

(defun givelist (x)
```

```
        (cond((atom x)(list x))
              (t x)))

(defun assoc-reverse-all (k l)
        (cond((null l) nil)
              ((equal k (cadar l))(cons (caar l)
                                        (assoc-reverse-all k (cdr l))))
              (t (assoc-reverse-all k (cdr l)))))

(defun new-subst (a b c)
        (cond((null c) nil)
              ((equal b (car c))(append a (cdr c)))
              (t (cons (car c) (new-subst a b (cdr c))))))

(defun checkconfred (l)
        (setq ll (checkconfredl l))
        (cond((my-member '(nil) ll) nil)
              (t ll)))

(defun checkconfredl (l)
        (cond((null l) nil)
              ((= 1 (length l)) l)
              ((or (conflict-a-d (car l) (cdr l))
                   (mex-conf-a-d (car l) (cdr l)))
               (list (list nil)))
              ((my-member (car l) (cdr l))
               (checkconfredl (cdr l)))
              (t (cons (car l)
                       (checkconfredl (cdr l))))
              ))

(defun conflict-a-d (a l)
        (mapcar-any #'(lambda(e)(conflict? a e)) l))

(defun mex-conf-a-d (a l)
        (mapcar-any #'(lambda(e)(mex-conf? a e)) l))

(defun mex-conf? (a b)
        (cond((equal a b) nil)
              (t
               (subset-member (list (de-not a) (de-not b)) mex-lst))))

(defun de-not (e)
        (cond((atom e) e)
              (t (cadr e))))

; (defun checkconfred (l) (prog(item result x y)
;       (setq result nil)
;       (setq y l)(setq x l)
;       lp1(cond((null y)(return result)))
;       (setq item (car y))
;       (setq x (cdr y))
;       lp2(cond((or (inter? x)(null x))
;                (setq result (append (list item) result))
;                (setq y (cdr y))(go lp1)))
;        (cond((conflict? (car x) item)(return nil)))
;        (cond((equal (car x) item)(setq y (cdr y))(go lp1)))
;        (setq x (cdr x))
;        (go lp2)))

(defun conflict? (a b)
        (or
         (and (atom a) (not (atom b)) (eq a (cadr b)))
         (and (atom b) (not (atom a)) (eq b (cadr a))) ))

(defun s-assoc (k l)
        (cond((null l) nil)
              ((or (equal k (caar l))(and (eq (car k) (cadr (caar l)))
                                           (eq (cadr k) (caaar l))))
```

```
                (car l))
              (t (s-assoc k (cdr l))))))

(defun final-prune? (n)
      (or (prune1? n) (prune? n)))

(defun prune1? (n)
      (mapcar-any #'(lambda(e)(prune11? n e)) mex-lst))

(defun prune11? (n e)(prog(x y)
      (setq x e)
      (setq y 0)
      lp(cond((null x)(return nil)))
      (cond((member (car x) n)(setq y (+ 1 y))))
      (cond((> y 1)(return t)))
      (setq x (cdr x))
      (go lp)))

(defun pre-test-pos (n) (prog(y z)
      (setq y n)
      (setq z ordered-pos-att)
      lp(cond((or (= (length y) width)(null z))
            (return (retain-pos y))))
      (cond((not (member (car z) n))(setq y (cons (car z) y))))
      (setq z (cdr z))
      (go lp)))

(defun pre-test-neg (n) (prog(y z)
      (setq y n)
      (setq z ordered-neg-att)
      lp(cond((or (= (length y) width)(null z))
            (return (retain-neg y))))
      (cond((not (member (car z) n))(setq y (cons (car z) y))))
      (setq z (cdr z))
      (go lp)))

(defun select-att (l n)(prog(x y z)
      (setq x l)
      (setq y 0)
      (setq z nil)
      lp(cond((or (= y n)(null x))(return z)))
      (setq z (append z (list (nth y l))))
      (setq y (+ 1 y))
      (setq x (cdr x))
      (go lp)))

(defun set-equal (s1 s2)
      (and (subset? s1 s2)(subset? s2 s1)))

; (defun subsetp (s1 s2)
;       (cond((and (null s1)(null s2)) t)
;            ((null s2) nil)
;            ((member (car s1) s2)(subsetp (cdr s1) s2))
;            (t nil)))
(setq *print-level* nil)
(setq *print-length* nil)
(defun kt-sort (l)
      (mapcar #'kt-sort1 l))

(defun kt-sort1(e)
      (my-sort e #'kt-sort-f))

(defun kt-sort-f (a b)
      (string< (string (cond((atom a) a)(t (cadr a))))
               (string (cond((atom b) b)(t (cadr b)))) ))

(defun my-sort (l f)
      (setq l1 (copy-list l))
      (sort l1 f))

; (defun my-sort (l f) (prog(x y)
;       (setq x nil)
```

```
;       (setq y l)
;       lp(cond((null y)(return x)))
;       (setq x (sort-insert f (car y) x))
;       (setq y (cdr y))
;       (go lp)))

(defun sort-insert (f m l)
        (cond((null l) (list m))
             ((funcall f m (get-middle l))
              (append (sort-insert f m (get-upto l))
                      (list (get-middle l))
                      (get-after l)))
             (t
              (append (get-upto l) (list (get-middle l))
                      (sort-insert f m (get-after l)))) ))

(defun get-middle (l)
        (nth (- (ceiling (/ (length l) 2)) 1) l))

(defun get-middle-no (l)
        (ceiling (/ (length l) 2)) )

(defun get-upto (l)(prog(b x y)
        (setq x (+ 1 (- (length l) (get-middle-no l))))
        (setq b 0)
        (setq y (reverse l))
        lp(cond((= b x)(return (reverse y))))
        (setq y (cdr y))
        (setq b (+ b 1))
        (go lp)))

(defun get-after (l)(prog(b x y)
        (setq x (get-middle-no l))
        (setq b 0)
        (setq y l)
        lp(cond((= b x)(return y)))
        (setq y (cdr y))
        (setq b (+ b 1))
        (go lp)))

(defun detect-mex (l) (prog(x y z w)
        (setq x (cadr (assoc l layer-node-lst)))
        (setq y (cdr x))
        (setq z nil)
        (setq w mex-lst)
        (cond((eq l (cadr layer-order))(setq exhaustive-flag t)) ; for the first
                                                                 ; hidden layer, assume
                                                                 ; exhaustive input
                                                                 ; attribute values
             (t (setq exhaustive-flag nil)))
        (mapcar #'(lambda(e)
                    (mapcar #'(lambda(m)
                                (cond((mexeval (get-clause e)
                                               (append (get-clause-mex w)
                                                       (get-clause m)))
                                      (setq mex-lst (append mex-lst (list (list e m)))))))
                            t)   y) (setq y (cdr y))) x)
        (return t)))

(defun mex-pair (l) ; turn a mex-lst into such that each item is a pair
        (apply #'append (mapcar #'mex-pairl l)))

(defun mex-pairl (p) (apply #'append
        (maplist #'(lambda(e)(mapcar #'(lambda(m)(list (car e) m)) (cdr e))) p)))

(defun get-clause-mex (l)
        (cond(exhaustive-flag
              (apply #'append (mapcar #'(lambda(e)(cons e
                (mapcar #'(lambda(m)(mapcar #'complement m))
                        (mex-pairl e)))) l)))
             (t
```

```
           (apply #'append (mapcar #'(lambda(e)
                (mapcar #'(lambda(m) (mapcar #'complement m))
                    (mex-pairl e))) l))) ))

(defun get-clause (h) (prog(x y)
        (setq x (eval (cadr (assoc h kt-node-rules))))
        (setq y nil)
        lp(cond((null x) (return y)))
        (cond((eq 'not (car (cadr (car x))))
                (setq y (cons (mapcar #'complement (caar x))
                        y)) ))
            (setq x (cdr x))
            (go lp)))

; this program is to detect the mutual exclusiveness between two
;   clause sets , for example
;   cs1 = ( (a1 (not a2)) (a3 (not a4)))
;   cs2 = ( ((not a1)) (a4 (not a5)))
; --------------------------------------------
;   The function mexevall is like resolution
;   I use unit resolution strategy to be efficient, see
;       the function RESOLVE
; --------------------------------------------

(defun mexeval (cs1 cs2)    ; return t if cs1 anc cs2 lead to empty clause
                            ; else return nil
        (mexevall           ; (subsumed?-del (pure-literal-del
            (cons (car cs1) (append cs2 (cdr cs1))))))

(defun pure-literal (e s)
        (mapcar-any #'(lambda(m) (pure-literall m (apply #'append s))) e))

(defun pure-literall(m ss)
        (cond
            ((atom m) (not (my-member (list 'not m) ss)))
            (t (not (member (cadr m) ss)))))

(defun subsumed? (e s)
        (mapcar-any #'(lambda(m)(subsumed?1 e m)) s))

(defun subsumed?1 (e m)
        (cond((null m) t)
            ((not (member (car m) e)) nil)
            (t (subsumed?1 e (cdr m)))))

(defun pure-literal-del (l)(prog(x y)
        (setq x l)
        (setq y nil)
        lp(cond((null x) (return y)))
        (cond((not(pure-literal (car x) l))(setq y (append y (list (car x))))))
        (setq x (cdr x))
        (go lp)))

(defun subsumed?-del (l)
        (cond((null l) nil)
            ((subsumed? (car l) (cdr l))(subsumed?-del (cdr l)))
            (t (cons (car l)(subsumed?-del (cdr l))))))

(defun mexevall (cs)(prog (x y z w)
        ; like resolution
        (setq w cs)
        (setq x cs)(setq y (cdr x))
        lp(cond((null x) (return nil)))
        (setq z (resolve (car x) (car y)))
        (cond((eq z t)(return t))
            ((and (> (length z) 0)(new? z w))
                    (setq w (remove-red-set (append z w)))
                    (setq x w)
                    (setq y (cdr w)))
```

```
                (t (setq y (cdr y))))
            (cond((null y)(setq y w)(setq x (cdr x))))
            (go lp)))

(defun new? (s1 s2)
       (cond((null s2) t)
            ((null s1) nil)
            ((not (set-member (car s1) s2)) t)
            (t (new? (cdr s1) s2))))

(defun resolve (a b)
       (cond
            ((and (= 1 (length a))(= 1 (length b))
                  (complementary (car a) (car b))) t)
            ((and (not (= 1 (length a)))(not (= 1 (length b) )))
             nil)    ; unit resolution
            (t (resolve1 a b))))

(defun intersect>1 (s1 s2)(prog(x c)
       (setq x s1)(setq c 0)
    lp(cond((null x) (return nil)))
       (cond((my-member (car x) s2)(setq c (1+ c))))
       (cond((> c 1)(return t)))
       (setq x (cdr x))
       (go lp)))

(defun complementary (x y)
       (or
           (and (atom x)(listp y)(eq x (cadr y)))
           (and (atom y)(listp x)(eq y (cadr x)))  ))

(defun resolve1 (a b) (prog(x y z)
          (setq x a)
          (setq y nil)
       lp(cond((null x) (return y)))
          (setq z (my-remove (complement (car x)) b))
          (cond((not (equal b z))
                (setq y (cons
                    (remove-red (append (my-remove (car x) a) z)) y))))
          (setq x (cdr x))
          (go lp)))

(defun remove-red (l)
       (cond((null l) nil)
            ((my-member (car l) (cdr l)) (remove-red (cdr l)))
            (t (cons (car l) (remove-red (cdr l))))))

(defun remove-red-set (l)
       (cond((null l) nil)
            ((my-set-member (car l) (cdr l))(remove-red-set (cdr l)))
            (t (cons (car l) (remove-red-set (cdr l))))))

(defun my-set-member (e l)
       (cond((null l) nil)
            ((set-equal e (car l)) t)
            (t (my-set-member e (cdr l)))))

(defun complement(x)
       (cond((atom x) (list 'not x))
            (t (cadr x))))

(defun mapcar2(f l1 l2)
       (cond((null l1) nil)
            ((not (equal (length l1)(length l2))) nil)
```

```
        (t (cons (funcall f (car l1) (car l2))
                 (mapcar2 f (cdr l1) (cdr l2)))))))

(defun input-layer (l ls)
       (cond((null ls) nil)
            ((eq l (cadr ls)) (car ls))
            (t (input-layer l (cdr ls)))))
```

APPENDIX E:  RULES

R61: If
    CAP-SHAPE is CONICAL and
    SPORE-PRINT-COLOR is not PURPLE and
    GILL-ATTACHMENT is FREE .
Then
    it is POISONOUS.

R62: If
    CAP-SHAPE is CONICAL and
    STALK-ROOT is BULBOUS and
    RING-TYPE is not EVANESCENT .
Then
    it is POISONOUS.

R63: If
    STALK-SHAPE is TAPERING and
    GILL-SPACING is not CLOSE and
    STALK-COLOR-BELOW-RING is not YELLOW and
    ODOR is ALMOND .
Then
    it is EDIBLE.

R64: If
    STALK-SURFACE-ABOVE-RING is SMOOTH and
    RING-NUMBER is not TWO and
    STALK-COLOR-BELOW-RING is not YELLOW and
    ODOR is NONE .
Then
    it is EDIBLE.

R65: If
    CAP-SHAPE is not CONICAL and
    HABITAT is not GRASSES and
    STALK-COLOR-BELOW-RING is not YELLOW and
    ODOR is NONE .
Then
    it is EDIBLE.

R66: If
    STALK-COLOR-BELOW-RING is not YELLOW and
    ODOR is NONE and
    VEIL-TYPE is PARTIAL and
    CAP-SURFACE is not SCALY .
Then
    it is EDIBLE.

R67: If
    STALK-SURFACE-ABOVE-RING is SMOOTH and
    RING-NUMBER is not TWO and
    STALK-COLOR-BELOW-RING is not YELLOW and
    CAP-SURFACE is FIBROUS .
Then
    it is EDIBLE.

What is claimed is:

1. A data processing system comprising:
a neural network having an input layer of input units, and different layers of processing elements including an output layer of output processing elements and at least one hidden layer of hidden processing elements;
a translating means for translating knowledge in said neural network having an input layer of input units, and layers of processing elements including an output layer of output processing elements and at least one hidden layer of hidden processing elements, said translating means operable to translate knowledge in the outer layer and each hidden layer of the neural network into a corresponding layer set of rules, there being a corresponding layer set of rules for each of the outer layer and each hidden layer, and there being undefined hidden concepts embodied in the layer sets of rules;

a rewriting means for rewriting rules from the layer sets of rules by reformulating rules from one layer of said layers of processing elements in terms of rules of another layer of said layers of processing elements to eliminate undefined hidden concepts and thereby generate a rewritten set of rules, the rewritten set of rules comprising rules in IF-THEN form; and a memory for receiving and storing the rewritten set of rules; and wherein said translation means and rewriting means are operably connected to said neural network.

2. The data processing system of claim 1 wherein said neural network is a hardware network with said input units, output processing elements, and hidden processing elements all being hardware components.

3. The data processing system of claim 2 further comprising a CPU and a memory, said memory operably connected to said CPU and wherein said translating means and rewriting means are disposed in said memory.

4. The data processing system of claim 1 further comprising a CPU and a memory, said memory operably connected to said CPU and wherein said translating means, rewriting means, and neural network are disposed in said memory, and said input units, output processing elements, and hidden processing elements all being software components.

5. The data processing system of claim 1 wherein said translation means and said rewriting means are part of one or more of said output processing elements and said hidden processing elements.

6. The data processing system of claim 5 wherein said memory is within at least one of said output processing elements and said hidden processing elements.

7. The data processing system of claim 1 further comprising wherein said translating means translate by:

presenting each processing element with positive input combinations up to a limit k corresponding to positive attributes for that processing element to develop a positive attributes set PA of all combinations of at most k positive attributes, each of which confirms one of said concepts if all negative attributes are absent;

determining which of said input combinations in PA confirm one of said concepts when combined with the absense of some or no negative attributes to develop a positive attributes without negative attributes set PAN;

presenting each processing element with negative input combination up to k corresponding to negative attributes for that processing element to develop a negative attributes set NA of all combinations of at most k negative attributes each of which disconfirms one of said concepts if all positive attributes are absent; and determining which of said input combinations in NA disconfirm one of said concepts when combined with the absence of some or no positive attributes to develop a negative attributes without positive attributes set NAP.

8. The data processing system of claim 1 further comprising means for performing an initial backpropagation to train a neural network having an input layer of input units and different layers of processing elements including an output layer having output processing elements and at least one hidden layer having hidden processing elements; means for finding hidden processing elements within a common layer having similar patterns of information and replacing the similar pattern hidden processing elements with a single hidden processing element having information from one or more of the similar pattern hidden processing elements; and means for performing a further backpropagation on the neural network.

9. The data processing system of claim 1 further comprising an inference engine in said memory, said inference engine and stored rules in the memory being part of a rule-based expert system.

10. The data processing system of claim 1 wherein said rewriting means rewrites such that said rewritten set of rules produce conclusions which are the same as conclusions produced by the neural network for at least 95% of a set of random samples, the set of random samples making up a portion of a problem domain corresponding to input conditions.

11. The data processing system of claim 10 wherein said portion is 10% of the problem domain.

12. A method of producing a rule-based expert system by use of a neural network having an input layer of input units and different layers of processing elements including an output layer and at least one hidden layer, the steps comprising:

translating knowledge in the output layer and each hidden layer of the neural network into a corresponding layer set of rules, there being a corresponding layer set of rules for each of the outer layer and each hidden layer, and there being undefined hidden concepts embodied in the layer sets of rules;

rewriting rules from the layer sets of rules by reformulating rules from one layer of said layers of processing elements in terms of rules of another layer of said layers of processing elements to eliminate undefined hidden concepts and thereby generate a rewritten set of rules, the rewritten set of rules comprising rules in IF-THEN form; and storing said rewritten rule set in a memory.

13. The method of claim 12 wherein, prior to said translation step, the neural network is trained by the following substeps in order:

performing an initial backpropagation to train a neural network having an input layer of input units and different layers of processing elements including an output layer having output processing elements and at least one hidden layer having hidden processing elements;

finding hidden processing elements within a common layer having similar patterns of information and replacing the similar pattern hidden processing elements with a single hidden processing element having information from one or more of the similar pattern hidden processing elements; and performing a further backpropagation on the neural network.

14. The method of claim 12 wherein said translation step includes the substeps of:

presenting each processing element with positive input combinations corresponding to positive attributes up to k for that processing element to develop a positive attributes set PA of all combinations of at most k positive attributes each of which confirms one of said concepts if all negative attributes are absent; determining which of said input combinations in PA confirm one of said concepts when combined with the absence of same or no negative attributes to develop a positive attributes without negative attributes set PAN;

presenting each processing element with negative input combinations corresponding to negative attributes up to k for that processing element to develop a negative attributes set NA of all combinations of at most k negative attributes each of which disconfirms one of said concepts if all positive attributes are absent; and determining which of said input combinations in NA disconfirm one of said concepts when combined with the absence of same or no positive attributes to develop a negative attributes without positive attributes set NAP.

15. The method of claim 14 wherein said presenting of each processing element with positive input combinations corresponding to positive attributes proceeds heuristically in that, upon finding a member of set PA having m positive attributes $P_1$ to $P_m$, m being any positive integer less than k, one or more further combinations corresponding to $P_1$ to $P_m$ combined with other positive attributes are considered members of PA without such further combinations being supplied to the processing element, and wherein said presenting of each processing element with negative input combinations corresponding to negative attributes proceeds heuristically in that, upon finding a member of set NA having m negative attributes $N_1$ to $N_m$, m being any positive integer less than k, one or more further combinations corresponding to $N_1$ to $N_m$ combined with other negative attributes are considered members of NA without such further combinations being supplied to the processing element.

16. The method of claim 12 wherein the rules are translated by searching for rules in each layer of processing elements starting at a hidden layer closest to the input layer and proceeding to the output layer by way of any interviewing hidden layers, and further comprising the steps of detecting implausible combinations of outputs from processing elements in one layer and using the knowledge of implausible combinations to limit the search in the next layer to be searched.

17. The method of claim 12 wherein said rewriting means rewrites such that said rewritten set of rules produce conclusions which are the same as conclusions produced by the neural network for at least 95% of a set of random samples, the set of random samples making up a portion of a problem domain corresponding to input conditions.

18. The method of claim 17 wherein said portion is 10% of the problem domain.

* * * * *